Figure 12:
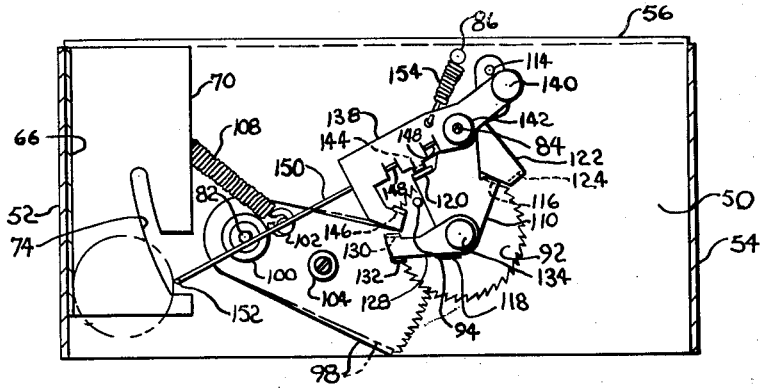

Nov. 3, 1964          G. F. ERICKSON          3,155,213
MONEY-HANDLING DEVICES
Filed Oct. 26, 1961          13 Sheets-Sheet 1
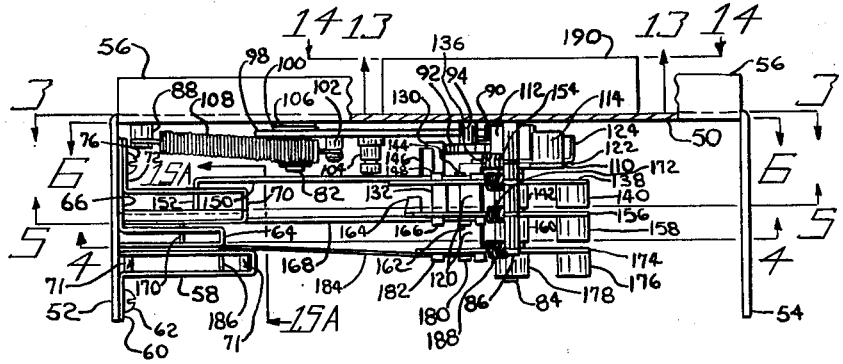
FIG_1_
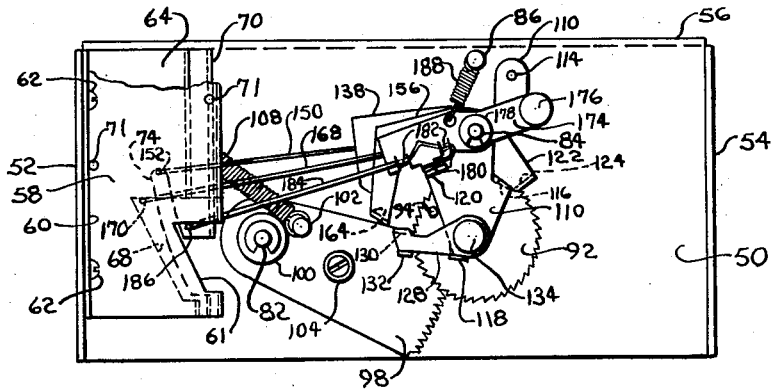
FIG_2_
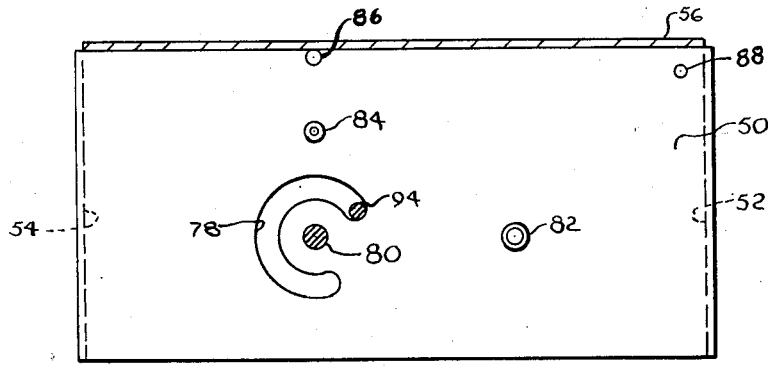
FIG_3_
INVENTOR.
GUSTAV F. ERICKSON
BY
Rey Eilers
ATTORNEY Nov. 3, 1964  G. F. ERICKSON  3,155,213
MONEY-HANDLING DEVICES
Filed Oct. 26, 1961  13 Sheets-Sheet 2
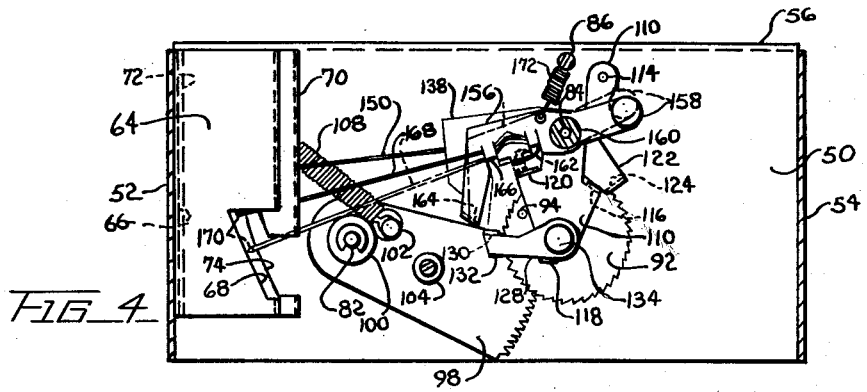
FIG_4
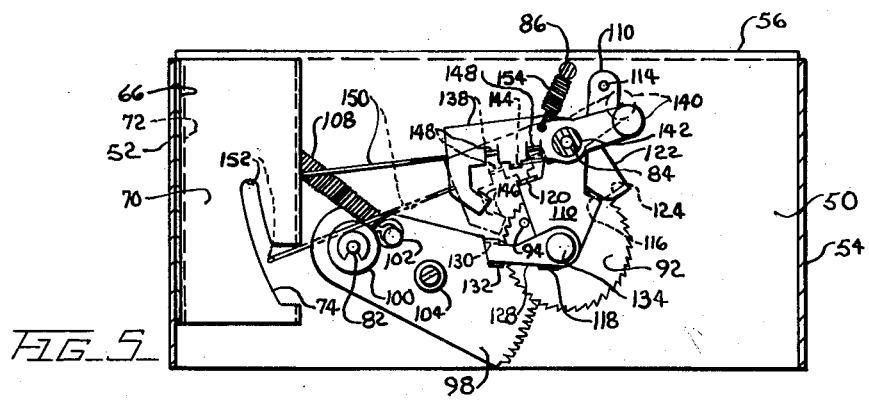
FIG_5
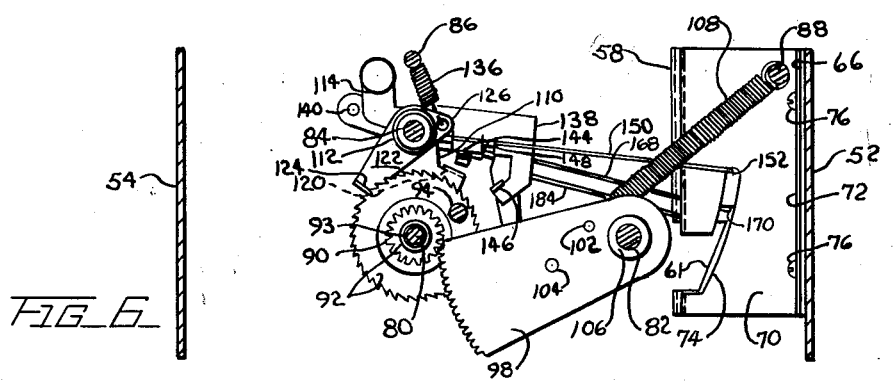
FIG_6
INVENTOR.
GUSTAV F. ERICKSON
BY
Rey Eilers
ATTORNEY Nov. 3, 1964 G. F. ERICKSON 3,155,213
MONEY-HANDLING DEVICES
Filed Oct. 26, 1961 13 Sheets-Sheet 3
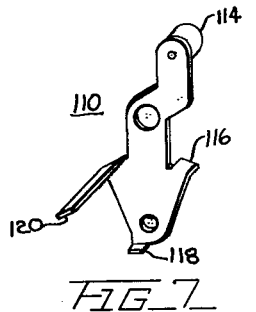
FIG_7
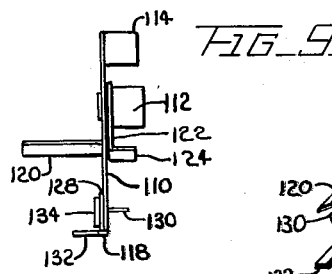
FIG_9
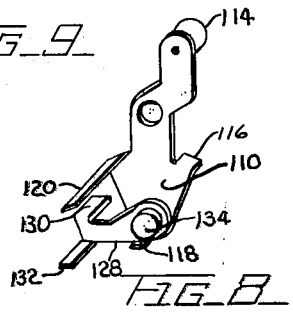
FIG_8
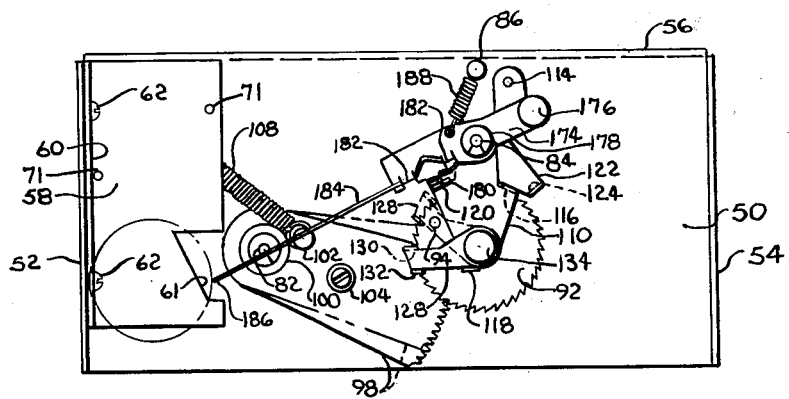
FIG_10
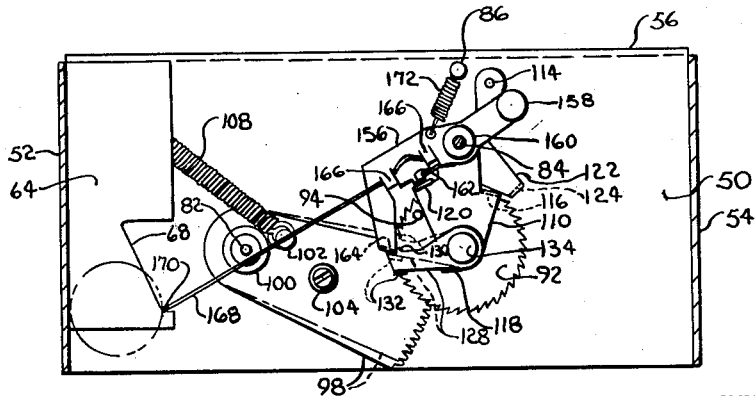
FIG_11
INVENTOR.
GUSTAV F. ERICKSON
BY
Rey Eilers
ATTORNEY

INVENTOR.
GUSTAV F. ERICKSON
BY
ATTORNEY

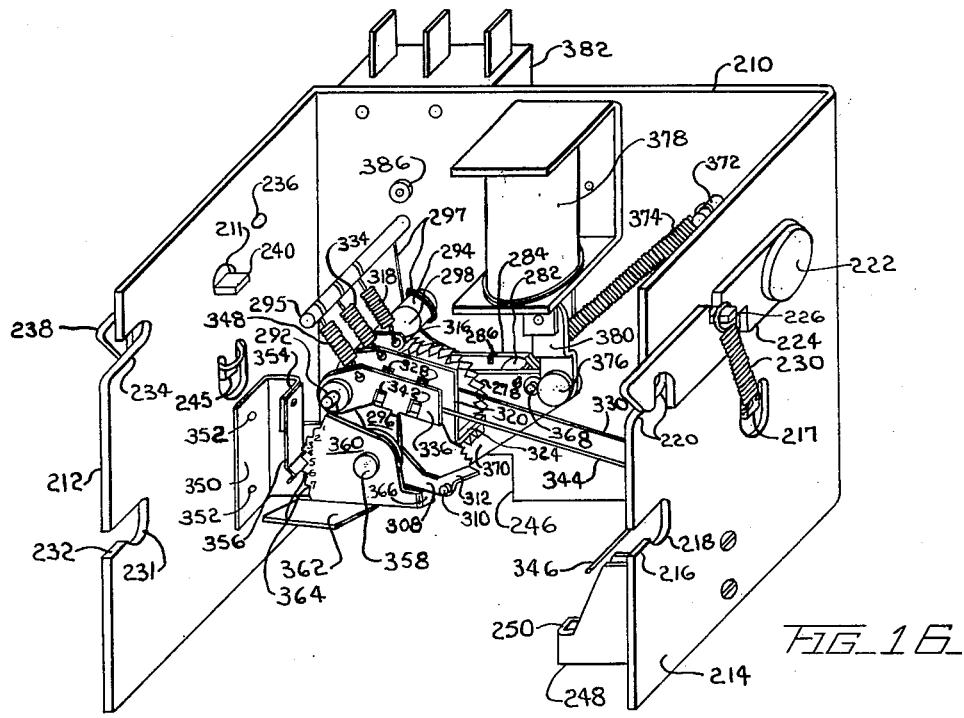
FIG_16
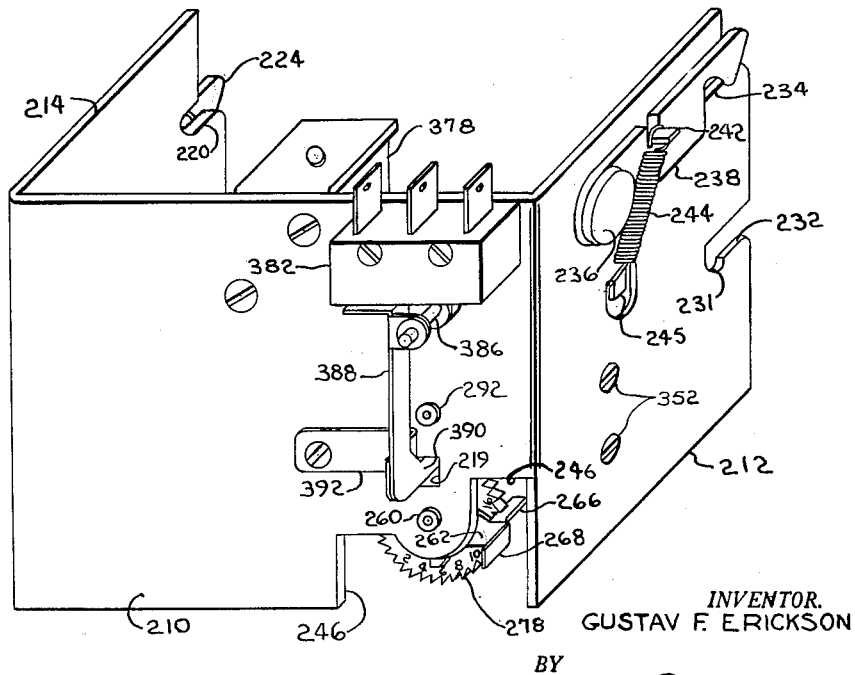
FIG_17
INVENTOR.
GUSTAV F. ERICKSON
BY
Roy Eulus
ATTORNEY Nov. 3, 1964 G. F. ERICKSON 3,155,213
MONEY-HANDLING DEVICES
Filed Oct. 26, 1961 13 Sheets-Sheet 6
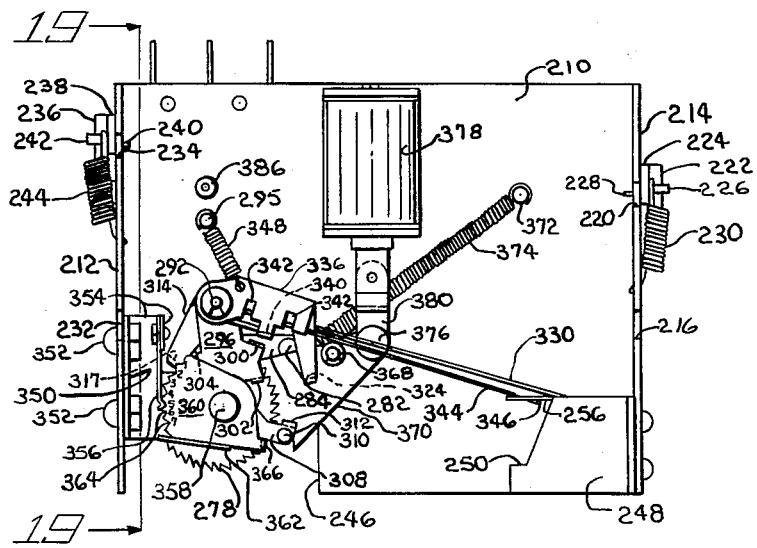
FIG_18
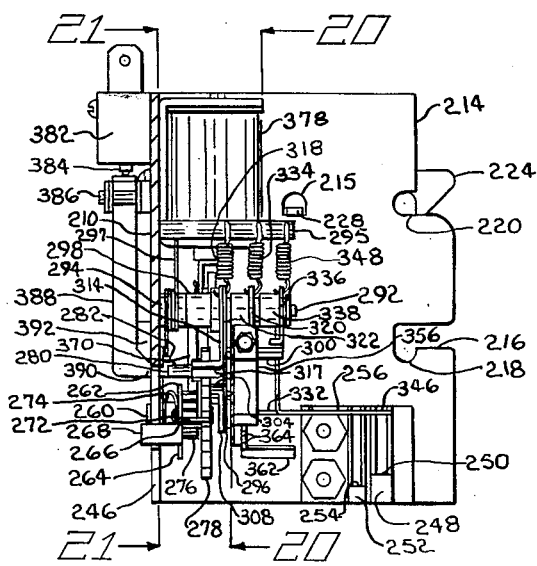
FIG_19
INVENTOR.
GUSTAV F. ERICKSON
BY
Rey Eilers
ATTORNEY

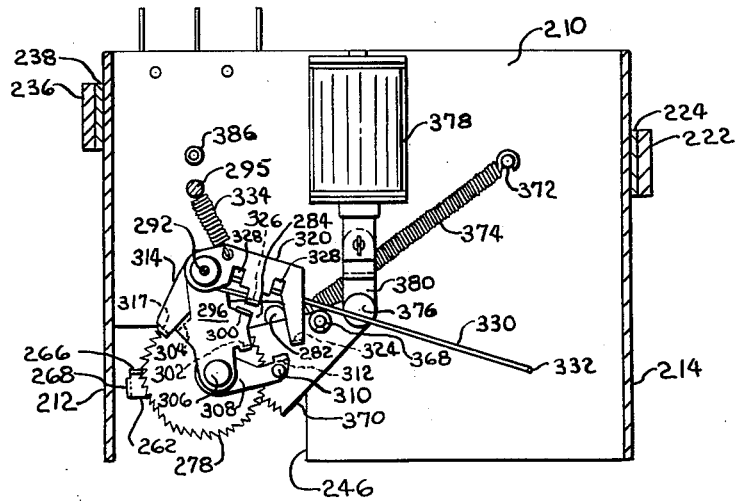
FIG_20_
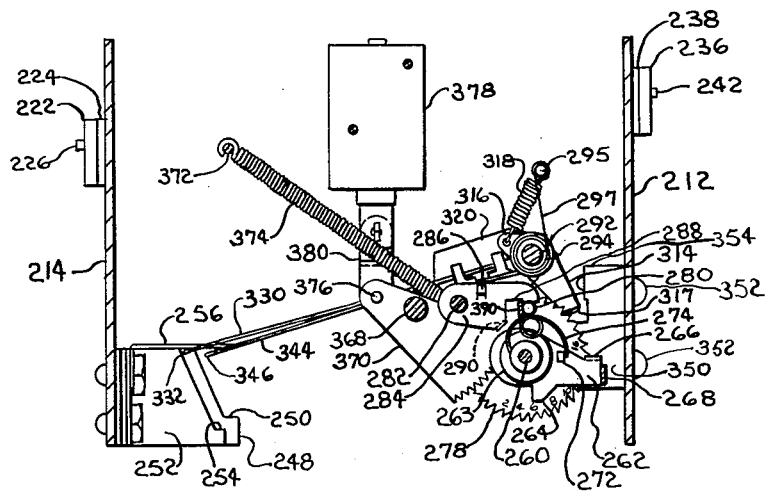
FIG_21_
*INVENTOR.*
GUSTAV F. ERICKSON
BY
*Rey Eilers*
ATTORNEY Nov. 3, 1964    G. F. ERICKSON    3,155,213
MONEY-HANDLING DEVICES
Filed Oct. 26, 1961    13 Sheets-Sheet 8
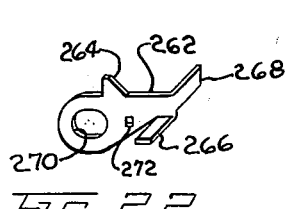
FIG_22
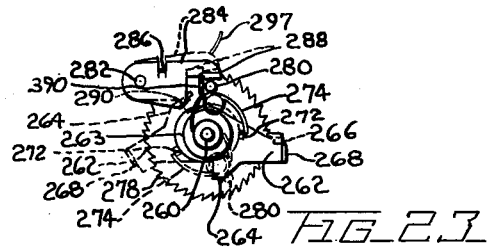
FIG_23
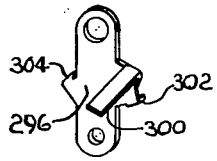
FIG_25
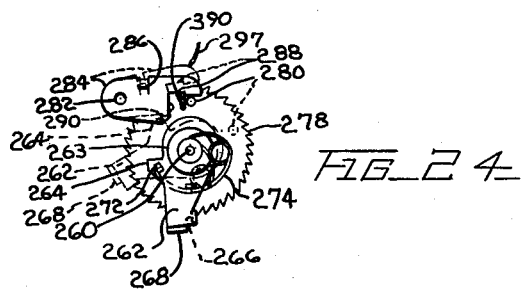
FIG_24
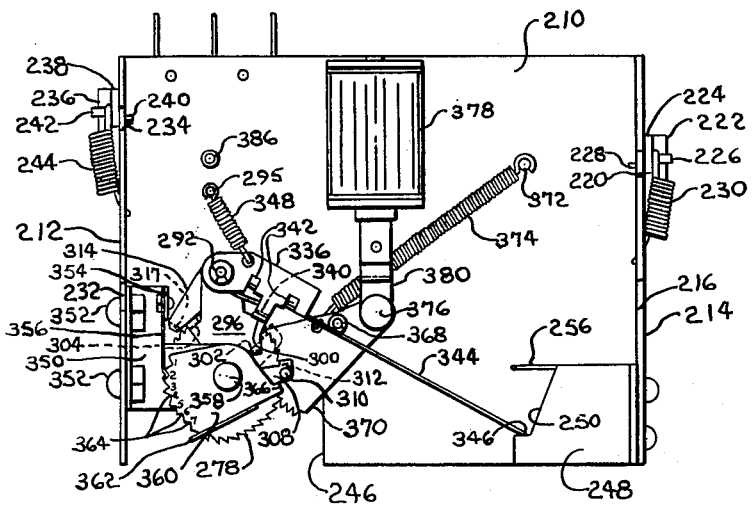
FIG_26
INVENTOR.
GUSTAV F. ERICKSON
BY
*Roy Eilers*
ATTORNEY

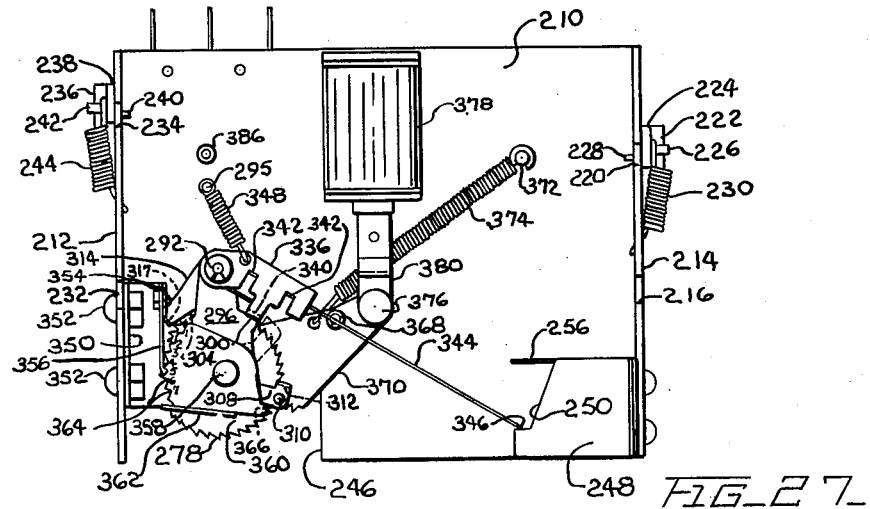
FIG_27_
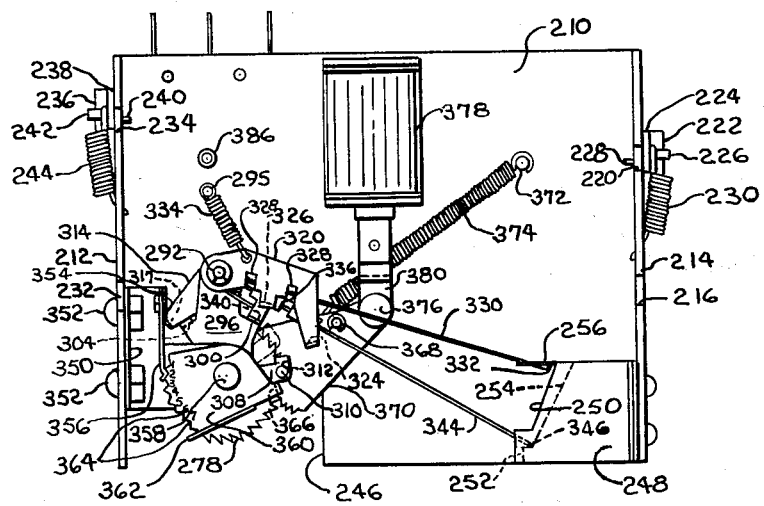
FIG_28_

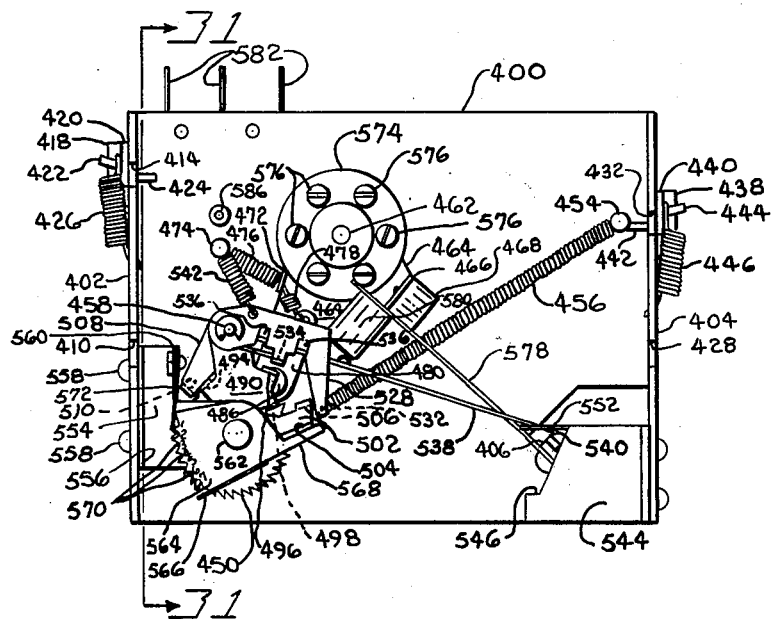
FIG_29

Nov. 3, 1964  G. F. ERICKSON  3,155,213
MONEY-HANDLING DEVICES
Filed Oct. 26, 1961  13 Sheets-Sheet 11
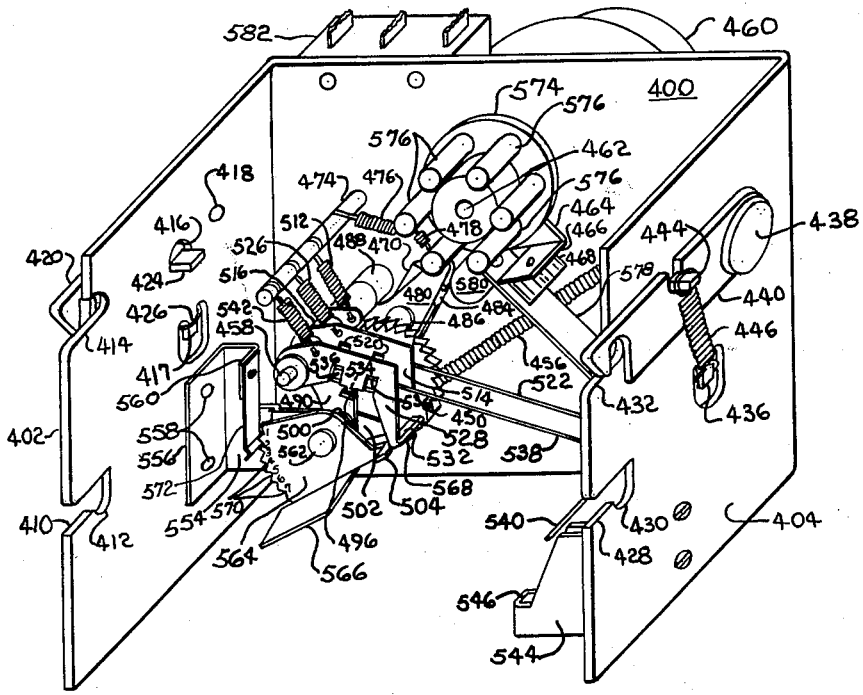
FIG_30_
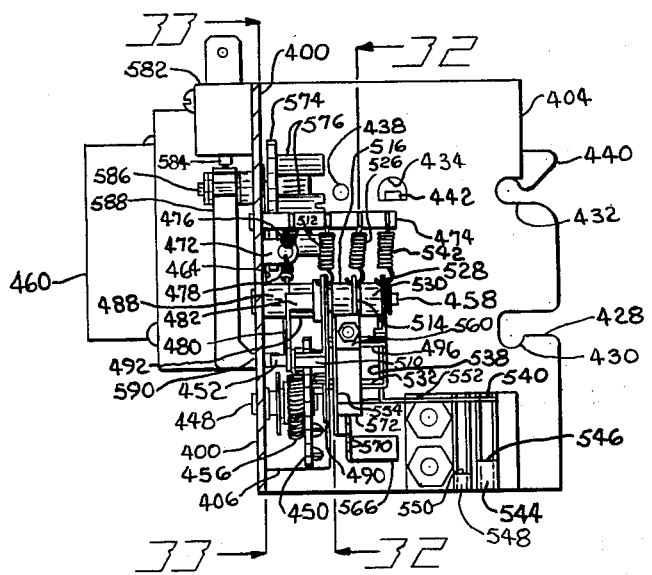
FIG_31_
INVENTOR.
GUSTAV F. ERICKSON
BY
Rey Eilers
ATTORNEY

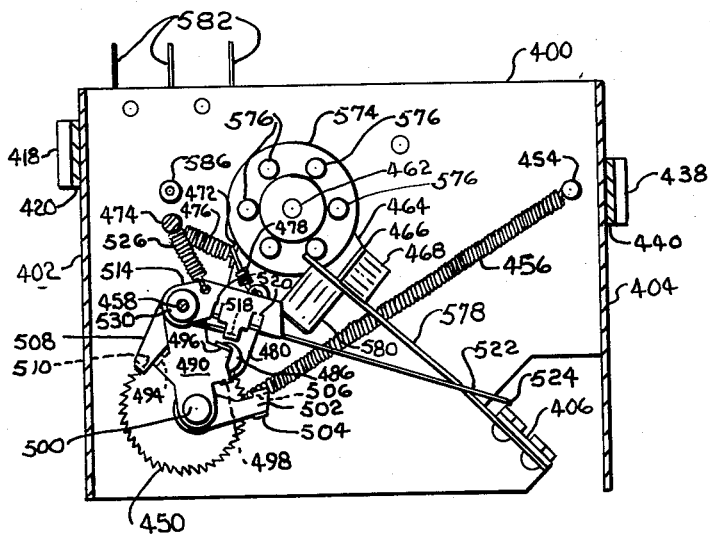
FIG_12_
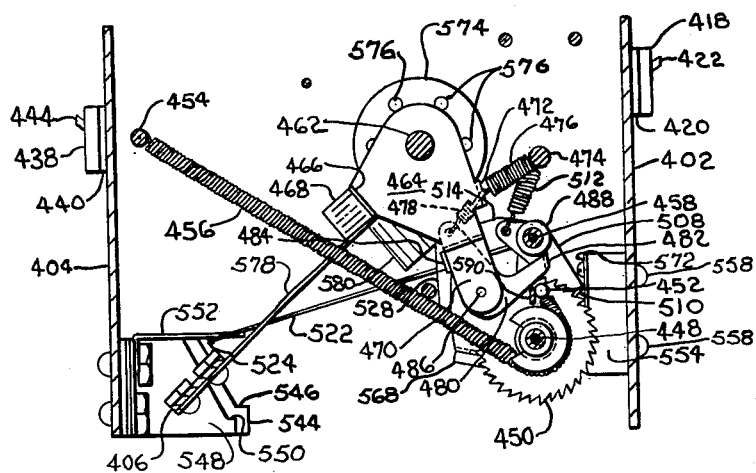
FIG_13_

Nov. 3, 1964　　　　　G. F. ERICKSON　　　　　3,155,213
MONEY-HANDLING DEVICES
Filed Oct. 26, 1961　　　　　　　　　　　13 Sheets-Sheet 13
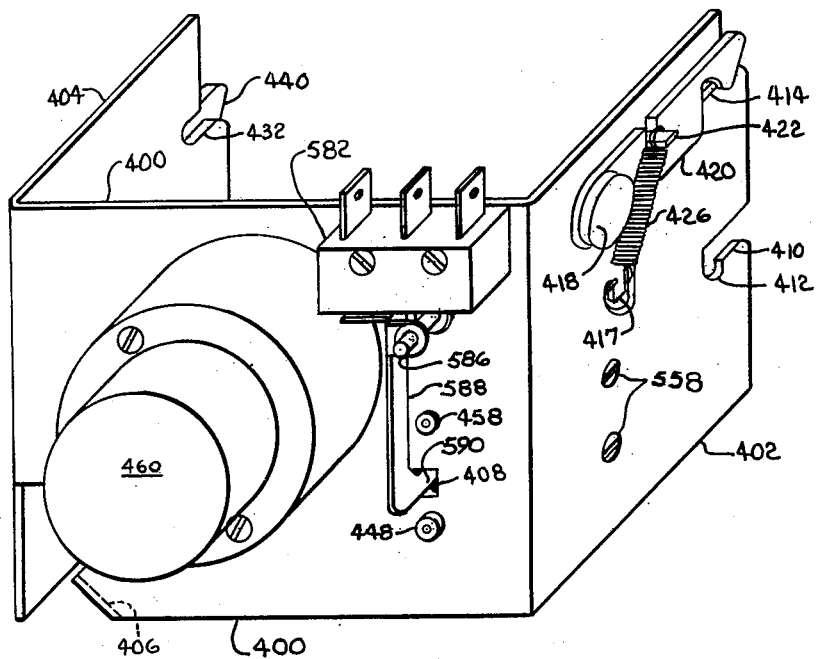
FIG_34
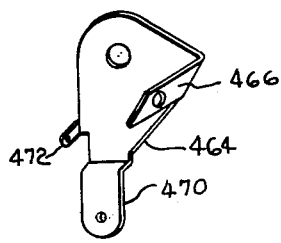
FIG_35
INVENTOR.
GUSTAV F. ERICKSON
BY
*Ray Eilers*
ATTORNEY

# United States Patent Office 3,155,213
Patented Nov. 3, 1964

3,155,213
MONEY-HANDLING DEVICES
Gustav F. Erickson, Kirkwood, Mo., assignor to National Rejectors, Inc., St. Louis, Mo., a corporation of Missouri
Filed Oct. 26, 1961, Ser. No. 147,871
30 Claims. (Cl. 194—19)

This invention relates to improvements in money-handling devices. More particularly, this invention relates to improvements in coin-handling devices.

It is, therefore, an object of the present invention to provide an improved coin-handling device.

Some coin-handling devices are intended to respond to the insertion of a single coin to effect the actuation of a controlled device, such as a vending machine, a washing machine, a dryer, or the like. While such coin-handling devices are useful, a coin-handling device which could respond to the insertion of a number of coins to effect the actuation of a controlled device would be even more useful. Such a coin-handling device would be particularly useful if it had a movable element that was movable different distances by coins of different denominations and if the number of coins which had to be inserted to effect the actuation of the controlled device could be varied. The present invention provides such a coin-handling device; and the mere shifting of a price-setting plate in that device effects the desired change in the number of coins to which that device will respond. It is, therefore, an object of the present invention to provide a coin-handling device which has a movable element that is movable different distances by coins of different denominations and which merely requires the shifting of a price-setting plate to change the number of coins to which that device will respond.

A ratchet wheel is the movable element that is movable different distances by coins of different denominations and the price-setting plate is mounted so it rotates with that ratchet wheel. Because the price-setting plate is rotatable with that ratchet wheel, each unit movement of that ratchet wheel will provide a corresponding unit movement of the price-setting plate. This is desirable because it assures precise setting of the price for the product or service to be provided by the controlled device. It is, therefore, an object of the present invention to provide a coin-handling device which has a ratchet wheel that is movable different distances by coins of different denominations and which has a price-setting plate that is rotatable with that ratchet wheel.

While the price-setting plate is normally held fixed relative to the ratchet wheel by a spring, that price-setting plate can be shifted relative to that ratchet wheel. The spring will yield to permit shifting of that price-setting plate relative to that ratchet wheel, but will thereafter again hold that price-setting plate fixed relative to that ratchet wheel. To effect shifting of that price-setting plate relative to that ratchet wheel, it is only necessary to pull an ear on that price-setting plate out of engagement with the teeth of that ratchet wheel, to rotate that price-setting plate relative to that ratchet wheel, and then to permit the spring to move that ear into engagement with further teeth on that ratchet wheel. It is, therefore, an object of the present invention to provide a coin-handling device with a ratchet wheel that is movable different distances by coins of different denominations and with a spring that normally holds a price-setting plate fixed relative to that ratchet wheel but that can yield to permit shifting of that price-setting plate relative to that ratchet wheel.

The coin-handling device provided by the present invention can be made so it can respond to coins of different denominations and so it can provide different advancements of the ratchet wheel thereof with the same movement of a coin-actuated lever. Specifically, that device can be made to respond to coins of different denominations and to provide different advancements of the ratchet wheel thereof by using an appropriate slug rejector, by using a coin-actuated lever with an actuator of the appropriate length, and by adjusting the position of an advancement-controlling plate. For example, the selection of the appropriate slug rejector, of the appropriate length actuator for the coin-actuated lever, and of the appropriate position of the advancement-controlling plate will enable the coin-handling device to respond to a nickel, to a dime, or to a quarter—responding to a nickel to provide one advancement of the ratchet wheel, responding to a dime to provide two advancements of that ratchet wheel, and responding to a quarter to provide five advancements of that ratchet wheel. To adjust the position of the advancement-controlling plate, as required for any particular coin, it is only necessary to grasp that plate and shift it to the position indicated by an appropriate numeral on that plate. It is, therefore, an object of the present invention to provide a coin-handling device and to enable appropriate selection of a slug rejector, appropriate selection of the length of actuator for the coin-actuated lever, and appropriate shifting of the advancement-controlling plate to enable that device to respond to coins of different denominations and to provide different advancements of the ratchet wheel thereof.

The coin-handling device provided by the present invention can respond to coins of different denominations and still provide readily adjustable advancements of the ratchet wheel thereof. The present invention attains this desirable result by using the advancement-controlling plate to establish the initial position of a pawl that is movable into engagement with the ratchet wheel and that subsequently rotates with that ratchet wheel. By using the advancement-controlling plate to establish the initial position of the pawl, the present invention can readily establish the total lengths of the paths of travel of that pawl and ratchet wheel when coins of different denominations are inserted. It is, therefore, an object of the present invention to provide a coin-handling device which has a ratchet wheel and which has an adjustable advancement-controlling plate that establishes the initial position of a pawl which is moved into engagement with the ratchet wheel to be rotated by that ratchet wheel.

The adjustment of the position of the advancement-controlling plate can also provide simultaneous adjustment of the lengths of the paths of travel, of the ratchet wheel, which correspond to coins of different denominations. This is desirable because it eliminates the cost and space requirements of a second adjustable advancement-controlling plate; and it is also desirable in avoiding the need of adjusting two advancement-controlling plates.

The present invention is enabled to use one pawl to provide different advancements of the ratchet wheel, when coins of different denominations are inserted, by providing the same starting point for that pawl but by providing different stopping points for that pawl. The provision of just one pawl to provide different advancements of the ratchet wheel is desirable because the coin-handling device must be actuated solely by inserted coins, and some inserted coins can be light in weight. For example, a dime is quite light in weight; and a dime might be unable to actuate a coin-handling device which used a large number of parts. It is, therefore, an object of the present invention to provide a coin-handling device wherein one pawl is associated with a ratchet wheel to provide individually different advancements of that ratchet wheel in response to the insertion of coins of different denominations.

The coin-handling device provided by the present invention has a holding pawl associated with the ratchet wheel and has one or more coin-actuated levers. Where coins of just one denomination are to be accepted, the coin-handling device will have just one coin-actuated lever, but where the coin-handling device is to accept coins of two or more different denominations, that device will have two or more coin-actuated levers. A transfer plate is disposed intermediate the holding pawl and the coin-actuated lever or levers; and that transfer plate will serve to shift the ear on the holding pawl out of engagement with the ratchet wheel. That transfer plate can be acted upon by each of the levers, but it will be acted upon by only one lever at a time. The use of one transfer plate is desirable because it makes it possible to use different combinations of coin-actuated levers with that transfer plate, and thus makes it possible to standardize many of the components of the coin-handling device and yet enable that device to respond to coins of different denominations. Furthermore, the use of one transfer plate is desirable because it reduces the total number of parts, and thus reduces the total mass, which must be moved by inserted coins. It is, therefore, an object of the present invention to provide a coin-handling device which has a holding pawl for a ratchet wheel, which has a coin-actuated lever for each denomination coin that is to be accepted, and which has a transfer plate that responds to each of said levers to shift the ear on the holding pawl out of engagement with the ratchet wheel.

Where a quarter and a dime are to be accepted by the coin-handling device, the quarter-actuated lever will initially be closely adjacent the transfer plate while the dime-actuated lever will initially be spaced away from that transfer plate. Such spacing of the coin-actuated levers is desirable because it permits full movement of the advancing pawl and of the ratchet wheel when a quarter is inserted, and because it enables a dime to get the dime-actuated lever in motion before that lever must engage and move the transfer plate. In this way, a coin as light as a dime is able to provide full actuation of the coin-handling device, and the dime-actuated lever will not interfere with full rotation of the ratchet wheel when a quarter is inserted. It is, therefore, an object of the present invention to provide a coin-handling device wherein the quarter-actuated lever is initially closely adjacent the transfer plate while the dime-actuated lever is initially spaced away from that transfer plate.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

Figure 13:
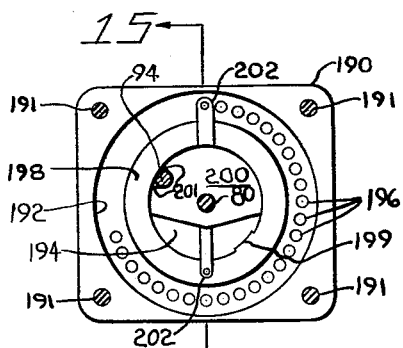
Figure 15:
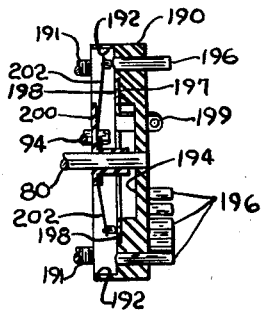
Figure 14:
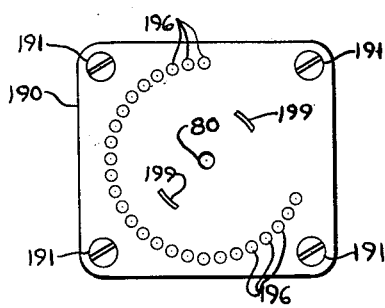
Figure 15A:
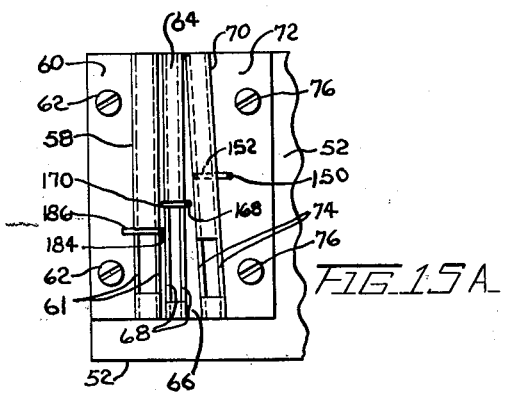

In the drawing, FIG. 1 is a partially broken-away plan view of one embodiment of coin-handling device that is made in accordance with the principles and teachings of the present invention, FIG. 2 is a broken-away, front view of the device of FIG. 1, FIG. 3 is a sectional view through the device of FIG. 1, and it is taken along the plane indicated by the line 3—3 in FIG. 1, FIG. 4 is a sectional view through the device of FIG. 1, it is taken along the plane indicated by the line 4—4 in FIG. 1, and it shows a partial movement of the dime-actuated lever by dotted lines, FIG. 5 is a sectional view through the device of FIG. 1, it is taken along the plane indicated by the line 5—5 in FIG. 1, and it shows a partial movement of the nickel-actuated lever by dotted lines, FIG. 6 is a sectional view through the device of FIG. 1, and it is taken along the plane indicated by the line 6—6 in FIG. 1, FIG. 7 is a perspective view of the transfer plate used in the device of FIG. 1 before that transfer plate has the hub or any pawls assembled with it, FIG. 8 is a perspective view of the transfer plate of FIG. 7 after the lower pawl has been assembled with that transfer plate, FIG. 9 is a side elevational view of the transfer plate of FIG. 7 after the hub and both pawls have been assembled with that transfer plate, FIG. 10 is a front view of those components of the device of FIG. 1 which respond to the insertion of a quarter, and it shows the quarter-actuated lever in moved position, FIG. 11 is a front view of those components of the device of FIG. 1 which respond to the insertion of a dime, and it shows the dime-actuated lever in moved position, FIG. 12 is a front view of those components of the device of FIG. 1 which respond to the insertion of a nickel, and it shows the nickel-actuated lever in moved position, FIG. 13 is a sectional view through the device of FIG. 1, and it is taken along the plane indicated by the line 13—13 in FIG. 1, FIG. 14 is a rear elevational view of the structure shown in FIG. 13, and it is taken along the plane indicated by the line 14—14 in FIG. 1, FIG. 15 is a sectional view through the structure shown in FIG. 13, and it is taken along the plane indicated by the line 15—15 in FIG. 13, FIG. 15A is a sectional view through the coin-handling device of FIG. 1, and it is taken along the plane indicated by the line 15A—15A in FIG. 1, FIG. 16 is a perspective view of another preferred embodiment of coin-handling device that is made in accordance with the principles and teachings of the present invention, FIG. 17 is a perspective view showing the rear of the coin-handling device of FIG. 16, FIG. 18 is a front elevational view of the coin-handling device of FIG. 16, FIG. 19 is a sectional view through the coin-handling device of FIG. 16, and it is taken along the plane indicated by the line 19—19 in FIG. 18, FIG. 20 is a sectional view through the coin-handling device of FIG. 16, and it is taken along the broken plane indicated by the broken line 20—20 in FIG. 19, FIG. 21 is a sectional view through the coin-handling device of FIG. 16, and it is taken along the plane indicated by the line 21—21 in FIG. 19, FIG. 22 is a perspective view of the price-setting plate associated with the ratchet wheel of the coin-handling device of FIG. 16, FIG. 23 is a rear elevational view of the price-setting plate of FIG. 22 and of the ratchet wheel and latch of the coin-handling device of FIG. 16, and it shows how the price-setting plate rotates with that ratchet wheel to release that latch, FIG. 24 is a rear elevational view of the structure shown in FIG. 23, and it shows how a different setting of the price-setting plate effects releasing of the latch with a shorter rotation of the ratchet wheel, FIG. 25 is a perspective view of the transfer plate of the coin-handling device of FIG. 16 before that transfer plate has either pawl assembled with it, FIG. 26 is a front view of those components of the coin-handling device of FIG. 16 which move in response to the insertion of a quarter, it shows the quarter-actuated lever in moved position, and it shows how far the ratchet wheel moves when the advancement-controlling plate is in one position, FIG. 27 is a front elevational view that is similar to FIG. 26 but it shows how far the ratchet wheel moves when the advancement-controlling plate is set in a different position, FIG. 28 is a front elevational view of those components of the coin-handling device of FIG. 16 which move in response to the insertion of a nickel and a dime, and it shows the dime-actuated lever in moved position, FIG. 29 is a front elevational view of another embodiment of coin-handling device that is made in accordance with the principles and teachings of the present invention, FIG. 30 is a perspective view of the coin-handling device shown in FIG. 29, FIG. 31 is a sectional view through the coin-handling device of FIG. 29, and it is taken along the plane indicated by the line 31—31 in FIG. 29, FIG. 32 is a sectional view through the coin-handling device of FIG. 29, and it is taken along the broken plane indicated by the broken line 32—32 in FIG. 31, FIG. 33 is a sectional view through the coin-handling device of FIG. 29, and it is taken along the plane indicated by the line 33—33 in FIG. 31, FIG. 34 is a perspective view showing the rear of the coin-handling device of FIG. 29, and FIG. 35 is a perspective view of the restoring plate of the coin-handling device of FIG. 29 before the weight and pawl are assembled with that plate.

Referring to the drawing in detail, the numeral 50 denotes the main plate of one embodiment of money-handling device that is made in accordance with the principles and teachings of the present invention. That main plate is rectangular in elevation, as shown by FIG. 2, it has a vertically-directed flange 52 at the left-hand side thereof, it has a vertically-directed flange 54 at the right-hand side thereof, and it has a horizontally-directed flange 56 at the top thereof. The flange 56 extends rearwardly from the main plate 50 while the flanges 52 and 54 extend forwardly from that main plate. A generally U-shaped coin chute 58 is secured to the inner face of the flange 52, as by having fasteners 62 extend through openings in a vertically-directed flange 60 on that chute and seat in threaded openings in the flange 52. The closed-end of that U-shaped coin chute has a notch 61 therein, as shown particularly by FIG. 2. A second U-shaped coin chute 64 is disposed adjacent the chute 58, and that second coin chute has a vertically-directed flange 66 abutting the inner face of the flange 52. The closed end of the U-shaped coin chute 64 has a notch 68 therein, as shown particularly by FIG. 4. A third generally U-shaped coin chute 70 is disposed adjacent the U-shaped coin chute 64, and a vertically-directed flange 72 on the U-shaped coin chute 70 abuts the inner face of the flange 66 on the U-shaped coin chute 64. Fasteners 76 extend through the flanges 72 and 66, respectively, of the U-shaped coin chutes 70 and 64 to seat in threaded openings in the flange 52. A notch 74 is formed in the closed end of the U-shaped coin chute 70, as shown particularly by FIG. 5. The lower ends of the coin chutes 64 and 70 are spaced apart a greater distance than are the upper ends of those coin chutes; all as shown by FIG. 15A. Speed-reducing pins 71 are mounted in coin chute 58.

The main plate 50 has an arcuate slot 78 therein, and that slot is shown by FIG. 3. An opening is formed in the main plate 50 at the geometric center of the arcuate slot 78, and a pivot 80 is fixedly disposed within that opening. That pivot projects forwardly and rearwardly, respectively, from the front and rear faces of the main plate 50.

A pivot 82 is fixedly secured to the main plate 50, and that pivot projects forwardly from the front face of that main plate. That pivot is disposed to the right of the pivot 80, as those pivots are viewed in FIG. 3. A pivot 84 is fixedly secured to the main plate 50 and that pivot also projects forwardly from the front face of that main plate. The pivot 84 is disposed above, and in vertical registry with, the pivot 80, as indicated by FIG. 3; and it is disposed to the right of, and above the level of, the pivot 82, as those pivots are viewed in FIG. 2. An elongated pin 86 is fixedly secured to the main plate 50 and projects forwardly from the front face of that main plate. That pin is disposed above, and in vertical registry with, the pivots 80 and 84, as shown by FIG. 3. A short pin 88 is fixedly secured to the main plate 50 and projects forwardly from the front face of that main plate. The pin 88 is closely adjacent the flange 52 and is also closely adjacent the upper edge of the main plate 50.

The numeral 92 denotes a ratchet wheel which has a hub that is telescoped over the pivot 80; and that ratchet wheel has the toothed portion thereof spaced from the main plate 50 by the hub thereof. A pinion 90 is fixedly pressed onto the hub portion of the ratchet wheel 92, as shown by FIG. 6; and that pinion will rotate with that ratchet wheel. A bushing 93 is telescoped within the hub of the ratchet wheel 92; and that bushing is telescoped over, and rotates relative to, the pivot 84; all as shown by FIG. 6. A pin 94 is fixedly secured to the ratchet wheel 92, and that pin projects toward the main plate 50 and extends through and beyond the arcuate slot 78 in that main plate. A C-washer, or other suitable element, not shown, will be used to maintain the ratchet wheel 92 in assembled relation with the pivot 80 while permitting ready rotation of that ratchet wheel relative to that pivot. A washer, not shown, is telescoped over the pivot 80, and that washer abuts the front face of the main plate 50. That washer is interposed between the main plate 50 and the hub potrion of the ratchet wheel 92, and it minimizes the frictional forces which act upon the ratchet wheel 92.

The numeral 106 denotes a washer which is telescoped over the pivot 82 and which abuts the front face of the main plate 50. A toothed segment 98 has a hub 100, and that hub also is telescoped over the pivot 82. The washer 106 serves to hold the teeth of the toothed segment 98 in register with the teeth of the pinion 90 and to minimize the frictional forces which act upon that segment. The teeth of the pinion 90 and of the toothed segment 98 are made so they mesh properly with each other. A pin 102 is secured to the toothed segment 98, and a second pin 104 is secured to that toothed segment; and both of those pins project forwardly from the front face of that segment. A C-washer, or other element, will be used to suitably maintain the toothed segment 98 in assembled relation with the pivot 82 while permitting ready rotation of that toothed segment relative to that pivot.

The numeral 108 denotes a helical extension spring which has a loop at the lower end thereof telescoped over the pin 102 and which has a loop at the upper end thereof telescoped over the pin 88. That spring biases the toothed segment 98 for rotation in the counter clockwise direction about the pivot 82 in FIG. 2; but that spring can yield to permit clockwise rotation of that toothed segment. In biasing the toothed segment 98 for rotation in the counter clockwise direction, the spring 108 also biases the ratchet wheel 92 for rotation in the clockwise direction in FIG. 2.

The numeral 110 generally denotes a transfer plate which has a shouldered hub 112 secured thereto; and that hub telescopes over the pivot 84. A weight 114 is secured to an arm of the transfer plate 110 which extends upwardly above the level of the shouldered hub 112; and that weight is disposed to the right of the pivot 84 while the center of mass of the transfer plate 110 is disposed to the left of that pivot. An ear 116 is provided on the transfer plate 110, and that ear extends rearwardly from the rear face of the transfer plate 110 but stops short of the ratchet wheel 92. An ear 118 also is formed on the transfer plate 110, and that ear extends forwardly from the front face of that transfer plate. A third ear 120 is formed on the transfer plate 110, and that ear also extends forwardly from the front face of that transfer plate. The ear 120 is much longer than either of the ears 116 and 118; and the front end of that ear is spaced from the main plate 50 about the same distance which the front end of the pin 86 is spaced from that main plate.

The shoulder on the hub 112 of the transfer plate 110 coacts with the rear face of that transfer plate to define an annular recess adjacent the rear face of that transfer plate, as that transfer plate is viewed in FIG. 2. A pawl 122 has a portion thereof disposed within that recess, and that pawl is able to rotate relative to that transfer plate and relative to that hub. The pawl 122 will be telescoped onto the shoulder of the shouldered hub 112 before that hub is assembled with the transfer plate 110; and that transfer plate and that hub will coact to prevent separation of that pawl from that transfer plate. The pawl 122 has an ear 124 thereon adjacent the free end thereof; and that ear extends rearwardly from the plane of that pawl but stops short of the main plate 50. The pawl 122 also has an ear 126 which lies in the plane of that pawl; and that ear has an opening therein, as shown by FIG. 6.

The numeral 128 denotes a pawl which has an ear 130 that extends rearwardly from the plane of that pawl but which stops short of the main plate 50. That pawl also has an ear 132 which extends forwardly from the plane of that pawl. A pivot 134 is secured to the lower end of the transfer plate 110, and that pivot rotatably secures the pawl 128 to that transfer plate.

A helical extension spring 136 has the lower end thereof hooked through the opening in the ear 126 on the pawl 122, and has the upper end thereof hooked around the pin 86, as shown by FIG. 6. That spring biases the ear 124 on the pawl 122 into engagement with the teeth of the ratchet wheel 92, and thereby causes that ear to normally prevent clockwise rotation of that ratchet wheel, as that ratchet wheel is viewed in FIG. 2. However, that spring can yield to permit that ear to move away from those teeth and thereby permit that ratchet wheel to rotate in the clockwise direction. The ear 116 on the transfer plate 110 will respond to counter clockwise rotation of that transfer plate in FIG. 2 to move the ear 124 on the pawl 122 out of engagement with the teeth on the ratchet wheel 92.

The numeral 138 denotes a coin-actuated lever which is shown particularly by FIGS. 5 and 12, and that lever has a hub 142. That hub is telescoped over the pivot 84, it is closely adjacent the shouldered hub 112 of the transfer plate 110, and it permits the lever 138 to rotate relative to the pivot 84. A weight 140 is secured to the right-hand end of the lever 138, as that lever is viewed in FIG. 5; and that weight is disposed to the right of the pivot 84 while the center of mass of the lever 138 is disposed to the left of that pivot. An opening is formed in the lever 138 at a point to the left of the pivot 84 in FIG. 5, and a helical extension spring 154 has the lower end thereof hooked through that opening. The upper end of that helical extension spring is hooked over the pin 86; and hence that spring will bias the lever 138 for rotation in the clockwise direction in FIG. 5. However, that spring will be able to yield to permit rotation of that lever in the counter clockwise direction.

The lever 138 has an ear 144 thereon, and that ear extends rearwardly a short distance from the plate of that lever; and that ear overlies and is in register with the ear 120 on the transfer plate 110. A second and longer ear 146 also extends rearwardly from the plane of the lever 138; and that ear is located adjacent the free end of that lever. Two further ears 148 extend short distances rearwardly from the plane of the lever 138; and those two ears coact with the ear 144 to support one end of an actuator 150 which has a coin-receiving portion 152. That coin-receiving portion is disposed within the notch 74 in the closed end of the U-shaped coin chute 70, as shown by FIG. 5. The manner of securing the actuator 150 to the lever 138 is shown and described in detail in my co-pending application Serial No. 808,669 for Coin Separators which was filed April 24, 1959.

The numeral 156 denotes a coin-actuated lever which is shown particularly by FIGS. 4 and 11, and that lever has a hub 160. That hub is telescoped over the pivot 84, it is closely adjacent the hub 142 of the lever 138, and it permits the lever 156 to rotate relative to the pivot 84. A weight 158 is secured to the right-hand end of the lever 156, as that lever is viewed in FIG. 11; and that weight is disposed to the right of the pivot 84 while the center of mass of the lever 156 is disposed to the left of that pivot. A short ear 162 is provided on the lever 156, and that ear extends forwardly from the plane of that lever. An ear 164 which is longer than the ear 162 is provided adjacent the free end of the lever 156, and the ear 164 extends rearwardly from the plane of that lever, as shown by FIG. 1. Two ears 166 are provided on the lever 156, and those ears extend forwardly short distances from the plane of that lever; and those two ears coact with the ear 162 to hold the right-hand end of an actuator 168 which has a coin-receiving portion 170. That coin-receiving portion extends into the notch 68 in the closed end of the coin chute 64. A helical extension spring 172 has the lower end thereof hooked through an opening in the lever 156 which is disposed to the left of the pivot 84, and has the upper end thereof hooked around the pin 86. That spring will thus bias the lever 156 for rotation in the clockwise direction in FIG. 4, but can yield to permit rotation of that lever in the counter clockwise direction.

The numeral 174 denotes a coin-actuated lever which is shown particularly by FIGS. 2 and 10, and that lever has a hub 178. That hub is telescoped over the pivot 84, it is closely adjacent the hub 160 of the lever 156, and it permits the lever 174 to rotate relative to the pivot 84. A weight 176 is secured to the right-hand end of the lever 174; and that weight is disposed to the right of the pivot 84 while the center of mass of the lever 174 is disposed to the left of that pivot. An ear 180 is formed on the lever 174, and that ear extends a short distance forwardly from the plane of that lever. Two ears 182 extend forwardly short distances from the plane of the lever 174, and those ears coact with the ear 180 to hold an actuator 184 which has a coin-receiving portion 186. That coin-receiving portion is disposed within the notch 61 in the closed end of the coin chute 58. A helical extension spring 188 has the lower end thereof hooked through an opening in the lever 174 which is disposed to the left of the pivot 84 and has the upper end thereof hooked around the pin 86. That spring will thus bias the lever 174 for rotation in the clockwise direction in FIG. 2, but can yield to permit rotation of that lever in the counter clockwise direction.

The ears 144, 162 and 180, respectively, of the levers 138, 156 and 174 are in register with, and are above, the ear 120 which extends forwardly from the transfer plate 110. The ear 180 is initially disposed immediately adjacent the ear 120, as shown by FIG. 2, the ear 162 is normally disposed a short distance above the ear 120, as shown by FIG. 4, and the ear 144 is disposed even further above the ear 120, as shown by FIG. 5.

The weights 114, 140, 158 and 176 are so dimensioned, and are so positioned on the transfer plate 110 and on the coin-actuated levers 138, 156 and 174, that they render that transfer plate and those coin-actuated levers statically balanced prior to the time the springs 154, 172 and 188 are connected to those coin-actuated levers. This is desirable, because it minimizes the possibility that persons could effect rotation of that transfer plate or of any of those coin-actuated levers by applying sharp blows to the device in which the coin-handling device of FIG. 1 is mounted.

The numeral 190 denotes a block of insulation which is shown in FIGS. 13 and 14 as being generally rectangular in elevation. That block is secured to the rear face of the main plate 50 by fasteners 191, shown as screws, which extend through openings in that block and seat in threaded openings in that main plate. A generally cylindrical recess 192 is formed in the front face of the block 190, and a smaller cylindrical recess 194 is formed in the block 190 and is contiguous with, and concentric with, the recess 192. A number of contacts 196 are held within openings in the block 190, and those contacts have generally spherical faces which abut the inner face of the recess 192. Those contacts have tubular shanks which project outwardly from the rear face of the block 190, and those shanks readily accommodate the ends of conductors. A metallic ring 198 is lodged within a shallow annular recess 197 that is intermediate the recesses 192 and 194; and the front face of that ring will lie in the plane of the inner face of the recess 192.

Terminals 199 extend rearwardly from the ring 198 and extend through openings in the block 190, and one of these terminals can accommodate a conductor. Those terminals can be suitably bent to enable them to fixedly hold the ring 198 in position within the recess 197. A rotor 200 has a hub which telescopes over the pivot 80, and that hub permits that rotor to rotate relative to that hub. That rotor is disposed within the recess 192, and it has a notch 201 in the periphery thereof which accommodates the pin 94 carried by the ratchet wheel 92; and that pin will cause the rotor 200 to rotate whenever the ratchet wheel 92 rotates. A wiper 202 is secured to the rotor 200, and one terminal of that wiper will continuously engage the ring 198 while the other terminal of that wiper will engage the front faces of various of the contacts 196.

A solenoid, a mechanical linkage, or the like, not shown, will be suitably connected to the pin 104 of the toothed segment 98; and that solenoid, mechanical linkage, or the like will be controlled by the device with which the money-handling device of FIGS. 1–15A is used. That solenoid, mechanical linkage, or the like will pull downwardly on the pin 104 at some time prior to, during, or after the conclusion of each cycle of operation of that device; and that downward pull will move the toothed segment 98 to the position shown by FIGS. 2 and 4–6 and by solid lines in FIGS. 10–12. Further downward movement of the toothed segment 98 will be prevented by the engagement of the pin 94, carried by the ratchet wheel 92, with one end of the arcuate slot 78, as shown by FIG. 3.

In the normal, at-rest condition of the money-handling device of FIGS. 1–15A, the spring 136 biases the pawl 122, adjacent transfer plate 110 for rotation in the clockwise direction in FIG. 2 and thereby holds the ear 124 on that pawl in engagement with one of the teeth on the ratchet wheel 92. In doing so, that spring and that pawl normally keep that ratchet wheel from rotating in the clockwise direction in response to the bias which is applied to that ratchet wheel by the spring 108 via toothed segment 98 and pinion 90. Also, the springs 154, 172 and 188, respectively, bias the levers 138, 156 and 174 for rotation in the clockwise direction in FIG. 2. The engagements between the coin-receiving portions 152, 170 and 186 of the actuators 150, 168 and 184 with the upper ends of the notches 74, 68 and 61 of the coin chutes 70, 64 and 58 limit the clockwise rotation of the levers 138, 156 and 174 to the positions shown by FIG. 2. The transfer plate 110 has its ear 116 immediately adjacent the pawl 122, and has its ear 118 underlying and supporting the pawl 128. The ear 130 on that pawl is disposed out of the path of the teeth on ratchet wheel 92. The weights 114, 140, 158 and 176 coact, as stated hereinbefore, with the masses of transfer plate 110 and coin-actuated levers 138, 156 and 174 to statically balance that transfer plate and those coin-actuated levers. The pin 94 on the ratchet wheel 92 is adjacent the upper end of arcuate slot 78, as shown by FIG. 3, and the wiper 202 has one terminal therof in engagement with the ring 198 but has the other terminal thereof out of engagement with all of the contacts 196.

The coin chutes 70, 64 and 58 are intended to accommodate coins of different denominations. In one preferred embodiment of the present invention, those coin chutes are, respectively, intended to accommodate nickels, dimes and quarters.

The increased spacing between the bottoms of the coin chutes 70 and 64, as against the spacing between the tops of those coin chutes, is important in providing free movement of the actuator 168 relative to the coin chute 70 while permitting the tops of those coin chutes to be in register with the coin exits of the slug rejector, not shown. It will be noted, from a comparison of FIGS. 4 and 5, that the coin-receiving portion 170 of the actuator 168 extends to the left beyond the coin-receiving portion 152 of the actuator 150 and also extends beyond the left-hand edge of the notch 74 in the coin chute 70. However, because of the increased spacing between the bottoms of the coin chutes 70 and 64, the actuator 168 and its coin-receiving portion 170 can move freely without engaging the coin chute 70. The fact that the notches 61, 68 and 74 open to the right in FIGS. 2, 4 and 5 is important in facilitating the assembling of the coin-actuated levers 174, 156 and 138 with the pivot 84. Specifically, those notches make it possible to telescope the hubs of those coin-actuated levers over the pivot 84 even though the actuators 184, 168 and 150, respectively, are fixedly secured to those coin-actuated levers.

When a nickel is introduced into the coin chute 70, as by a slug rejector, not shown, that nickel will engage the coin-receiving portion 152 of the actuator 150 and will overcome the bias provided by the spring 154. Thereupon, the coin-actuated lever 138 will rotate in the counter clockwise direction in FIG. 2 and will cause the ear 144 thereon to move down into engagement with the ear 120 on the transfer plate 110. That movement will occur while the coin-receiving portion 152 of the actuator 150 is spaced from the flange 66 on the U-shaped coin chute 64 a distance less than the diameter of the nickel. As a result, that nickel will have to force the actuator 150 further downwardly in order to pass through, and to move downwardly beyond, the coin chute 70. Such further movement of the actuator 150 will cause the ear 144 on the coin-actuated lever 138 to act through the ear 120 on the transfer plate 110 to rotate that transfer plate in the counter clockwise direction about the pivot 84; and such rotation will cause the ear 130 on the pawl 128 to move into the path of a tooth on the ratchet wheel 92. That further movement of the actuator 150 also will cause the ear 146 on the coin-actuated lever 138 to move into the path of a further tooth on that ratchet wheel. Still further downward movement of the actuator 150 will cause the ear 116 on the transfer plate 110 to force the ear 124 on the pawl 122 out of the path of the teeth on the ratchet wheel 92. The spring 108 will then act through the segment 98 and the pinion 90 to rotate the ratchet wheel 92 in the clockwise direction until the said further tooth on that ratchet wheel engages and is held by the ear 146. As the ratchet wheel 92 so rotates, it will raise the pawl 128 up away from the ear 118 on the transfer plate 110. The result is that the downward movement of the actuator 150 will be able to effect clockwise advancement of the ratchet wheel 92 a distance less than the width of a tooth on that ratchet wheel.

After the nickel moves beyond the coin-receiving portion 152 of the actuator 150, the spring 154 will cause the coin-actuated lever 138 to move back toward its normal position. As that lever does so, it will move the ear 144 upwardly; and thereupon the bias of the spring 136 will force the ear 124 on the pawl 122 to move back into the path of the teeth of the ratchet wheel 92. As that ear so moves, it will move into position to intercept and hold the tooth which was above the tooth originally held by that ear. The spring 136 also will cause the pawl 122 to act through the ear 116 on the transfer plate 110 to move that transfer plate back to its normal position;

and, as that transfer plate so moves, it will act through the pivot 134 to move the ear 130 on the pawl 128 out of the path of the first said tooth on the ratchet wheel 92. Almost simultaneously, the coin-actuated lever will move the ear 146 thereon out of the path of said further tooth on that ratchet wheel and thereupon the spring 108 will act through the segment 98 and the pinion 90 to rotate the ratchet wheel 92 in the clockwise direction until the ear 124 halts that rotation. As the ear 130 on the pawl 128 is moved out of the path of the teeth on the ratchet wheel 92, that pawl will fall downwardly and again come to rest upon the ear 118 on the transfer plate 110.

The overall result is that the insertion of a nickel will cause the coin-handling device of FIGS. 1–15A to advance the ratchet wheel 92 in the clockwise direction a distance equal to the width of one tooth. As that ratchet wheel so advances, the wiper 202 will advance until the upper terminal thereof is in engagement with the first of the contacts 196.

If the controlled device, with which the coin-handling device of FIGS. 1–15A is used, is intended to be actuated upon the insertion of a nickel, the movement of the upper terminal of the wiper 202 into engagement with the first of the contacts 196 will complete a circuit that will initiate a cycle of operation of that controlled device. At some time during, or subsequent to, that cycle of operation of that controlled device, the solenoid, the mechanical linkage, or the like, not shown, will apply a downward pull to the pin 104. That downward pull will urge the segment 98 to rotate down toward its normal position, and will thus urge the ratchet wheel 92 to rotate in the counter clockwise direction. The inclined face, of that tooth on the ratchet wheel 92 which is immediately below the ear 124 on the pawl 122, will respond to the counter clockwise forces applied to the ratchet wheel 92 by the downward pull on the segment 98 to cam that ear out of engagement with that tooth and thereby permit the ratchet wheel 92 to rotate back to its normal position. As the pin 94 again abuts the upper end of the arcuate slot 78 in the main plate 50, the ratchet wheel 92 will come to rest; and thereupon the spring 136 will again force the ear 124 on the pawl 122 into holding engagement with the ratchet wheel 92.

If the controlled device, with which the coin-handling device of FIGS. 1–15A is used, is set to require the insertion of ten cents, a second nickel would have to be inserted. That second nickel would cause the coin-actuated lever 138 to rotate in the counter clockwise direction and then free that lever for rotation in the clockwise direction. Such rotation of the coin-actuated lever 138 would permit the ratchet wheel 92 to advance in the clockwise direction a distance equal to the width of one tooth, in the manner described hereinbefore. That advancement would place the upper terminal of the wiper 202 in engagement with the second contact 196; and thereupon a circuit would be completed that would initiate a cycle of operation of that controlled device. Either during, or subsequent to, the ensuing cycle of operation of that controlled device, a downward pull will be applied to the pin 104; and that downward pull will cause the segment 98 to act through the pinion 90 to return the ratchet wheel 92 to its normal position.

If the controlled device, with which the coin-handling device of FIGS. 1–15A is used, was set to require the insertion of twenty-five cents, five nickels could be introduced. Each nickel would cause the coin-actuated lever 138 to rotate in the counter clockwise direction and then free that lever for rotation in the clockwise direction. Each such rotation of the coin-actuated lever 138 would effect an advancement of the ratchet wheel 92 a distance in the clockwise direction equal to the width of one tooth; in the manner described hereinbefore. The overall result is that the upper terminal of the wiper 202 would be moved into engagement with the fifth contact 196; and thereupon a circuit would be completed that would initiate a cycle of operation of that controlled device. Either during, or subsequent to, the ensuing actuation of that controlled device, the segment 98 would be pulled downwardly and would cause the ratchet wheel 92 to be restored to its normal position.

The coin-handling device of FIGS. 1–15A has twenty-five contacts 196, and each contact can represent five cents. Consequently, controlled devices with which the coin-handling device of FIGS. 1–15A is used can establish sales prices from five cents through one dollar and twenty-five cents. Further, by equipping such controlled devices with penny-dispensing mechanisms, sales prices from one cent through one dollar and twenty-five cents can be established.

If the controlled device, with which the coin-handling device of FIGS. 1–15A is used, is set to require the insertion of ten cents, a dime can be introduced into the coin chute 64, as by the slug rejector, not shown. That dime will engage the coin-receiving portion 170 of the actuator 168 and will overcome the bias provided by the spring 172. Thereupon, the coin-actuated lever 156 will rotate in the counter clockwise direction in FIG. 2 and will cause the ear 162 thereon to move down for engagement with the ear 120 on the transfer plate 110. That movement will occcur while the coin-receiving portion 170 of the actuator 168 is spaced from the flange 52 a distance less than the diameter of the dime. As a result, that dime will have to force the actuator 168 further downwardly in order to pass through, and to move downwardly beyond, the coin chute 64. Such further movement of the actuator 168 will cause the ear 164 on the coin-actuated lever 156 to move into position above the ear 132 on the pawl 128 and will move the ear 162 on that coin-actuated lever into engagement with the ear 120 on the transfer plate 110. Still further downward movement of the actuator 168 will cause the ear 130 on the pawl 128 to move into the path of a tooth on the ratchet wheel 92; and the final downward movement of the actuator 168 will cause the ear 116 on the transfer plate 110 to move the ear 124 on the pawl 122 out of the path of the teeth on the ratchet wheel 92. The spring 108 will then act through the segment 98 and the pinion 90 to rotate the ratchet wheel 92 in the clockwise direction, and the ear 130 will force the pawl 128 to rotate with that ratchet wheel. The rotation of that pawl aand ratchet wheel will be stopped by the engagement of the ear 132 on that pawl with the ear 164 on the coin-actuated lever 156; but that rotation will be long enough to enable the ratchet wheel 92 to advance a distance just less than the width of two teeth.

It will be noted that when the dime was inserted, the ratchet wheel 92 advanced in one rather than in two steps. specifically, the ratchet wheel 92 was freed for rotation in the clockwise direction by the right-hand movement of the ear 124 on pawl 122, and that ratchet wheel rotated freely until the ear 132 on the pawl 128 engaged and was held by the ear 164 on the lever 156. The length of the downwardly-directed portion of lever 156, on which the ear 164 is formed, is dimensioned so the rotation of the ratchet wheel 92 was just less than the width of two teeth.

After the dime moves beyond the coin-receiving portion 170 of the actuator 168, the spring 172 will cause the coin-actuated lever 156 to move back toward its normal position. As that lever does so, it will move the ear 162 thereon far enough upwardly to permit the spring 136 to force the ear 124 on the pawl 122 to move back into the path of the teeth of the ratchet wheel 92. As that ear so moves, it will move into position to intercept and hold one of the teeth which was above the tooth originally held by that ear. The spring 136 also will cause the pawl 122 to act through the ear 116 on the transfer plate 110 to move that transfer plate back to its normal position; and, as that transfer plate so moves, it will act through the pivot 134 to move the ear 130 on the pawl 128 out of the path of the teeth on that ratchet wheel. Thereupon the spring 108 will act through the segment 98 and the pinion 90 to rotate the ratchet wheel 92 in the clockwise direction until the ear 124 halts that rotation. As the ear 130 on the pawl 128 is moved out of the path of the teeth on the ratchet wheel 92, that pawl will fall downwardly and again come to rest upon the ear 118 on the transfer plate 110. The coin-actuated lever 156 will respond to the spring 172 to return to the position shown by FIG. 2.

The overall result is that the insertion of a dime will cause the coin-handling device of FIGS. 1-15A to advance the ratchet wheel 92 in the clockwise direction a distance equal to the width of two teeth. As that ratchet wheel so advances, the wiper 202 will advance until the upper terminal thereof is in engagement with the second contact 196; and thereupon a circuit will be completed which will initiate a cycle of operation of the controlled device.

During, or subsequent to, the ensuing cycle of operation of the controlled device, with which the coin-handling device of FIGS. 1-15A is used, a downward pull will be applied to the pin 104 and the segment 98 will act through the pinion 90 to restore the ratchet wheel 92 to its normal position. The inclined faces of the teeth on the ratchet wheel 92 will readily cam the ear 124 on pawl 122 outwardly during the restoring movement of that ratchet wheel.

If the sales price, called for by the device with which the coin-handling device of FIGS. 1-10 is used, requires the insertion of a number of dimes, each dime will effect rotation of the lever 156 in the counter clockwise direction and then will permit that lever to rotate back to its normal position. Each dime will effect an advancement of the ratchet wheel 92 in the clockwise direction a distance equal to the width of two teeth of that ratchet wheel; and, as a result, the wiper 202 will advance a distance equal to two contacts 196.

In the event the sales price, called for by the device with which the coin-handling device of FIGS. 1-15A is used, is twenty-five cents, one nickel and two dimes can be inserted; and the nickel will advance the ratchet wheel 92 a distance equal to the width of one tooth, and each of the dimes will advance that ratchet wheel a distance equal to the width of two teeth. If desired, three nickels and one dime can be inserted; and each nickel will advance the ratchet wheel 92 a distance equal to the width of one tooth, and the dime will advance that ratchet wheel a distance equal to the width of two teeth. Further, if desired, a quarter can be inserted in the coin chute 58, as by the slug rejector, not shown. That quarter will engage the coin-receiving portion 186 of the actuator 184 and will overcome the bias provided by the spring 188. Thereupon the coin-actuated lever 174 will rotate in the counter clockwise direction in FIG. 2 and will enable the ear 180 thereon to act through the ear 120 on the transfer plate 110 to move the ear 130 on the pawl 128 into the path of the teeth on the ratchet wheel 92. Further counter clockwise rotation of the coin-actuated lever 174 will cause the ear 116 on the transfer plate 110 to move the ear 124 on the pawl 122 out of the path of the teeth on the ratchet wheel. The spring 108 will then act through the segment 98 and the pinion 90 to rotate the ratchet wheel 92 in the clockwise direction; and the pawl 128 will rotate with that ratchet wheel, because the coin-actuated lever 174 will be holding the transfer plate 110 in its counter clockwise position and the pivot 134 will always hold the ear 130 in engagement with a tooth of that ratchet wheel whenever that transfer plate is in its couner clockwise position. As the pawl 128 rotates with the ratchet wheel 92, the ear 132 thereon will move upwardly into engagement with the left-hand edge of the transfer plate 110 and will be held against further rotation. Because the ear 132 will be held against further rotation, the ratchet wheel 92 also will be held against further rotation; but the rotation of the ratchet wheel 92 will have been almost equal to the width of five teeth on that ratchet wheel.

After the quarter moves beyond the coin-receiving portion 186 of the actuator 184, the spring 188 will cause the coin-actuated lever 174 to move back toward its normal position. As that lever does so, it will move the ear 180 upwardly; and thereupon the bias of the spring 136 will force the ear 124 on the pawl 122 to move back into the path of the teeth of the ratchet wheel 92. As that ear so moves, it will move into position to intercept and hold a tooth which was above the tooth originally held by that ear. The spring 136 also will cause the pawl 122 to act through the ear 116 on the transfer plate 110 to move that transfer plate back to its normal position; and, as that transfer plate so moves, it will act through the pivot 134 to move the ear 130 on the pawl 128 out of the path of the teeth on the ratchet wheel 92; and thereupon the spring 108 will act through the segment 98 and the pinion 90 to rotate the ratchet wheel 92 in the clockwise direction until the ear 124 halts that rotation. As the ear 130 on the pawl 128 is moved out of the path of the teeth on the ratchet wheel 92, that pawl will fall downwardly and again come to rest upon the ear 118 on the transfer plate 110. The coin-actuated lever 174 will respond to the spring 188 to return to the position shown by FIG. 2.

The overall result is that the insertion of a quarter will cause the coin-handling device of FIGS. 1-15A to advance the ratchet wheel 92 in the clockwise direction a distance equal to the width of five teeth. As that ratchet wheel so advances, the wiper 202 will advance until the upper terminal thereof is in engagement with the fifth contact 196; and thereupon a circuit will be completed which will initiate a cycle of operation of the controlled device.

During, or subsequent to, the ensuing cycle of operation of the controlled device, with which the coin-handling device of FIGS. 1-15A is used, a downward pull will be applied to the pin 104 and the segment 98 will act through the pinion 90 to rotate the ratchet wheel 92 back to its normal position. The inclined faces of the teeth on the ratchet wheel 92 will readily cam the ear 124 on the pawl 122 outwardly during the restoring movement of that ratchet wheel.

If the controlled device, with which the coin-handling device of FIGS. 1-15A is used, is intended to establish a sales price requiring the insertion of a number of quarters, each quarter will cause the lever 174 to rotate in the counter clockwise direction and will then free that lever for rotation back to its normal position. Each insertion of a quarter will provide an advancement of the ratchet wheel 92 in the clockwise direction a distance equal to the width of five teeth on that ratchet wheel.

Where desired, any combination of nickels, dimes and quarters can be inserted, and those quarters can be inserted in random sequence. Each quarter will cause the ratchet wheel 92 to advance a distance equal to the width of five teeth, each dime will cause that ratchet wheel to advance a distance equal to two teeth, and each nickel will cause that ratchet wheel to advance a distance equal to one tooth. Then, during or after the cycle of operation of the controlled device, with which the coin-handling device of FIGS. 1-15A is used, the solenoid mechanical linkage, or the like will apply a downward force to the pin 104 and act through the segment 98 and the pinion 90 to restore the ratchet wheel 92 to its normal position.

The coin-handling device of FIGS. 1-15A has a nickel-actuated lever, a dime-actuated lever, and a quarter-actuated lever; but, where desired, any one or two of those levers could be removed. The removal of any one or two of those levers would not affect the operation of the remaining levers or lever, because the transfer plate 110 responds to each of those levers. As a result, the coin-handling device of FIGS. 1-15A can be used with single-coin, dual-coin or multi-coin slug rejectors.

Another preferred embodiment of coin-handling device that is made in accordance with the principles and teachings of the present invention is shown by FIGS. 16–28. That coin-handling device has a center wall 210 which is rectangular in elevation; and it has a vertically-directed flange 212 at one side of that center wall and has a vertically-directed flange 214 at the other side of that center wall.

An opening 211 is formed in the flange 212 adjacent the upper edge of that flange, and a slot 234 is formed in that flange adjacent the front edge of that flange. A second slot 232 is formed in that front edge below the level of the slot 234, and a notch 231 is contiguous with the slot 232. An ear 245 is formed in the flange 212 below the level of the opening 211, and that ear is preferably formed by punching an ear-forming opening in that flange.

An opening 215 is formed in the flange 214 adjacent the upper edge of that flange, and a slot 220 is formed in that flange adjacent the front edge of that flange. A second slot 216 is formed in that front edge below the level of the slot 220, and a notch 218 is contiguous with the slot 216. An ear 217 is formed in the flange 214 below the level of the opening 215, and that ear is preferably formed by punching an ear-forming opening in that flange.

The slots 232 and 216 can accommodate pins adjacent the lower end of a slug rejector, and the slots 234 and 220 can accommodate pins adjacent the upper end of that slug rejector. As the pins adjacent the lower end of the slug rejector are moved into the slots 216 and 232, those pins will move down into and be held by the notches 218 and 231.

The numeral 222 denotes a pivot which is secured to the flange 214, and that pivot rotatably supports a latch 224. An ear 226 is formed on, and extends outwardly from, that latch; and an ear 228 is formed on that latch and extend inwardly through the opening 215. The ear 226 accommodates the upper end of a helical extension spring 230, and the ear 217 accommodates the lower end of that spring. That spring biases the free end of the latch 224 downwardly, but the ear 228 coacts with the opening 215 in the flange 214 to limit downward movement of that latch. The spring 230 can yield to permit rotation of the latch 224 in the upward direction to permit one of the upper pins on the slug rejector to enter the slot 220. Thereafter, the notch adjacent the free end of that latch will move downwardly and hold that pin.

The numeral 236 denotes a pivot which is secured to the flange 212, and that pivot rotatably supports a latch 238. An ear 242 is formed on, and extends outwardly from, that latch; and an ear 240 is formed on that latch and extends inwardly through the opening 211. The ear 242 accommodates the upper end of a helical extension spring 244, and the ear 245 accommodates the lower end of that spring. That spring biases the free end of the latch 238 downwardly, but the ear 240 coacts with the opening 211 in the flange 212 to limit downward movement of that latch. The spring 244 can yield to permit rotation of the latch 238 in the upper direction to permit the other upper pin of the slug rejector to enter the slot 234. Thereafter, the notch adjacent the free end of that latch will move downwardly and hold that pin.

The numeral 219 denotes a rectangular opening in the center wall 210, and that opening is shown particularly by FIG. 17. A notch 246 is formed in the center wall below the level of the opening 219, and that notch is adjacent the flange 212. As indicated by FIG. 17, the notch 246 is roughly L-shaped in elevation.

The numeral 248 denotes a coin chute which is adjacent the flange 214; and that coin chute is U-shaped in plan and has a notch 250 in the closed end thereof. A second coin chute 252 is disposed adjacent the coin chute 248, and the closed end of that second coin chute has a notch 254 therein. A stop 256, shown as a length of stiff wire, extends forwardly from the flange 214 at a level adjacent the tops of the coin chutes 252 and 248; and that stop extends parallel to those coin chutes.

The numeral 260 denotes a pivot which is secured to the center wall 210 at a point intermediate the opening 219 and the notch 246, as shown by FIG. 17. That pivot extends forwardly from the front face of the center wall 210 and is parallel to the flanges 212 and 214. The numeral 278 denotes a ratchet wheel which has a hub that telescopes over the pivot 260; and that hub extends toward the center wall 210. A pinion 276 is pressed onto the hub of the ratchet wheel 278; and the engagement between that hub and that pinion is so tight that the two rotate as a unit. If desired, a bushing can be telescoped within the hub of the ratchet wheel 278, in the same way in which the bushing 93 is telescoped within the hub of the ratchet wheel 92 of FIGS. 1–15A. A pin 280 is formed on the ratchet wheel 278, and that pin extends toward, but terminates short of, the center wall 210. That pin is adjacent the periphery of that ratchet wheel, as shown by FIGS. 21, 23 and 24.

A pawl 262 has a slot 270 which telescopes loosely over the hub of the ratchet wheel 278; and that pawl has an ear 264 lying in the plane of that pawl, has an ear 266 extending rearwardly toward the center wall 210, and has an ear 268 extending forwardly away from that center wall. In addition, the pawl 262 has a further ear 272, and that ear accommodates one end of a spring 274. That spring is bent to have a loop intermediate the ends thereof, and it is bent to have the other end thereof wound around the pivot 260. That spring urges the pawl 262 to the left in FIG. 21; but it can yield to permit movement of that pawl to the right. A fastener 263, such as a spring washer, engages the hub of the ratchet wheel 278 to prevent accidental separation of the pawl 262 from that hub. The slot in that pawl will permit that pawl to be moved to the left or right relative to the pivot 260 and the ratchet wheel 278. The spring 274 will not interfere with rotation of the pawl 262 with the ratchet wheel 278 relative to the pivot 260.

The numeral 282 denotes a second pivot which is secured to, and extends forwardly from, the center wall 210; and that pivot is shown particularly by FIG. 21. That pivot rotatably supports a latch 284; and that latch has an ear 286 adjacent the upper edge thereof, has a notch 288 adjacent the free end thereof, and has an ear 290 which extends forwardly away from the center wall 210. The ear 290 on the latch 284 is in the path of the ear 264 on the pawl 262; and when the pawl 262 rotates far enough in the clockwise direction in FIGS. 21, 23 and 24, the ear 264 on that pawl will engage the ear 290 on the latch 284 and raise the free end of that latch.

The numeral 292 denotes a further pivot that is secured to the center wall 210, and that extends forwardly from that center wall. That pivot has a shouldered portion that abuts the center wall 210, and it has a reduced-diameter portion extending away from that center wall. The shouldered portion of the pivot 292 serves as a spacer and will hold a transfer plate 296 away from the center wall 210. That transfer plate has a shouldered hub 298 which telescopes over and is rotatable relative to the pivot 292. That transfer plate has an ear 300 which extends forwardly away from the center wall 210, has an ear 302 which extends rearwardly toward that center wall and has an ear 304 that extends rearwardly toward that center wall. The ear 300 is much longer than either of the ears 302 and 304, as shown by FIG. 25. A pivot 306 is secured to the lower end of the transfer plate 296, and that pivot rotatably supports a pawl 308. That pawl has a pin 310 adjacent the free end thereof, and that pin extends forwardly away from the center wall 210. An ear 312 is formed adjacent the free end of that pawl, and that ear extends rearwardly toward the center wall 210. The transfer plate 296 can move relative to the ratchet wheel 278; and it can move in the clockwise direction, as it is viewed in FIG. 20, to move the ear 312 on the pawl 308 into engagement with one of the teeth of that ratchet wheel.

The numeral 314 denotes a pawl which is rotatably confined by an annular recess that is defined by the transfer plate 296 and the shouldered hub 298 of that transfer plate. That pawl has an ear 317 adjacent the free end thereof which extends toward the center wall 210. A helical extension spring 318 has the lower end thereof hooked through an opening in an ear 316 on the pawl 314 and has the upper end thereof hooked over a pin 295 which is secured to, and which extends forwardly from, the center wall 210. That spring urges the ear 317 into the path of the teeth on the ratchet wheel 278, but it can yield to permit that ear to move out of the path of those teeth.

A spring 297 has one end thereof extending into a notch defined by the ear 286 on the latch 284; and that spring is wound around the shouldered portion of the pivot 292 and then extends up and is hooked around the pin 295. That spring biases the latch 284 for rotation in the clockwise direction as that latch is viewed in FIGS. 23 and 24; but that spring can yield to permit that latch to rotate in the opposite direction.

The numeral 320 denotes a coin-actuated lever which has a hub 322, and that hub telescopes over the pivot 292. That hub will be closely adjacent the transfer plate 296, as shown by FIG. 19. The lever 320 has an ear 324 thereon, and that ear extends rearwardly toward the center wall 210. A second ear 326 is formed on the lever 320, and that ear also extends rearwardly toward the center wall 210; but the ear 326 is much shorter than the ear 324. Two additional ears 328 are formed on the lever 320, but those ears do not extend very far toward the center wall 210. The ears 328 coact with the ear 326 to hold an actuator 330 which has a coin-receiving portion 332, thereon. That coin-receiving portion extends into the notch 254 of the coin chute 252, and it underlies the stop 256. That actuator is similar to the actuators in the coin-handling device of FIGS. 1–15A.

A helical extension spring 334 has the lower end thereof hooked through an opening in the coin-actuated lever 320 and has the upper end thereof hooked around the pin 295. That spring biases the lever 320 for rotation in the counter clockwise direction in FIG. 20, and thus urges the coin-receiving portion 332 of the actuator 330 against the stop 256. However, the spring 334 can yield to permit the lever 320 to be rotated in the clockwise direction in FIG. 20.

The numeral 336 denotes a coin-actuated lever which has a hub 338, and that hub telescopes over the pivot 292. That hub will be disposed closely adjacent the hub 322 of the lever 320, as shown by FIG. 19. An ear 340 is formed on the coin-actuated lever 336, and that ear extends rearwardly toward the center wall 210. Two additional ears 342 are provided on the lever 336, and those ears also extend rearwardly toward the center wall 210; but those ears do not extend very far toward that center wall. The ears 342 coact with the ear 340 to support an actuator 344 which has a coin-receiving portion 346. That coin-receiving portion extends into the notch 250 in the closed end of the coin chute 248, and that coin-receiving portion underlies the stop 256. A helical extension spring 348 has the lower end thereof hooked through an opening in the coin-actuated lever 336 and has the upper end thereof hooked around the pin 295. That spring biases the lever 336 for rotation in the counter clockwise direction in FIG. 18, and thus urges the coin-receiving portion 346 of the actuator 344 against the stop 256. However, that spring can yield to permit rotation of the lever 336 in the clockwise direction as that lever is viewed in FIG. 18.

The numeral 350 denotes a bracket which abuts the flange 212; and fasteners 352 fixedly secure that bracket to that flange. An ear 354 is formed on the bracket 350, adjacent the upper end of that bracket; and that ear supports a leaf-type spring 356 which has re-entrant bend therein adjacent the lower end thereof. A pivot 358 is secured to the bracket 350, and that pivot rotatably supports a plate 360 which is vertically-directed and which has a horizontally-directed flange 362. Notches 364 are formed in the left-hand edge of the plate 360, as that plate is viewed in FIG. 18, and an ear 366 projects outwardly from the right-hand edge of that plate.

The numeral 368 denotes a pivot which is secured to, and projects forwardly from, the center wall 210, and that pivot rotatably supports a toothed segment 370. The teeth on that toothed segment are complementary to the teeth on the pinion 276, and they will mesh with those teeth. A helical extension spring 374 has the lower end thereof hooked through an opening in the toothed segment 370 and has the upper end thereof hooked around a pin 372 which is secured to the center wall 210. That spring biases the toothed segment 370 for rotation in the clockwise direction as that segment is viewed in FIG. 18. However, that spring can yield to permit rotation of that toothed segment in the opposite direction.

The numeral 378 denotes a solenoid coil which is fixedly secured to the center wall 210, and a plunger 380 extends downwardly from that coil. A pivot 376 rotatably secures the plunger 380 to the toothed segment 370; and whenever the coil 378 is energized, the plunger 380 will move upwardly and will apply counter clockwise rotative forces to the toothed segment 370 as that toothed segment is viewed in FIG. 18. However, whenever the solenoid coil 378 is de-energized, the weight of the plunger 380 will add to the clockwise rotative forces applied to that toothed segment by the helical extension spring 374.

The numeral 382 denotes a switch which is secured to the rear face of the center wall 210. That switch has an actuating button 384 extending downwardly from the lower face thereof, as shown particularly by FIG. 19; and an L-shaped lever 388 is mounted on a pivot 386 so the horizontal portion of that lever underlies the button 384. An ear 390 is formed on the lower end of the lever 388, and that ear extends forwardly through the opening 219 in the center wall 210 and into the path of the pin 280 on the ratchet wheel 278. An L-shaped stop 392 is secured to the center wall 210, as shown by FIG. 17; and that stop limits rotation of the lever 388 in the clockwise direction about the pivot 386, as that lever is viewed in FIG. 17.

The plate 360 is rotatable relative to the bracket 350; and the re-entrant bend in the leaf-type spring 356 will engage various of the notches 364 in the left-hand edge of that plate to hold that plate in any position to which it is rotated. As a result, once the plate 360 has been set in a desired position, it will remain in that position until it is deliberately shifted out of that position. Regardless of the position in which it is set, the plate 360 will normally have its ear 366 underlying and supporting the pawl 308. Hence, the plate 360 serves to determine the normal, at rest, position of the pawl 308.

In the normal, at rest, position of the components of the coin-handling device of FIGS. 16–28, the solenoid coil 378 will be de-energized. However, the plunger 380 will be in its raised position, because that coil will have been energized during, or subsequent to, the preceding cycle of operation of the controlled device with which the coin-handling device of the present invention is used. The toothed segment 370 will be in its lowermost position and it will have rotated the pinion 276 far enough to cause the ratchet wheel 278 to move the pin 280 thereon into engagement with the ear 390 on the lever 388. The rotation of the ratchet wheel 278 will have been sufficient to cause the pin 280 thereon to force the lever 388 against the L-shaped stop 392 on the center wall 210; and, in that position, the actuating button 384 of the switch 382 will be in its retracted position. Also in the normal, at rest, position of the components of the coin-handling device of FIGS. 16–28, the spring 318 will be holding the ear 317 of the pawl 314 in engagement with one of the teeth on the ratchet wheel 278, and will thus be preventing rotation of that ratchet wheel. The transfer plate 296 will have the ear 304 thereon abutting the pawl 314 and will hold the ear 312 on the pawl 308 closely adjacent one of the teeth on the ratchet wheel 278. The springs 334 and 348 will be holding the coin-actuated levers 320 and 336 in their raised positions, and thus will be holding the coin-receiving portions 332 and 346 of the actuators 330 and 344 upwardly against the stop 256. The spring 274 will be holding the ear 266 on the pawl 262 in engagement with one of the teeth on the ratchet wheel 278; and that pawl will have been set to space the ear 264 thereon a predetermined distance away from the ear 290 on the latch 284. That distance will determine the number and denominations of coins which must be introduced into the coin-handling device of FIGS. 16–28 before the actuating button 384 of the switch 382 can be released for downward movement.

The coin chutes 248 and 252 can be made to accommodate coins of different sizes and denominations. In the coin-handling device of FIGS. 16–19 and 27, the coin chute 252 accommodates dimes and the coin chute 248 accommodates quarters.

The plate 360 can be set in a number of different positions; and FIGS. 16, 18 and 27 show that plate in one position while FIGS. 26 and 28 show that plate in another position. Where that plate is set in the position shown by FIGS. 16, 18 and 27, the coin-handling device of FIGS. 16–28 can be used to accept two coins of different denominations; because the pawl 308 will not lie in the path of the ear 324 on the coin-actuated lever 320. However, where that plate is set in the position shown by FIGS. 26 and 28, and where the lever 320 is in the position shown by FIG. 16, the coin-handling device of FIGS. 16–28 can only be used to accept coins of just one denomination; because the pawl 308 will lie in the path of the ear 324 on the coin-actuated lever 320.

The pawl 262 can be set in different positions relative to the ratchet wheel 278—it being only necessary to move that pawl far enough to the right in FIG. 23 to free the ear 266 from the path of the teeth of that ratchet wheel, and then rotate that pawl relative to that ratchet wheel. FIG. 23 shows one setting of the pawl 262 relative to the ratchet wheel 278 while FIG. 24 shows a different setting of that pawl relative to that ratchet wheel.

If it is assumed that the pawl 262 is so set relative to the ratchet wheel 278 that the said ratchet wheel must advance a distance equal to the width of ten teeth before the ear 264 on that pawl engages and raises the ear 290 on the latch 284, and if it is further assumed that the plate 360 is set in the position shown by FIGS. 16, 18 and 27, the coin-handling device of FIGS. 16–28 will require the insertion of two quarters or five dimes before the switch 382 is actuated. When a dime is inserted in that coin-handling device, that dime will be tested by the slug rejector, not shown, and then delivered to the coin chute 252. As that dime starts to enter that coin chute, it will engage the coin-receiving portion 332 of the actuator 330 and cause the coin-actuated lever 320 to rotate in the clockwise direction in FIG. 16. That rotation will cause the ear 324 on that coin-actuated lever to move into the path of the ear 312 on the pawl 308, and it will also cause the ear 326 on that lever to move toward the ear 300 on the transfer plate 296. At this time, the coin-receiving portion 332 of the actuator 330 will be spaced from the flange 214 a distance less than the diameter of a dime; and hence the dime will have to move the actuator 330 further downwardly in order to pass through, and beyond, the coin chute 252. Such further downward movement of the actuator 330 will cause the ear 326 to rotate the transfer plate 296 in the clockwise direction about the pivot 292; and will thus enable that transfer plate to move the ear 312 on the pawl 308 into the path of a tooth on the ratchet wheel 278 and will then enable the ear 304 on that transfer plate to move the ear 317 on the pawl 314 out of the path of the teeth on that ratchet wheel. Thereupon, the spring 374 will act through the toothed segment 370 and the pinion 276 to rotate the ratchet wheel 278 in the counter clockwise direction in FIG. 16. That rotation will be halted when the ear 312 on the pawl 308 engages and is held by the ear 324 on the lever 320; but that rotation will advance the ratchet wheel a distance almost equal to the width of two teeth on that ratchet wheel.

As the dime moves downwardly beyond the coin-receiving portion 332, the bias applied by the spring 334 will start the coin-actuated lever 320 rotating back toward its normal position; and thereupon the bias applied by the spring 318 will cause the pawl 314 to start rotating back toward its normal position. As that pawl so rotates, it will rotate the transfer plate 296 in the counter clockwise direction, and it will move its ear 317 toward the path of the teeth on the ratchet wheel 278. As that pawl rotates its ear 317 into the path of the teeth on the ratchet wheel 278, it will enable the transfer plate 296 to shift the ear 312 on the pawl 308 out of the path of the teeth on the ratchet wheel 278; and thereupon that ratchet wheel will rotate a short additional distance in the counter clockwise direction until it engages and is held by the ear 317 on the pawl 314. Also, the pawl 308 will fall downwardly and come to rest, once again, on the ear 366 of the plate 360.

The overall result is that the ratchet wheel 278 and the pawl 262 will have advanced a distance equal to the width of two teeth, and that all of the other components of the coin-handling device of FIGS. 16–28 will be in their normal, at rest, positions. The ear 264 on the pawl 262 will still be spaced an appreciable distance away from the ear 290 on the latch 284; and hence the lever 388 will still have the ear 390 thereof held within the notch 288 of the latch 284.

The insertion of a second, third and fourth dime will enable the ratchet wheel 278 to experience three further advancements—each of which being equal to the width of two teeth on that ratchet wheel. While the pawl 262 will have the ear 264 thereon close to the ear 290 on the latch 284, those ears will still be spaced apart. As a result, the lever 388 will still have the ear 390 thereof held within the notch 288 of the latch 284.

The insertion of a fifth dime will enable the ratchet wheel 278 to experience a fifth advancement which is equal to the width of two teeth on that ratchet wheel. As that ratchet wheel approaches the end of that advancement, it will cause the ear 264 on the pawl 262 to engage and raise the ear 290 on the latch 284. As that ear is raised, the ear 390 on the lever 388 will be freed; and that lever will then move in the counter clockwise direction in FIG. 17 and release the button 384 of the switch 382. Thereupon that switch will initiate a cycle of operation of the controlled device with which the coin-handling device of FIGS. 16–28 is used. Either during, or subsequent to, that cycle of operation, the solenoid coil 378 will be energized and will apply an upward force to the pivot 376. That upward force will tend to cause the toothed segment 370 to rotate in the counter clockwise direction about the pivot 368 and will tend to cause the ratchet wheel 278 to rotate in the clockwise direction. The inclined faces of the teeth on the ratchet wheel 278 will cam the ear 317 on the pawl 314 upwardly out of the path of those teeth; and, as a result, energization of the solenoid coil 378 will enable the plunger 380 to start the components of the coin-handling device of FIGS. 16–28 moving back to their normal, at rest, positions. As the ratchet wheel 278 approaches its normal, at rest, position, the pin 280 thereon will engage the ear 390 on the lever 388 and move that ear back into register with the notch 288 in the latch 284; and as that ear moves into register with the notch 288, the spring 297 will move that latch down and hold the ear 390 on the lever 388. This means that the button 384 of the switch 382, which was forced back into retracted position by the lever 388, will be held in retracted position by that lever.

Where desired, five further dimes could be inserted to effect a further actuation of the switch 382, and hence of the controlled device with which the coin-handling device of FIGS. 16–28 is used. However, a patron might want to use two quarters to effect that actuation.

When the first quarter is inserted, the slug rejector, not shown, will test that quarter and will deliver it to the coin chute 248. As that quarter starts to enter that coin chute, it will engage the coin-receiving portion 346 of the actuator 344 and cause the coin-actuated lever 336 to move downwardly. Such movement will cause the ear 340 on that coin-actuated lever to engage the ear 300 on the transfer plate 296 and start rotating that transfer plate in the clockwise direction. Such rotation will cause the ear 312 on the pawl 308 to move into the path of the teeth on the ratchet wheel 278 and will then cause the ear 304 on that transfer plate to shift the ear 317 on the pawl 314 out of the path of the teeth on that ratchet wheel. As the ear 317 moves out of the path of the teeth on the ratchet wheel 278, that ratchet wheel will be freed for rotation in the counter clockwise direction; and thereupon the spring 374 will act through the toothed segment 370 and the pinion 276 to rotate the ratchet wheel 278 in the counter clockwise direction in FIG. 16. That rotation will be halted when the pawl 308 engages and is held by the ear 302 on the transfer plate 296. The pawl 308 will be forced to rotate with that ratchet wheel, because of the engagement between the ear 312 thereon and one of the teeth of that ratchet wheel; and that pawl and ratchet wheel will rotate in the counter clockwise direction a distance almost equal to the width of five teeth on that ratchet wheel.

As the quarter moves downwardly beyond the coin-receiving portion 346, the bias applied by the spring 348 will start the coin-actuated lever 336 rotating back toward its normal position; and thereupon the bias applied by the spring 318 will cause the pawl 314 to start rotating back toward its normal position. As that pawl so rotates, it will rotate the transfer plate 296 in the counter clockwise direction, and it will move its ear 317 toward the path of the teeth on the ratchet wheel 278. As that pawl rotates its ear 317 into the path of the teeth on the ratchet wheel 278, it will cause the transfer plate 296 to shift the ear 312 on the pawl 308 out of the path of the teeth on the ratchet wheel 278; and thereupon that ratchet wheel will rotate a short additional distance in the counter clockwise direction until it engages and is held by the ear 317 on the pawl 314. Also, the pawl 308 will fall downwardly and come to rest, once again, on the ear 366 of the plate 360.

The overall result is that the ratchet wheel 278 and the pawl 262 will have advanced a distance equal to the width of five teeth, and that all of the other components of the coin-handling device of FIGS. 16–28 will be in their normal, at rest, positions. The ear 264 on the pawl 262 will still be spaced an appreciable distance away from the ear 290 on the latch 284; and hence the lever 388 will still have the ear 390 thereof held within the notch 288 of the latch 284. The insertion of a second quarter will enable the ratchet wheel 278 to experience a second advancement which is equal to the width of five teeth on that ratchet wheel. As that ratchet wheel approaches the end of that advancement, it will cause the ear 264 on the pawl 262 to engage and raise the ear 290 on the latch 284. As that ear is raised, the ear 390 on the lever 388 will be freed; and that lever will then move in the counter clockwise direction in FIG. 17 and release the button 384 of the switch 382. Thereupon that switch will initiate a cycle of operation of the controlled device with which the coin-handling device of FIGS. 16–28 is used. Either during, or subsequent to, that cycle of operation, the solenoid coil 378 will be energized and will apply an upward force to the pivot 376. That upward force will tend to cause the toothed segment 370 to rotate in the counter clockwise direction about the pivot 368 and will tend to cause the ratchet wheel 278 to rotate in the clockwise direction. The inclined faces of the teeth on the ratchet wheel 278 will cam the ear 317 on the pawl 314 upwardly out of the path of those teeth; and, as a result, energization of the solenoid coil 378 will enable the plunger 380 to start the components of the coin-handling device of FIGS. 16–28 moving back to their normal, at rest, positions. As the ratchet wheel 278 approaches its normal, at-rest, position, the pin 280 thereon will engage the ear 390 on the lever 388 and move that ear back into register with the notch 288 in the latch 284; and as that ear moves into register with the notch 288, the spring 297 will move that latch down and hold the ear 390 on the lever 388. This means that the button 384 of the switch 382, which was forced back into retracted position by the lever 388, will be held in retracted position by that lever.

If desired, the coin-actuated lever 320 can have the downwardly-extending portion at the right-hand end thereof lengthened a distance corresponding to the width of a tooth on the ratchet wheel 278; and the coin chute 252 can be made to accommodate nickels. Where that is done, where the advancement-controlling plate 360 is left in the position shown by FIGS. 16, 18 and 27, and where the price-setting pawl 262 is set so the ear 264 thereon is spaced from the ear 290 on the latch 284 a distance equal to the width of ten teeth when the ratchet wheel 278 is in its normal position, ten nickels or two quarters will have to be inserted to effect the desired actuation of the switch 382. The first nickel will be tested by the slug rejector, not shown, and then delivered to the coin chute 252. As that nickel starts to enter that coin chute, it will engage the coin-receiving portion 332 of the actuator 330 and cause the coin-actuated lever 320 to rotate in the clockwise direction in FIG. 16. That rotation will cause the ear 324 on that coin-actuated lever to move into the path of the ear 312 on the pawl 308, and it will also cause the ear 326 on that lever to move toward the ear 300 on the transfer plate 296. At this time, the coin-receiving portion 332 of the actuator 330 will be spaced from the flange 214 a distance less than the diameter of a nickel; and hence the nickel will have to move the actuator 330 further downwardly in order to pass through, and beyond, the coin chute 252. Such further downward movement of the actuator 330 will cause the ear 326 to rotate the transfer plate 296 in the clockwise direction about the pivot 292; and will thus enable that transfer plate to move the ear 312 on the pawl 308 into the path of a tooth on the ratchet wheel 278 and will then enable the ear 304 on that transfer plate to move the ear 317 on the pawl 314 out of the path of the teeth on that ratchet wheel. Thereupon, the spring 374 will act through the toothed segment 370 and the pinion 276 to rotate the ratchet wheel 278 in the counter clockwise direction in FIG. 16. That rotation will be halted when the ear 312 on the pawl 308 engages and is held by the ear 324 on the lever 320; but that rotation will advance the ratchet wheel a distance almost equal to the width of a tooth on that ratchet wheel.

As the nickel moves downwardly beyond the coin-receiving portion 332, the bias applied by the spring 334 will start the coin-actuated lever 320 rotating back toward its normal position; and thereupon the bias applied by the spring 318 will cause the pawl 314 to start rotating back toward its normal position. As that pawl so rotates, it will rotate the transfer plate 296 in the counter clockwise direction, and it will move its ear 317 toward the path of the teeth on the ratchet wheel 278. As that pawl rotates its ear 317 into the path of the teeth on the ratchet wheel 278, it will enable the transfer plate 296 to shift the ear 312 on the pawl 308 out of the path of the teeth on the ratchet wheel 278; and thereupon that ratchet wheel will rotate a short additional distance in the counter clockwise direction until it engages and is held by the ear 317 on the pawl 314. Also, the pawl 308 will fall downwardly and come to rest, once again, on the ear 366 of the plate 360.

The overall result is that the ratchet wheel 278 and the pawl 262 will have advanced a distance equal to the width of a tooth, and that all of the other components of the coin-handling device of FIGS. 16–28 will be in their normal, at rest, positions. The ear 264 on the pawl 262 will still be spaced an appreciable distance away from the ear 290 on the latch 284; and hence the lever 388 will still have the ear 390 thereof held within the notch 288 of the latch 284.

The insertion of a second, third, fourth, fifth, sixth, seventh, eighth and ninth nickel will enable the ratchet wheel 278 to experience eight further advancements—each of which being equal to the width of a tooth on that ratchet wheel. While the pawl 262 will have the ear 264 thereon close to the ear 290 on the latch 284, those ears will still be spaced apart. As a result, the lever 388 will still have the ear 390 thereof held within the notch 288 of the latch 284.

The insertion of a tenth nickel will enable the ratchet wheel 278 to experience a tenth advancement which is equal to the width of one of the teeth on that ratchet wheel. As that ratchet wheel approaches the end of that advancement, it will cause the ear 264 on the pawl 262 to engage and raise the ear 290 on the latch 284. As that ear is raised, the ear 390 on the lever 388 will be freed; and that lever will then move in the counter clockwise direction in FIG. 17 and release the button 384 of the switch 382. Thereupon that switch will initiate a cycle of operation of the controlled device with which the coin-handling device of FIGS. 16–28 is used. Either during, or subsequent to, that cycle of operation, the solenoid coil 378 will be energized and will apply an upward force to the pivot 376. That upward force will tend to cause the toothed segment 370 to rotate in the counter clockwise direction about the pivot 368 and will tend to cause the ratchet wheel 278 to rotate in the clockwise direction. The inclined faces of the teeth on the ratchet wheel 278 will cam the ear 317 on the pawl 314 upwardly out of the path of those teeth; and, as a result, energization of the solenoid coil 378 will enable the plunger 380 to start the components of the coin-handling device of FIGS. 16–28 moving back to their normal, at rest, positions. As the ratchet wheel 278 approaches its normal, at rest, position, the pin 280 thereon will engage the ear 390 on the lever 388 and move that ear back into register with the notch 288 in the latch 284; and as that ear moves into register with the notch 288, the spring 297 will move that latch down and hold the ear 390 on the lever 388. This means that the button 384 of the switch 382, which was forced back into retracted position by the lever 388, will be held in retracted position by that lever.

Where desired, ten further nickels could be inserted to effect a further actuation of the switch 382, and hence of the controlled device with which the coin-handling device of FIGS. 16–28 is used. However, a patron might want to use two quarters to effect that actuation. Those quarters would successively effect two advancements of the ratchet wheel 278, all as described above; and each of those advancements would be equal to the width of five teeth.

If desired, where the coin-actuated lever 320 is made to respond to nickels and the advancement-controlling plate 360 is in the position shown by FIGS. 16, 18 and 27, the price-setting pawl 262 can be set so the ear 264 thereon is spaced from the ear 290 on the latch 284 a distance equal to the width of five or fifteen teeth when the ratchet wheel 278 is in its normal position. In the former instance, five nickels or one quarter can be inserted to advance the ratchet wheel 278 far enough to enable the ear 264 on the pawl 262 to raise the ear 290 on the latch 284; and in the latter instance fifteen nickels or three quarters can be inserted to advance the ratchet wheel 278 far enough to enable the ear 264 on the pawl 262 to raise the ear 290 on the latch 284.

As shown by FIG. 28, the coin-actuated lever 320 can be set in the position occupied by the lever 336 in FIGS. 16, 18–21, 26 and 27, the coin chute 248 can be made to accommodate nickels, and the actuator 330 can be shortened to respond to nickels. Also, the coin actuated lever 336 can be set in the position occupied by the lever 320 in FIGS. 16, 18–21, 26 and 27, the coin chute 252 can be made to accommodate dimes, and the actuator 344 can be lengthened to respond to dimes. Where all of this is done, where the advancement-controlling plate 360 is set in the position shown by FIGS. 26 and 28, and where the price-setting pawl 262 is set so the ear 264 thereon is spaced from the ear 290 on the latch 284 a distance equal to the width of two teeth when the ratchet wheel 278 is in its normal position, two nickels or one dime will have to be inserted to effect the desired actuation of the switch 382. The first nickel will be tested by the slug rejector, not shown, and then delivered to the coin chute 248. As that nickel starts to enter that coin chute, it will engage the coin-receiving portion 332 of the actuator 330 and cause the coin-actuated lever 320 to rotate in the clockwise direction in FIG. 16. That rotation will cause the ear 324 on that coin-actuated lever to move into the path of the pin 310 on the pawl 308, and it will also cause the ear 326 on that lever to move toward the ear 390 on the transfer plate 296. At this time, the coin-receiving portion 332 of the actuator 330 will be spaced from the flange 214 a distance less than the diameter of a nickel; and hence the nickel will have to move the actuator 330 further downwardly in order to pass through, and beyond, the coin chute 248. Such further downward movement of the actuator 330 will cause the ear 326 to rotate the transfer plate 296 in the clockwise direction about the pivot 292; and will thus enable that transfer plate to move the ear 312 on the pawl 308 into the path of a tooth on the ratchet wheel 278 and will then enable the ear 304 on that transfer plate to move the ear 317 on the pawl 314 out of the path of the teeth on that ratchet wheel. Thereupon, the spring 374 will act through the toothed segment 370 and the pinion 276 to rotate the rachet wheel 278 in the counter clockwise direction in FIG. 16. That rotation will be halted when the pin 310 on the pawl 308 engages and is held by the ear 324 on the lever 320; but that rotation will advance the ratchet wheel a distance almost equal to the width of a tooth on that ratchet wheel.

As the nickel moves downwardly beyond the coin-receiving portion 332, the bias applied by the spring 334 will start the coin-actuated lever 320 rotating back toward its normal position; and thereupon the bias applied by the spring 318 will cause the pawl 314 to start rotating back toward its normal position. As that pawl so rotates, it will rotate the transfer plate 296 in the counter clockwise direction, and it will move its ear 317 toward the path of the teeth on the ratchet wheel 278. As that pawl rotates its ear 317 into the path of the teeth on the ratchet wheel 278, it will enable the transfer plate 296 to shift the ear 312 on the pawl 308 out of the path of the teeth on the ratchet wheel 278; and thereupon that ratchet wheel will rotate a short additional distance in the counter clockwise direction until it engages and is held by the ear 317 on the pawl 314. Also, the pawl 308 will fall downwardly and come to rest, once again, on the ear 366 of the plate 360.

The overall result is that the ratchet wheel 278 and the pawl 262 will have advanced a distance equal to the width of a tooth, and that all of the other components of the coin-handling device of FIGS. 16–28 will be in their normal, at rest, positions. The ear 264 on the pawl 262 will still be spaced an appreciable distance away from the ear 290 on the latch 284; and hence the lever 388 will still have the ear 390 thereof held within the notch 288 of the latch 284.

The insertion of a second nickel will enable the ratchet wheel 278 to experience a second advancement which is equal to the width of one of the teeth on that ratchet wheel. As that ratchet wheel approaches the end of that advancement, it will cause the ear 264 on the pawl 262 to engage and raise the ear 290 on the latch 284. As that ear is raised, the ear 390 on the lever 388 will be freed; and that lever will then move in the counter clockwise direction in FIG. 17 and release the button 384 of the switch 382. Thereupon that switch will initiate a cycle of operation of the controlled device with which the coin-handling device of FIGS. 16–28 is used. Either during, or subsequent to, that cycle of operation, the solenoid coil 378 will be energized and will apply an upward force to the pivot 376. That upward force will tend to cause the toothed segment 370 to rotate in the counter clockwise direction about the pivot 368 and will tend to cause the ratchet wheel 278 to rotate in the clockwise direction. The inclined faces of the teeth on the ratchet wheel 278 will cam the ear 317 on the pawl 314 upwardly out of the path of those teeth; and, as a result, energization of the solenoid coil 378 will enable the plunger 380 to start the components of the coin-handling device of FIGS. 16–28 moving back to their normal, at rest, positions. As the ratchet wheel 278 approaches its normal, at rest, position, the pin 280 thereon will engage the ear 390 on the lever 388 and move that ear back into register with the notch 288 in the latch 284; and as that ear moves into register with the notch 288, the spring 297 will move that latch down and hold the ear 390 on the lever 388. This means that the button 384 of the switch 382, which was forced back into retracted position by the lever 388, will be held in retracted position by that lever.

Where desired, two further nickels could be inserted to effect a further actuation of the switch 382, and hence of the controlled device with which the coin-handling device of FIGS. 16–28 is used. However, a patron might want to use a dime to effect that actuation. When that dime is inserted, the slug rejector, not shown, will test that dime and deliver it to the coin chute 252. As that dime starts to enter that coin chute, it will engage the coin-receiving portion 346 of the actuator 344 and cause the coin-actuated lever 336 to move downwardly. Such movement will cause the ear 340 on that coin-actuated lever to engage the ear 300 on the transfer plate 296 and start rotating that transfer plate in the clockwise direction. Such rotation will cause the ear 312 on the pawl 308 to move into the path of the teeth on the ratchet wheel 278 and will then cause the ear 304 on that transfer plate to shift the ear 317 on the pawl 314 out of the path of the teeth on that ratchet wheel. As the ear 317 moves out of the path of the teeth on the ratchet wheel 278, that ratchet wheel will be freed for rotation in the counter clockwise direction; and thereupon the spring 374 will act through the toothed segment 370 and the pinion 276 to rotate the ratchet wheel 278 in the counter clockwise direction in FIG. 16. That rotation will be halted when the pawl 308 engages and is held by the ear 302 on the transfer plate 296. The pawl 308 will be forced to rotate with that ratchet wheel, because of the engagement between the ear 312 thereon and one of the teeth of that ratchet wheel; and that pawl and ratchet wheel will rotate in the counter clockwise direction a distance almost equal to the width of two teeth on that ratchet wheel.

As the dime moves downwardly beyond the coin-receiving portion 346, the bias applied by the spring 348 will start the coin-actuated lever 336 rotating back toward its normal position; and thereupon the bias applied by the spring 318 will cause the pawl 314 to start rotating back toward its normal position. As that pawl so rotates, it will rotate the transfer plate 296 in the counter clockwise direction, and it will move its ear 317 toward the path of the teeth on the ratchet wheel 278. As that pawl rotates its ear 317 into the path of the teeth on the ratchet wheel 278, it will cause the transfer plate 296 to shift the ear 312 on the pawl 308 out of the path of the teeth on the ratchet wheel 278; and thereupon that ratchet wheel will rotate a short additional distance in the counter clockwise direction until it engages and is held by the ear 317 on the pawl 314. Also, the pawl 308 will fall downwardly and come to rest, once again, on the ear 366 of the plate 360.

The overall result is that the ratchet wheel 278 and the pawl 262 will have advanced a distance equal to the width of two teeth; and as the ratchet wheel approaches the end of that advancement, it will cause the ear 264 on the pawl 262 to engage and raise the ear 290 on the latch 284. As that ear is raised, the ear 390 on the lever 388 will be freed; and that lever will then move in the counter clockwise direction in FIG. 17 and release the button 384 of the switch 382. Thereupon that switch will initiate a cycle of operation of the controlled device with which the coin-handling device of FIGS. 16–28 is used. Either during, or subsequent to, that cycle of operation, the solenoid coil 378 will be energized and will apply an upward force to the pivot 376. That upward force will tend to cause the toothed segment 370 to rotate in the counter clockwise direction about the pivot 368 and will tend to cause the ratchet wheel 278 to rotate in the clockwise direction. The inclined faces of the teeth on the ratchet wheel 278 will cam the ear 317 on the pawl 314 upwardly out of the path of those teeth; and, as a result, energization of the solenoid coil 378 will enable the plunger 380 to start the components of the coin-handling device of FIGS. 16–28 moving back to their normal, at rest, positions. As the ratchet wheel 278 approaches its normal, at rest, position, the pin 280 thereon will engage the ear 390 on the lever 388 and move that ear back into register with the notch 288 in the latch 284; and as that ear moves into register with the notch 288, the spring 297 will move that latch down and hold the ear 390 on the lever 388. This means that the button 384 of the switch 382, which was forced back into retracted position by the lever 388, will be held in retracted position by that lever.

If desired, where the coin-actuated lever 320 is set in the position occupied by the lever 336 in FIGS. 16, 19 and 28, the coin chute 248 is made to accommodate nickels, the actuator 330 is shortened to respond to nickels, the coin-actuated lever 336 is set in the position occupied by the lever 320 in FIGS. 16, 19 and 28, the coin chute 252 is made to accommodate dimes and the actuator 344 is lengthened to respond to dimes, the price-setting pawl 262 can be set so the ear 264 thereon is spaced from the ear 290 on the latch 284 a distance equal to the width of four, six, eight, ten, twelve, fourteen, sixteen or eighteen teeth when the ratchet wheel 278 is in its normal position. Such settings can, respectively, require the insertion of two dimes or four nickels, three dimes or six nickels, four dimes or eight nickels, five dimes or ten nickels, six dimes or twelve nickels, seven dimes or fourteen nickels, eight dimes or sixteen nickels, and nine dimes or eighteen nickels. Where the price-setting pawl or plate 262 is set so the ear 264 thereon is spaced from the ear 290 on the latch 284 distances equal to the width of odd numbers of teeth, odd numbers of nickels or appropriate combinations of nickels and dimes can be used to effect actuation of the switch 382.

Where the levers 320 and 336 are in the reversed positions described immediately above, and respond, respectively, to nickels and dimes, the advancement-controlling plate 360 can be set in different positions to provide different advancements of the ratchet wheel 278. For example, where the first notch 364 in that plate is held by the re-entrant bend of the spring 356, the insertion of a dime will advance the ratchet wheel 278 the width of one tooth; but the insertion of a nickel will be suitably blocked, as by using a slug rejector responsive only to dimes or by blocking the nickel passageway of a nickel-dime slug rejector. The blocking of a nickel under these circumstances is important because the ear 366 on the advancement-controlling member 360 is disposed so it would block movement of the ear 324 on the lever 320. Where the second notch 364 is held by the re-entrant bend of the spring 356, the insertion of a dime will advance the ratchet wheel 278 the width of two teeth and the insertion of a nickel will advance that ratchet wheel the distance of one tooth. Where the third, fourth, fifth, sixth or seventh notch 364 is held by the re-entrant bend of the spring 356, the insertion of a dime will advance the ratchet wheel 278 the width of three, four, five, six or seven teeth, respectively, and the insertion of a nickel will advance that ratchet wheel the distance of two, three, four, five and six teeth, respectively. While only that setting of the advancement-controlling plate 360 which has the second notch of that plate held by the re-entrant bend of the spring 356 is significant when nickels and dimes are the coins to be inserted, other settings of that plate could be significant where coins of other countries were inserted.

Where the coin-actuated levers 320 and 336 are set in the positions shown by FIGS. 16, 19 and 27 but the portion of lever 320 which supports the ear 324 is lengthened by a distance equal to the width of a tooth, where the coin chute 252 is made to accommodate nickels, and where the actuator 330 is shortened to respond to nickels, the advancement-controlling plate 360 can be set in different positions to provide different advancements of the ratchet wheel 278. For example, where the first notch 364 in that plate is held by the re-entrant bend of the spring 356, the insertion of a quarter will advance the ratchet wheel the width of one tooth but the inserton of a nickel will be suitably blocked, as by using a slug rejector responsive only to quarters or by blocking the nickel passageway of a nickel-quarter slug rejector. The blocking of a nickel under these circumstances is important because the pawl 308 is in the path of the ear 324 on the lever 320. Where the second, third or fourth notch 364 is held by the re-entrant bend of the spring 356, the insertion of a quarter will advance the ratchet wheel the width of two, three or four teeth, respectively, but the insertion of a nickel will be suitably blocked because the pawl 308 will be in the path of the ear 324 on the lever 320. Where the fifth, sixth or seventh notch 364 is held by the re-entrant bend of the spring 356, the insertion of a quarter will advance the ratchet wheel the width of five, six or seven teeth, respectively, and the insertion of a nickel will advance the ratchet wheel 278 the width of one, two or three teeth, respectively. While only that setting of the advancement-controlling plate 360 which has the fifth notch of that plate held by the re-entrant bend of the spring 356 is significant when nickels and quarters are the coins to be inserted, other settings of that plate could be significant where coins of other countries were inserted.

Where the coin-actuated levers 320 and 336 are set in the positions shown by FIGS. 16, 19 and 27 and the coin chutes 252 and 248 accommodate dimes and quarters, respectively, the advancement-controlling plate 360 can be set in different positions to provide different advancements of the ratchet wheel 278. For example, where the first notch 364 in that plate is held by the re-entrant bend of the spring 356, the insertion of a quarter will advance the ratchet wheel 278 the width of one tooth but the insertion of a dime will be suitably blocked, as by using a slug rejector responsive only to quarters or by blocking the dime passageway of a dime-quarter slug rejector. The blocking of a dime under these circumstances is important because the ear 366 on the advancement-controlling member 360 is disposed so it would block movement of the ear 324 on the lever 320. Where the second or third notch 364 is held by the re-entrant bend of the spring 356, the insertion of a quarter will advance the ratchet wheel the width of two or three teeth, respectively, and insertion of a dime will be suitably blocked because the pawl 308 will be in the path of the ear 324 on the lever 320. Where the fourth, fifth, sixth or seventh notch 364 is held by the re-entrant bend of the spring 356, the insertion of a quarter will advance the ratchet wheel the width of four, five, six or seven teeth, respectively, and the insertion of a dime will advance the ratchet wheel 278 the width of one, two, three or four teeth, respectively. While only that setting of the advancement-controlling plate 360 which has the fifth notch of that plate held by the re-entrant bend of the spring 356 is significant when dimes and quarters are the coins to be inserted, other settings of that plate could be significant where coins of other countries were inserted.

Where desired, the coin-handling device of FIGS. 16–28 can be used with coins of just one denomination; and all that need be done to accomplish this result is to remove the coin-actuated elver 320, to set the coin-actuated lever 336 in the position occupied by the lever 320 in FIGS. 16, 19 and 27, to make the coin chute 252 accommodate coins of the desired denomination, and to make the actuator 344 respond to such coins. Where the desired coin is a nickel, the price-setting plate or pawl 262 can be set to require from one through eighteen advancements of the ratchet wheel 278 before the switch 382 is actuated, and the advancement-controlling plate 360 can be set to provide from one through seven advancements of the ratchet wheel 278 for each nickel that is inserted. As a result, many different price combinations are possible. Where the desired coin is a dime, the price-setting plate or pawl 262 can be set to require from one through eighteen advancements of the ratchet wheel 278 before the switch 382 is actuated, and the advancement-controlling plate 360 can be set to provide from one through seven advancements of the ratchet wheel 278 for each dime that is inserted. As a result, many different price combinations are possible. Where the desired coin is a quarter, the price-setting plate or pawl 262 can be set to require from one through eighteen advancements of the ratchet wheel 278 before the switch 382 is actuated, and the advancement-controlling plate 360 can be set to provide from one through seven advancements of the ratchet wheel 278 for each quarter that is inserted. As a result, many different price combinations are possible.

From the foregoing description, it will be readily apparent that the coin-handling device of FIGS. 16–28 is very versatile. Not only can it provide many different price combinations when it is set to respond to coins of just one denomination, but it can also provide many different price combinations when it is set to respond to coins of more than one denomination.

A further embodiment of coin-handling device that is made in accordance with the principles and teachings of the present invention is shown in FIGS. 29–35; and that device includes a main plate 400 which has a vertically-directed flange 402 at one edge thereof and has a vertically-directed flange 404 at the opposite edge thereof. An ear 406 is bent out of the main plate 404, and that ear is inclined relative to the bottom of that main plate, as shown particularly by FIG. 32. A rectangular opening 408 is formed in the main plate 400; and that opening is shown particularly by FIG. 34. A slot 410 and a notch 412 and a slot 414 are formed in the front edge of the flange 402, and those slots and that notch are comparable to the slots and notch in the front edge of the flange 212 in FIG. 16. Slots 428 and 432 and a notch 430 are provided in the front edge of the flange 404, and those slots and that notch are similar to the slots and notch in the front edge of the flange 214 in FIG. 16. A pivot 418 rotatably secures a latch 420 to the flange 402, and a pivot 438 rotatably supports a latch 440 to the flange 404. Ears 424 and 442, respectively, extend inwardly from the latches 420 and 440 through openings 416 and 434, respectively, in the flanges 402 and 404. Ears 422 and 444, respectively, extend outwardly from the latches 420 and 440 and accommodate the upper ends of springs 426 and 446. The lower ends of those springs are held by ears 417 and 436, respectively, in the flanges 402 and 404. The various notches, slots and latches which are in or associated with the flanges 402 and 404 releasably hold a slug rejector, not shown.

The numeral 448 denotes a pivot which is secured to the main plate 400 below the level of the opening 408 in that main plate, as shown particularly by FIG. 34; and that pivot extends forwardly from that main plate. A ratchet wheel 450 has the hub thereof rotatably mounted on the pivot 448, and that hub extends toward the main plate 400. A pin 452 is formed on that ratchet wheel, and that pin also extends toward the main plate 400. A helical extension spring 456 has the lower end thereof bent around the hub of the ratchet wheel 450 and hooked to the pin 452, and that spring has the other end thereof secured to a pin 454 on the main plate 400. That spring biases the ratchet wheel 450 for rotation in the counter clockwise direction as that ratchet wheel is viewed in FIG. 29.

The numeral 458 denotes a pivot which is secured to the main plate 400 at a point above the level of the pivot 448, as shown by FIG. 34. The numeral 460 denotes an electric motor which is secured to the main plate 400; and the output shaft 462 of that motor extends forwardly through an opening in that main plate.

A plate 464 is rotatably mounted on the output shaft 462 of the motor 460; and that plate has an ear 466 which extends away from the main plate 400, has a weight 468 which is secured to that ear, has an arm 470 which is offset from the plane of the rest of that plate, and has an ear 472 which extends away from the main plate 400. A pin 474 is secured to, and extends forwardly from, the main plate 400; and a helical extension spring 476 has the lower end thereof hooked through an opening in the ear 472 on the plate 464 and has the upper end thereof hooked around the pin 474. An L-shaped pawl 480 is rotatably secured to the offset arm 470 of the plate 464 by a pivot 486, and that pawl has an ear 482 which extends away from the main plate 400 and also has an ear 484 which extends toward that main plate. A helical extension spring 478 has the upper end thereof hooked through the opening in the ear 472 on the plate 464 and has the lower end thereof hooked through an opening in one arm of the L-shaped pawl 480, as shown by FIG. 33. That spring urges the ear 484 on the pawl 480 into engagement with one edge of the offset arm 470 of the plate 464, but that spring can yield to permit that ear to move away from that edge.

The numeral 488 denotes a spacer which telescopes over the pivot 458 and which abuts the main plate 400, as shown by FIG. 31. A transfer plate 490 has a shouldered hub 492, and that hub abuts the spacer 488, as shown by FIG. 31. That shouldered hub and that transfer plate co-act to define an annular recess which rotatably supports a pawl 508 which has an ear 510 thereon. That pawl can rotate relative to the transfer plate 490 and can move its ear 510 into and out of the path of the teeth on the ratchet wheel 450. The transfer plate 490 has an ear 494 which extends toward the main plate 400, has an ear 496 which extends away from that main plate, and has an ear 498 which extends toward that main plate. The ear 496 is much longer than either of the ears 494 and 498.

A pivot 500 is secured to the lower end of the transfer plate 490, and that pivot rotatably supports a pawl 502. An ear 504 and an ear 506 are formed on the free end of the pawl 502, and the ear 504 extends away from the main plate 400 while the ear 506 extends toward that main plate. A spring 512 has the lower end thereof hooked through an opening in the upper end of the pawl 508 and has the upper end thereof hooked around the pin 474. That spring biases the pawl 508 for rotation in the clockwise direction as that pawl is viewed in FIG. 33, and thus urges the ear 510 into the path of the teeth on the ratchet wheel 450. However, that spring can yield to permit that ear to be moved out of the path of those teeth.

The numeral 514 denotes a coin-actuated lever which has a hub 516, and that hub is rotatably supported by the pivot 458. That hub is adjacent the plate 490, as shown in FIG. 31. The lever 514 has an ear 518 thereon which extends toward the main plate 400, and it has two small ears 520 which also extend toward that main plate. The ears 518 and 520 support an actuator 522 which has a coin-receiving portion 524; and that coin-receiving portion extends transversely of the axis of the actuator 522. A helical extension spring 526 has the lower end thereof hooked through an opening in the lever 514 and has the upper end thereof hooked around the pin 474. That spring urges the lever 514 and the actuator 522 to their raised positions, but can yield to permit that lever and that actuator to move to their lower positions.

The numeral 528 denotes another coin-actauted lever, and that lever has a hub 530 which is telescoped over the pivot 458. That hub is adjacent the hub 516 of the lever 514, as shown by FIG. 31. The lever 528 has an ear 532 which extends toward the main plate 400, has a second ear 534 which extends toward the main plate 400, and has two small ears 536 which also extend toward that main plate. The ears 534 and 536 coact to support an actuator 538 which has a coin-receiving portion 540; and that coin-receiving portion is disposed at right angles to the axis of that actuator. A helical extension spring 542 has the lower end thereof hooked through an opening in the lever 528 and has the upper end thereof hooked around the pin 474. That spring biases the lever 528 and the actuator 538 for movement to their upper positions but can yield to permit rotation of that lever and of that actuator to their lower positions.

The numeral 544 denotes a coin chute which is mounted adjacent the flange 404, and that coin chute has a notch 546 which accommodates the coin-receiving portion 540 of the actuator 538. The numeral 548 denotes a second coin chute which is mounted adjacent the flange 404 and that chute has a notch 550 which accommodates the coin-receiving portion 524 of the actuator 522. The actuators 522 and 538 are held against unlimited upward movement by a stop 552 which extends outwardly from the flange 404. That stop is disposed at the approximate level of the upper ends of the coin chutes 544 and 548; and that stop overlies the coin-receiving portion 524 of the actuator 522 and overlies the coin-receiving portion 540 of the actuator 538.

The numeral 554 denotes a bracket which has a flange 556 that is secured to the flange 402 by fasteners 558. An ear 560 is provided on the bracket 556, and that ear supports a leaf-type spring 572 which has a reentrant lower end. A pivot 562 is secured to the bracket 554, and that pivot rotatably supports a plate 564 which has a horizontally-directed flange 566. An ear 568 projects outwardly from the right-hand edge of that plate, and the left-hand edge of that plate is provided with notches 570. Then notches 570 will be engaged by the re-entrant end of the leaf spring 572, and that re-entrant end will coact with those notches to hold the plate 564 against accidental rotation.

The numeral 574 denotes a flanged hub which is secured to, and rotatable with, the output shaft 462 of the motor 460. A number of pins 576 are secured to the flange of that hub, and those pins are coaxial with the output shaft 462. In the particular embodiment shown, there are six such pins; and those pins are distributed equally around the circumference of the flange of that hub.

An elongated leaf spring 578 has the lower end thereof secured to the ear 406 on the main plate 400. A weight 580 is secured to the free end of that spring, and that free end will normally lie in the path of the pins 576 on the flanged hub 574.

The numeral 582 denotes an electric switch that is secured to the main plate 400, adjacent the top of that main plate, and that switch has an actuating button 584 which is biased downwardly from the lower face of that switch. A pivot 586 is secured to the main plate 400 below the level of the switch 502, and that pivot rotatably supports an L-shaped lever 588. The horizontal portion of that lever underlies the actuating button 584 of the switch 582 and can act to move that button upwardly and inwardly of the switch housing. An ear 590 is provided on the lower end of the switch lever 588, and that ear extends through the opening 408 in the main plate 400, as shown particularly by FIG. 34.

In the normal position of the components of the coin-handling device shown in FIGS. 29–35, the switch lever 588 is in the position shown by FIG. 34; and is holding the actuating button 584 up in position within the housing for the switch 582 because the pin 452 on the ratchet wheel 450 is in engagement with the right-hand face of the ear 590 on the lever 588, as shown particularly by FIG. 33. The spring 512 is urging the ear 510 on the pawl 508 into engagement with one of the teeth on the ratchet wheel 450, and is thus holding the pin 452 in engagement with the ear 590 on the switch lever 488. The springs 526 and 542 are urging the levers 514 and 528 to their raised positions, and the stop 552 is overlying the coin-receiving portions 524 and 540 of the actuators 522 and 538 to limit upward movement of those actuators and of those levers.

If it is assumed that the plate 564 is set in the position shown by FIG. 30, the coin-handling device of FIGS. 29–35 can respond to the insertion of nickels and dimes to actuate the switch 582. When a nickel is inserted in that coin-handling device, that nickel will be tested by the slug rejector, not shown, and then delivered to the coin chute 544. As that nickel starts to enter that coin chute, it will engage the coin-receiving portion 540 of the actuator 538 and cause the coin-actuated lever 528 to rotate in the clockwise direction in FIG. 30. The rotation will cause the ear 532 on that coin-actuated lever to move into the path of the ear 504 on the pawl 502, and it will also cause the ear 534 on that lever to move toward the ear 496 on the transfer plate 490. At this time the coin-receiving portion 540 of the actuator 538 will be spaced from the flange 404 a distance less than the diameter of a nickel; and hence the nickel will have to move the actuator 538 further downwardly in order to pass through, and beyond, the coin chute 544. Such further downward movement of the actuator 538 will cause the ear 534 to rotate the transfer plate 490 in the clockwise direction about the pivot 458; and will thus enable that transfer plate to move the ear 506 on the pawl 502 into the path of a tooth on the ratchet wheel 450 and will then enable the ear 494 on that transfer plate to move the ear 510 on the pawl 508 out of the path of the teeth on that ratchet wheel. Thereupon the spring 456 will rotate the ratchet wheel 450 in the counter clockwise direction in FIG. 29. That rotation will be halted when the ear 504 on the pawl 502 engages and is held by the ear 532 on the coin-actuated lever 528; but that rotation will advance the ratchet wheel a distance almost equal to the width of a tooth on that ratchet wheel.

As the nickel moves downwardly beyond the coin-receiving portion 540, the bias applied by the spring 542 will start the coin-actuated lever 528 rotating back toward its normal position; and thereupon the bias applied by the spring 512 will cause the pawl 508 to start rotating back toward its normal position. As that pawl so rotates, it will rotate the transfer plate 490 in the counter clockwise direction, and it will move its ear 510 toward the path of the teeth on the ratchet wheel 450. As that pawl rotates its ear 510 into the path of the teeth on the ratchet wheel 450, it will enable the transfer plate 490 to shift the ear 506 on the pawl 502 out of the path of the teeth on the ratchet wheel 450; and thereupon that ratchet wheel will rotate a short additional distance in the counter clockwise direction until it engages and is held by the ear 510 on the pawl 508. Also, the pawl 502 will fall downwardly and come to rest, once again, on the ear 568 of the plate 564.

The overall result is that the ratchet wheel 450 and the pawl 502 will have advanced a distance equal to the width of a tooth; and that advancement of that ratchet wheel will have moved the pin 452 to the right in FIG. 33, and will thus have permitted the lever 588 to rotate a short distance in the counter clockwise direction in FIG. 34. That rotation will have been enough to permit the actuating button 584 of the switch 582 to move far enough to actuate that switch. As a result, the motor 460 will have become energized and a circuit will have been completed to the controlled device, not shown, with which the coin-handling device of FIGS. 29–35 is used.

The motor 460 will rotate its shaft 462 in the clockwise direction in FIG. 29; and at the end of a predetermined period of time it will cause one of the pins 576 on the flanged hub 574 to bend the upper end of the leaf spring 578 downwardly and to the left. As that pin does so, it will store energy within that spring; and as that pin moves beyond the free end of spring 578, that spring will respond to the energy stored therein to move to and through the normal position shown in FIG. 29. As that spring moves through and beyond that normal position, it will engage the ear 466 on the plate 464 and thereby rotate that plate in the counter clockwise direction in FIG. 32 and in the clockwise direction in FIG. 33. That rotation will cause the ear 482 on the pawl 480 to engage one of the teeth on the ratchet wheel 450 and force that ratchet wheel to rotate in the counter clockwise direction in FIG. 33 a distance equal to the width of one tooth. The inclined face of the tooth on the ratchet wheel 450 which is adjacent the ear 510 on the pawl 508 will cam that ear upwardly to enable that tooth to pass under that ear. The rotation of the plate 464 in the clockwise direction in FIG. 33 will be halted when that lever engages a stop 595 mounted on the main plate 400. Thereafter, the spring 578 will return to the normal position shown in FIG. 29; and at such time the weight 468 will restore the plate 464 to its normal position. As the plate 464 rotates in the counter clockwise direction in FIG. 33, the spring 478 will yield to permit the ear 482 to rise upwardly as it moves past the teeth on the ratchet wheel 450. The weights 580 and 486, respectively, on the leaf spring 578 and on the plate 464 will coact to assure full rotation of that plate toward the stop 595.

As the ratchet wheel 450 returned to its normal position, the pin 452 thereon moved to the left in FIG. 33 and thereby forced the ear 590 on the lever 588 to the left. That movement of that ear caused the lever 588 to push the actuating button 584 of the switch 582 upwardly to restore that switch to its initial position.

The overall result is that the insertion of a nickel enabled the coin-handling device of FIGS. 29–35 to initiate a cycle of operation of the controlled device with which the coin-handling device of FIGS. 29–35 is used. Further, it enabled the motor 460 to restore the components of that coin-handling device to their normal positions. The manner in which the ratchet wheel of FIGS. 29–35 is restored is similar to the manner in which the ratchet wheels are restored in my co-pending patent application Serial No. 65,811 for Coin Separators which was filed October 28, 1960.

A patron can then insert a further nickel to initiate a further cycle of operation of the controlled device with which the coin-handling device of FIGS. 29–35 is used, but a patron may prefer to insert a dime. That dime will be tested by the slug rejector, not shown, and will be delivered to the coin chute 548. As that dime starts to enter that coin chute, it will engage the coin-receiving portion 524 of the actuator 522 and cause the coin-actuated lever 514 to move downwardly. Such movement will cause the ear 518 on that coin-actuated lever to engage the ear 496 on the transfer plate 490 and start rotating that transfer plate in the clockwise direction. Such rotation will cause the ear 506 on the pawl 502 to move into the path of the teeth on the ratchet wheel 450 and will then cause the ear 494 on that transfer plate to shift the ear 510 on the pawl 508 out of the path of the teeth on that ratchet wheel. As the ear 510 moves out of the path of the teeth on that ratchet wheel, that ratchet wheel will be freed for rotation in the counter clockwise direction; and thereupon the spring 456 will rotate that ratchet wheel in that direction in FIG. 32. That rotation will be halted when the pawl 502 engages and is held by the ear 498 on the transfer plate 490. The pawl 502 will be forced to rotate with that ratchet wheel, because of the engagement between the ear 506 thereon and one of the teeth of that ratchet wheel; and that pawl and ratchet wheel will rotate in the counter clockwise direction a distance almost equal to the width of two teeth on that ratchet wheel.

As the dime moves downwardly beyond the coin-receiving portion 524, the bias applied by the spring 526 will start the coin-actuated lever 514 rotating back toward its normal position; and thereupon the bias applied by the spring 512 will cause the pawl 508 to start rotating back toward its normal position. As that pawl so rotates, it will rotate the transfer plate 490 in the counter clockwise direction, and it will move its ear 510 toward the path of the teeth on the ratchet wheel 450. As that pawl rotates its ear 510 into the path of the teeth on the ratchet wheel 450, it will cause the transfer plate 490 to shift the ear 506 on the pawl 502 out of the path of the teeth on the ratchet wheel 450; and thereupon that ratchet wheel will rotate a short additional distance in the counter clockwise direction until it engages and is held by the ear 510 on the pawl 508. Also, the pawl 502 will fall downwardly and come to rest, once again, on the ear 568 of the plate 564.

The overall result is that the ratchet wheel 450 and the pawl 502 will have advanced a distance equal to the width of two teeth; and this means that the pin 452 will have moved further to the left in FIG. 33 than is needed to enable the lever 588 to rotate far enough to enable the switch 582 to be actuated. Consequently, a cycle of operation of the controlled device with which the coin-handling device of FIGS. 29–35 is used will be initiated, and the motor 460 will be energized. The motor 460 will cause the shaft 462 to rotate in the clockwise direction in FIG. 29; and, at the end of a predetermined length of time, one of the pins 576 thereon will cause the leaf spring 578 to bow downwardly and to the left and will then release that spring. The releasing of that spring will move the ratchet wheel 450 in the clockwise direction in FIG. 29 a distance equal to the width of a tooth, all as explained hereinbefore. However, that movement will not be long enough to return the actuating button 584 to its upper position; and hence the switch 582 will continue to run the motor 460 and will keep the energizing circuit of the controlled device closed. At the end of a second predetermined period of time, a further pin 576 on the flanged hub 574 will cause the leaf spring 578 to bow downwardly and to the left and will then release that spring. The releasing of that spring will move the ratchet wheel 450 in the clockwise direction in FIG. 29 a distance equal to the width of a tooth, all as explained hereinbefore. That movement will be long enough to return the actuating button 584 to its upper position. In this way, the coin-handling device provided by FIGS. 29–35 can respond to the insertion of a dime to initiate two cycles of operation of the controlled device with which that coin-hadling device is used, and can cause that coin-handling device to restore its components to their normal positions at the end of that second cycle of operation.

Where desired, more than one nickel can be inserted, more than one dime can be inserted, or combinations of nickels and dimes can be inserted. Each nickel will effect an advancement of the ratchet wheel 450 which is equal to the width of one tooth on that ratchet wheel and each dime will effect an advancement of that ratchet wheel which is equal to the width of two teeth on that ratchet wheel. The various advancements of the ratchet wheel 450 will store appropriate credits; and the coin-handling device of FIGS. 29–35 will respond to each unit of credit to provide a cycle of operation of the controlled device. Then, as the last unit of credit is erased by a clockwise stepping of the ratchet wheel 450 in FIG. 29, the switch 582 will be restored to its normal condition.

If desired, the coin-actuated lever 528 could be mounted in the position occupied by the coin-actuated lever 514 in FIGS. 30 and 31, and the coin-actuated lever 528 could have the portion which supports the ear 532 lengthened by a distance equal to the width of a tooth on the ratchet wheel 450. Further, the coin chute 548 could be made to accommodate nickels. In addition, the lever 514 could be mounted in the position occupied by the lever 528 in FIGS. 30 and 31, the coin chute 544 could be made to accommodate quarters, and the actuator 522 could be made to respond to quarters. Where this is done, and where the advancement-controlling plate 564 has the fifth notch 570 thereof set in engagement with the re-entrant lower end of the spring 572, the coin-handling device of FIGS. 29–35 can respond to nickels and quarters.

When a nickel is inserted, that nickel will be tested by the slug rejector, not shown, and then delivered to the coin chute 548. As that nickel starts to enter that chute, it will engage the coin-receiving portion 540 of the actuator 538 and cause the coin actuated lever 528 to rotate in the clockwise direction in FIG. 29. That rotation will cause the ear 532 on that lever to move into the path of the ear 506 on the pawl 502, and it will also cause the ear 534 on that lever to move toward the ear 496 on the transfer plate 490. At this time, the coin-receiving portion 540 of the actuator 538 will be spaced from the flange 404 a distance less than the diameter of a nickel; and hence the nickel will have to move the actuator 538 further downwardly in order to pass through, and beyond, the coin chute 548. Such further downward movement of the actuator 538 will cause the ear 534 to rotate the transfer plate 490 in the clockwise direction about the pivot 458; and will thus enable that transfer plate to move the ear 506 on the pawl 502 into the path of a tooth on the ratchet wheel 450 and will then enable the ear 494 on that transfer plate to move the ear 510 on the pawl 508 out of the path of the teeth on that ratchet wheel. Thereupon, the spring 456 will rotate the ratchet wheel 450 in the counter clockwise direction in FIG. 29. That rotation will be halted when the ear 506 on the pawl 502 engages and is held by the ear 532 on the lever 528; but that rotation will advance the ratchet wheel a distance almost equal to the width of a tooth on that ratchet wheel.

As the nickel moves downwardly beyond the coin-receiving portion 540, the bias applied by the spring 542 will start the coin-actuated lever 528 rotating back toward its normal position; and thereupon the bias applied by the spring 512 will cause the pawl to start rotating back toward its normal position. As that pawl so rotates, it will rotate the transfer plate 490 in the counter clockwise direction, and it will move its ear 510 toward the path of the teeth on the ratchet wheel 450. As that pawl rotates its ear 510 into the path of the teeth on the ratchet wheel 450, it will enable the transfer plate 490 to shift the ear 506 on the pawl 502 out of the path of the teeth on the ratchet wheel 450; and thereupon that ratchet wheel will rotate a short additional distance in the counter clockwise direction until it engages and is held by the ear 510 on the pawl 508. Also, the pawl 502 will fall downwardly and come to rest, once again, on the ear 568 of the plate 564.

The overall result is that the ratchet wheel 450 and the pawl 502 will have advanced a distance equal to the width of a tooth, and that advancement will enable the switch 582 to become actuated. Thereupon, a cycle of operation of the controlled device, with which the coin-handling device of FIGS. 29–35 is used, will be initiated, and the motor 460 will be energized. That motor will cause its output shaft 462 to rotate in the clockwise direction in FIG. 29; and, after a predetermined length of time, one of the pins 576 on the flanged hub 574 will interact with the spring 578 to effect the return of the ratchet wheel 450 to its normal position, with consequent restoration of the switch 582 to its initial condition.

If a quarter is inserted, the slug rejector, not shown, will test that quarter and will deliver it to the coin chute 544. As that quarter starts to enter that coin chute, it will engage the coin-receiving portion 524 of the actuator 522 and cause the coin-actuated lever 514 to move downwardly. Such movement will cause the ear 518 on that lever to engage the ear 496 on the transfer plate 490 and start rotating that transfer plate in the clockwise direction. Such rotation will cause the ear 506 on the pawl 502 to move into the path of the teeth on the ratchet wheel 450 and will then cause the ear 494 on that transfer plate to shift the ear 510 on the pawl 508 out of the path of the teeth on that ratchet wheel. As the ear 510 moves out of the path of the teeth on the ratchet wheel 450, that ratchet wheel will be freed for rotation in the counter clockwise direction; and thereupon the spring 456 will rotate that ratchet wheel in that direction in FIG. 32. That rotation will be halted when the pawl 502 engages and is held by the ear 498 on the transfer plate 490. The pawl 502 will be forced to rotate with that ratchet wheel, because of the engagement between the ear 506 thereon and one of the teeth of that ratchet wheel; and that pawl and ratchet wheel will rotate in the counter clockwise direction a distance almost equal to the width of five teeth on that ratchet wheel.

As the quarter moves downwardly beyond the coin-receiving portion 524, the bias applied by the spring 526 will start the coin-actuated lever 514 rotating back toward its normal position; and thereupon the bias applied by the spring 512 will cause the pawl 508 to start rotating back toward its normal position. As that pawl so rotates, it will rotate the transfer plate 490 in the counter clockwise direction, and it will move its ear 510 toward the path of the teeth on the ratchet wheel 450. As that pawl rotates its ear 510 into the path of the teeth on the ratchet wheel 450, it will cause the transfer plate 490 to shift the ear 506 on the pawl 502 out of the path of the teeth on the ratchet wheel 450; and thereupon that ratchet wheel will rotate a short additional distance in the counter clockwise direction until it engages and is held by the ear 510 on the pawl 508. Also, the pawl 502 will fall downwardly and come to rest, once again, on the ear 568 of the plate 564.

The overall result is that the ratchet wheel 450 and the pawl 502 wil have advanced a distance equal to the width of five teeth, and this means that the switch 582 will have initiated a cycle of operation of the controlled device, with which the coin-handling device of FIGS. 29–35 is used, and will have energized the motor 460. That motor will rotate its output shaft 462 in the clockwise direction; and, after a predetermined length of time, one of the pins 576 on the flanged hub 574 will interact with the spring 578 to step the ratchet wheel 450 back toward its normal position a distance equal to the width of one tooth. That movement will not affect the switch 582, and hence the motor 460 will remain energized and the energizing circuit for the controlled device will remain closed. The output shaft 462 will continue to rotate the flanged hub 574; and further pins 576 on that flanged hub will successively move the ratchet wheel 450 back toward its normal position in step-by-step fashion, thereby providing a multiple number of timed cycles for the controlled device with which the coin-handling device of FIGS. 29–35 is used. As a fifth pin 576 coacts with the spring 578 to apply a fifth returning step to the ratchet wheel 450, the pin 452 on that ratchet wheel will engage the ear 590 on the lever 588 and thereby restore the switch 582 to its normal condition. At such time, the motor 460 will become de-energized and the initiating circuit of the controlled device will be broken.

Where desired, more than one nickel can be inserted, more than one quarter can be inserted, or combinations of nickels and quarters can be inserted. The insertion of the nickels or the insertion of the quarters will provide appropriate advancements of the ratchet wheel 450. The various advancements of the ratchet wheel 450 will store appropriate credits; and the coin-handling device of FIGS. 29–35 will respond to each unit of credit to provide a cycle of operation of the controlled device. Then, as the last unit of credit is erased by a clockwise stepping of the ratchet wheel 450 in FIG. 29, the switch 582 will be restored to its normal condition.

If desired, the coin-actuated lever 528 could be set in the position occupied by the coin-actuated lever 514 in FIGS. 30 and 31, the actuator 538 could be lengthened to respond to dimes, the coin-actuated lever 514 could be set in the position occupied by the lever 528 in FIGS. 30 and 31, the actuator 522 could be shortened to accommodate quarters, and the coin chute 544 could be made to accommodate quarters. Where this is done, and when the advancement-controlling plate 564 has the fifth notch 570 thereof set in engagement with the re-entrant lower end of the spring 572, the coin-handling device of FIGS. 29–35 can accommodate dimes and quarters. When a dime is inserted, that dime will be tested by the slug rejector, not shown, and then delivered to the coin chute 548. As that dime starts to enter that coin chute, it will engage the coin-receiving portion 540 of the actuator 538 and cause the coin-actuated lever 528 to rotate in the clockwise direction in FIG. 30. That rotation will cause the ear 532 on that lever to move into the path of the ear 506 on the pawl 502, and it will also cause the ear 534 on that lever to move toward the ear 496 on the transfer plate 490. Further movement of the actuator 538 will cause the ear 534 to rotate the transfer plate 490 in the clockwise direction about the pivot 458; and will thus enable that transfer plate to move the ear 506 on the pawl 502 into the path of a tooth on the ratchet wheel 450 and will then enable the ear 494 on that transfer plate to move the ear 510 on the pawl 508 out of the path of the teeth on that ratchet wheel. Thereupon the spring 456 will rotate that ratchet wheel in the counter clockwise direction in FIG. 30. That rotation will be halted when the ear 506 engages and is held by the ear 532 on the lever 528; but that rotation will advance the ratchet wheel 450 a distance almost equal to the width of two teeth on that ratchet wheel.

As the dime moves downwardly beyond the coin-receiving portion 540, the spring 542 will start the coin-actuated lever 528 rotating back toward its normal position; and thereupon the bias applied by the spring 512 will cause the pawl 510 to start rotating back toward its normal position. As that pawl so rotates, it will rotate the transfer plate 490 in the counter clockwise direction, and it will move its ear 510 toward the path of the teeth on the ratchet wheel 508. As that pawl rotates its ear 510 into the path of the teeth on the ratchet wheel 450, it will enable the transfer plate 490 to shift the ear 506 on the pawl 502 out of the path of the teeth on the ratchet wheel 450; and thereupon that ratchet wheel will rotate a short additional distance in the counter clockwise direction until it engages and is held by the ear 510 on the pawl 508. Also, the pawl 502 will fall downwardly and come to rest, once again, on the ear 568 of the plate 564.

If a quarter is inserted, the slug rejector, not shown, will test that quarter and will deliver it to the coin chute 544. As that quarter starts to enter that chute, it will engage the coin-receiving portion 524 of the actuator 522 and will cause the coin-actuated lever 514 to move downwardly. Such movement will cause the ear 513 on that coin-actuated lever to engage the ear 496 on the transfer plate 490 and start rotating that transfer plate in the clockwise direction. Such rotation will cause the ear 506 on the pawl 502 to move into the path of the teeth on the ratchet wheel 450 and will then cause the ear 494 on that transfer plate to shift the ear 510 on the pawl 508 out of the path of the teeth on that ratchet wheel. As the ear 510 moves out of the path of the teeth on the ratchet wheel 450, that ratchet wheel will be freed for rotation in the counter clockwise direction; and thereupon the spring 456 will rotate that ratchet wheel in that direction in FIG. 32. That rotation will be halted when the pawl 502 engages and is held by the ear 498 on the transfer plate 490. The pawl 502 will be forced to rotate with that ratchet wheel, because of the engagement between the ear 506 thereon and one of the teeth of that ratchet wheel; and that pawl and ratchet wheel will rotate in the counter clockwise direction a distance almost equal to the width of five teeth on that ratchet wheel.

As the quarter moves downwardly beyond the coin-receiving portion 524, the bias applied by the spring 526 will start the coin-actuated lever 514 rotating back toward its normal position; and thereupon the bias applied by the spring 512 will cause the pawl 508 to start rotating back toward its normal position. As that pawl so rotates, it will rotate the transfer plate 490 in the counter clockwise direction; and it will move its ear 510 toward the path of the teeth on the ratchet wheel 450. As that pawl rotates its ear 510 into the path of the teeth on the ratchet wheel 450, it will cause the transfer plate 490 to shift the ear 506 on the pawl 502 out of the path of the teeth on the ratchet wheel 450; and thereupon that ratchet wheel will rotate a short additional distance in the counter clockwise direction until it engages and is held by the ear 510 on the pawl 508. Also, the pawl 502 will fall downwardly and come to rest, once again, on the ear 568 of the plate 564.

Whether a dime or a quarter is inserted, the ratchet wheel 450 will be advanced far enough in the counter clockwise direction to effect the actuation of the switch 582 and to establish at least one additional credit. In the case of a dime, just one extra credit is established; but in the case of a quarter, four extra credits are established. The insertion of additional dimes and of additional quarters would establish further additional credits. At the end of each cycle of operation of the controlled device, one of the pins 576 on the flanged hub 574 will coact with the spring 578 to step the ratchet wheel 450 back toward its initial position a distance equal to the width of a tooth. As the last unit of credit is erased by a clockwise stepping of the ratchet wheel 450 in FIG. 29, the switch 582 will be restored to its normal condition.

If desired, the coin-handling device of FIGS. 29-35 can be used to accommodate coins of just one denomination; and where that is done the advancement-controlling plate 564 can be set in different positions to provide the desired advancement of the ratchet wheel 450, all as described above in connection with the coin-handling device of FIGS. 16-28. Further, as described above in connection with the coin-handling device of FIGS. 16-28, appropriate settings of the advancement-controlling plate 564 can provide various advancements for combinations of two coin-actuated levers. For example, where the coin-actuated lever 528 responds to nickels and the lever 514 responds to dimes, the advancement-controlling plate 564 can be set to have its first, second, third, fourth, fifth, sixth or seventh notch 570 held by the re-entrant end of the spring 572 to provide, respectively, zero through six advancements when a nickel is inserted or one through seven advancements when a dime is inserted. Where the coin-actuated lever 528 is set in the position occupied by the lever 514 in FIGS. 30 and 31 and is adapted to respond to dimes while the lever 514 is set in the position occupied by the lever 528 in FIGS. 30 and 31 and is adapted to respond to quarters, the first, second, third, fourth, fifth, sixth or seventh notch 570 of the advancement-controlling plate 564 can be set in engagement with the re-entrant lower end of the spring 572 to provide, respectively, zero, zero, zero, one, two, three or four advancements when a dime is inserted or to provide one through seven advancements when a quarter is inserted. Where the lever 528 is set in the position occupied by the lever 514 in FIGS. 30 and 31 and is adapted to respond to nickels and has the portion thereof which supports the ear 532 lengthened the distance of one tooth while the lever 514 is set in the position occupied by the lever 528 in FIGS. 30 and 31 and is adapted to respond to quarters, the first, second, third, fourth, fifth, six or seventh notch 570 of the advancement-controlling plate 564 can be set in engagement with the re-entrant lower end of the spring 572 to provide, respectively, zero, zero, zero, zero, one, two or three advancements when a nickel is inserted or to provide one through seven advancements when a quarter is inserted.

From this, it will be apparent that the coin-handling device of FIGS. 29-35 is very versatile. Not only can it respond to a number of coins of the same denomination to provide energizations of pre-selected duration for the controlled device, but it can also respond to the insertion of coins of different denominations to provide energizations of different pre-selected durations for that controlled device.

In several instances, in regard to the coin-handling devices of FIGS. 16-28 and FIGS. 29-35, it has been pointed out that the positions of the coin-actuated levers could be interchanged. Where those positions are interchanged, the positions of the springs associated with those coin-actuated levers will preferably also be interchanged. Further, where those positions are interchanged, the lengths of the coin-receiving portions of the actuators will be appropriately shortened or lengthened to enable those coin-receiving portions to clear the coin chutes while lying in the paths of the appropriate coins.

It will be noted, in each of the various coin-handling devices of FIGS. 1-35, that the transfer plate is largely coextensive with the ratchet wheel. Further, it will be noted, in each of those coin-handling devices, that the transfer plate holds the pivot for the advancing pawl closely adjacent the center of the ratchet wheel. The overall result is that the advancing pawl can readily rotate with the ratchet wheel.

In each of the coin-handling devices of FIGS. 1-35, the holding pawl and the transfer plate are mounted on the same pivot. This is desirable because it eliminates any sliding friction between that pawl and that transfer plate. Similarly, the transfer plate and the coin-actuated levers in each of those coin-handling devices are mounted on the same pivot. This is desirable because it eliminates any sliding friction between that transfer plate and those coin-actuated levers.

If desired, additional coin-actuated levers could be added to the various coin-handling devices. For example, in the coin-handling device of FIGS. 1-15A, a fifty cent lever could be added. Where that is done, the quarter lever 174 will have an ear formed thereon which will be comparable to, but will be spaced above the level of the ear 164 on the dime lever 156.

If desired, the transfer plates of the various coin-handling devices could be equipped with adjustable ears that would underlie the advancing pawls. Such ears could be used in lieu of the advancement-controlling plates to establish the initial positions of the advancing pawls.

In the coin-handling device of FIGS. 1-15A, the rotation of the ratchet wheel effects the advancement of the rotor of a multi-contact switch. However, where desired, that ratchet wheel could be used to effect the advancement of mechanical registering mechanisms, could be used to actuate other kinds of switches, or could be used to actuate locking or unlocking mechanisms.

If desired, in the coin-handling device of FIGS. 29–35, the flanged hub 574 could be mounted on a shaft of the controlled device. Where that was done, the motor 460 could be eliminated.

Whereas the drawing and accompanying description have shown and described several preferred embodiments of the present invention, it should be apparent to those skilled in the art that various changes may be made in the form of the invention without affecting the scope hereof.

What I claim is:

1. A coin-handling device that can respond to the insertion of coins to establish credits and that comprises:
   (a) a pivot,
   (b) a ratchet wheel rotatably mounted on said pivot,
   (c) a spring biasing said ratchet wheel for rotation in one direction,
   (d) a pawl that normally engages said ratchet wheel to prevent rotation of said ratchet wheel in said direction,
   (e) a second pivot,
   (f) a lever that has an actuator thereon with a coin-receiving portion which is adapted to receive coins of a predetermined denomination,
   (g) a second lever that has an actuator thereon with a coin-receiving portion that is adapted to receive coins of a second denomination,
   (h) said levers being rotatably mounted on said second pivot and being rotatable relative to the first said pivot and to said ratchet wheel,
   (i) a transfer plate that is rotatably mounted on said second pivot and that is selectively engageable by each of said levers,
   (j) said transfer plate normally permitting said pawl to remain in position to hold said ratchet wheel against rotation in said direction but being movable by each of said levers to move said pawl to a position where it frees said ratchet wheel,
   (k) said transfer plate being in part coextensive with said ratchet wheel,
   (l) a third pivot that is carried by said transfer plate and that is adjacent the first said pivot,
   (m) a second pawl that is rotatably secured to said transfer plate by said third pivot and that is movable with said transfer plate,
   (n) said second pawl normally being spaced from said ratchet wheel to permit rotation of said ratchet wheel relative to said second pawl but responding to movement of said transfer plate to move into engagement with said ratchet wheel,
   (o) said second pawl being in part coextensive with said ratchet wheel and having the center of rotation thereof adjacent the first said pivot whereby said second pawl can rotate with said ratchet wheel,
   (p) a stop that is adjacent said ratchet wheel and that is adapted to normally hold said second pawl in a predetermined position adjacent said ratchet wheel,
   (q) a second stop that is adjacent said ratchet wheel and that is spaced from the first said stop and that is adapted to intercept said second pawl when said second pawl rotates with said ratchet wheel and to thereby halt rotation of said ratchet wheel,
   (r) a third stop that is spaced from the first said stop a distance different than the spacing between the first said stop and said second stop,
   (s) said third stop being adapted to intercept said second pawl when said second pawl rotates with said ratchet wheel and to thereby halt rotation of said ratchet wheel,
   (t) a mechanism that can selectively restore said ratchet wheel to its normal position,
   (u) and a price-setting member that is movable with said ratchet wheel to permit initiation of a cycle of operation of a controlled device with which said coin-handling device is used,
   (v) the first said stop being adjustable to provide a number of initial positions in which said second pawl can be held and can thereby provide a number of individually different advancements for said second pawl,
   (w) said price-setting member being a plate that can be set in different positions relative to said ratchet wheel and can thereby vary the number of advancements of said ratchet wheel required to permit initiation of said cycle of operation of said controlled device,
   (x) said second stop being on said second lever and normally being spaced out of the path of movement of said second pawl but moving into said path of movement of said second pawl when a coin engages and moves said coin-receiving portion of said actuator of said second lever,
   (y) said third stop being on said transfer plate,
   (z) said price-setting member and the first said stop providing a multiplicity of possible price-advancement combinations for said coin-handling device,
   (aa) said pawls being disposed at opposite sides of said ratchet wheel.

2. A coin-handling device that can respond to the insertion of coins to establish credits and that comprises:
   (a) a pivot,
   (b) a ratchet wheel rotatably mounted on said pivot,
   (c) a spring biasing said ratchet wheel for rotation in one direction,
   (d) a pawl that normally engages said ratchet wheel to prevent rotation of said ratchet wheel in said direction,
   (e) a second pivot,
   (f) a lever that has an actuator thereon with a coin-receiving portion which is adapted to receive coins of a predetermined denomination,
   (g) a second lever that has an actuator thereon with a coin-receiving portion that is adapted to receive coins of a second denomination,
   (h) said levers being rotatably mounted on said second pivot and being rotatable relative to the first said pivot and to said ratchet wheel,
   (i) a transfer plate that is rotatably mounted on said second pivot and that is selectively engageable by each of said levers,
   (j) said transfer plate normally permitting said pawl to remain in position to hold said ratchet wheel against rotation in said direction but being movable by each of said levers to move said pawl to a position where it frees said ratchet wheel,
   (k) said transfer plate being in part coextensive with said ratchet wheel,
   (l) a third pivot that is carried by said transfer plate and that is adjacent the first said pivot,
   (m) a second pawl that is rotatably secured to said transfer plate by said third pivot and that is movable with said transfer plate,
   (n) said second pawl normally being spaced from said ratchet wheel to permit rotation of said ratchet wheel relative to said second pawl but responding to movement of said transfer plate to move into engagement with said ratchet wheel,
   (o) said second pawl being in part coextensive with said ratchet wheel and having the center of rotation thereof adjacent the first said pivot whereby said second pawl can rotate with said ratchet wheel,
   (p) a stop that is adjacent said ratchet wheel and that is adapted to normally hold said second pawl in a predetermined position adjacent said ratchet wheel,
   (q) a second stop that is adjacent said ratchet wheel and that is spaced from the first said stop and that is adapted to intercept said second pawl when said second pawl rotates with said ratchet wheel and to thereby halt rotation of said ratchet wheel, (r) a third stop that is spaced from the first said stop a distance different than the spacing between the first said stop and said second stop, (s) said third stop being adapted to intercept said second pawl when said second pawl rotates with said ratchet wheel and to thereby halt rotation of said ratchet wheel, (t) a mechanism that can selectively restore said ratchet wheel to its normal position, (u) said second stop being on said second lever and normally being spaced out of the path of movement of said second pawl but moving into said path of movement of said second pawl when a coin engages and moves said coin-receiving portion of said actuator of said hand lever, (v) said third stop being on said transfer plate, (w) said pawls being disposed at opposite sides of said ratchet wheel.

3. A coin-handling device that can respond to the insertion of coins to establish credits and that comprises:

(a) a pivot,
(b) a ratchet wheel rotatably mounted on said pivot,
(c) a spring biasing said ratchet wheel for rotation in one direction,
(d) a pawl that normally engages said ratchet wheel to prevent rotation of said ratchet wheel in said direction,
(e) a second pivot,
(f) a lever that has an actuator thereon with a coin-receiving portion which is adapted to receive coins of a predetermined denomination,
(g) a second lever that has an actuator thereon with a coin-receiving portion that is adapted to receive coins of a second denomination,
(h) said levers being rotatably mounted on said second pivot and being rotatable relative to the first said pivot and to said ratchet wheel,
(i) a transfer plate that is rotatably mounted on said second pivot and that is selectively engageable by each of said levers,
(j) said transfer plate normally permitting said pawl to remain in position to hold said ratchet wheel against rotation in said direction but being movable by each of said levers to move said pawl to a position where it frees said ratchet wheel,
(k) said transfer plate being in part coextensive with said ratchet wheel,
(l) a third pivot that is carried by said transfer plate and that is adjacent the first said pivot,
(m) a second pawl that is rotatably secured to said transfer plate by said third pivot and that is movable with said transfer plate,
(n) said second pawl normally being spaced from said ratchet wheel to permit rotation of said ratchet wheel relative to said second pawl but responding to movement of said transfer plate to move into engagement with said ratchet wheel,
(o) said second pawl being in part coextensive with said ratchet wheel and having the center of rotation thereof adjacent the first said pivot whereby said second pawl can rotate with said ratchet wheel,
(p) a stop that is adjacent said ratchet wheel and that is adapted to normally hold said second pawl in a predetermined position adjacent said ratchet wheel,
(q) a second stop that is adjacent said ratchet wheel and that is spaced from the first said stop and that is adapted to intercept said second pawl when said second pawl rotates with said ratchet wheel and to thereby halt rotation of said ratchet wheel,
(r) a third stop that is spaced from the first said stop a distance different than the spacing between the first said stop and said second stop, (s) said third stop being adapted to intercept said second pawl when said second pawl rotates with said ratchet wheel and to thereby halt rotation of said ratchet wheel, (t) a mechanism that can selectively restore said ratchet wheel to its normal position.

4. A coin-handling device that can respond to the insertion of coins to establish credits and that comprises:

(a) a pivot,
(b) a ratchet wheel rotatably mounted on said pivot,
(c) a pawl that normally engages said ratchet wheel to prevent rotation of said ratchet wheel in one direction,
(d) a second pivot,
(e) a lever that has an actuator thereon with a coin-receiving portion which is adapted to receive coins of a predetermined denomination,
(f) a second lever that has an actuator thereon with a coin-receiving portion that is adapted to receive coins of a second denomination,
(g) said levers being rotatably mounted on said second pivot and being rotatable relative to the first said pivot and to said ratchet wheel,
(h) a transfer plate that is rotatably mounted on said second pivot and that is selectively engageable by each of said levers,
(i) said transfer plate normally permitting said pawl to remain in position to hold said ratchet wheel against rotation in said direction but being movable by each of said levers to move said pawl to a position where it frees said ratchet wheel,
(j) a third pivot that is carried by said transfer plate,
(k) a second pawl that is rotatably secured to said transfer plate by said third pivot and that is movable with said transfer plate,
(l) said second pawl normally being spaced from said ratchet wheel to permit rotation of said ratchet wheel relative to said second pawl but responding to movement of said transfer plate to move into engagement with said ratchet wheel,
(m) a stop that is adjacent said ratchet wheel and that is adapted to normally hold said second pawl in a predetermined position adjacent said ratchet wheel,
(n) a second stop that is adjacent said ratchet wheel and that is spaced from the first said stop and that is adapted to intercept said second pawl when said second pawl rotates with said ratchet wheel and to thereby halt rotation of said ratchet wheel,
(o) a third stop that is spaced from the first said stop a distance different than the spacing between the first said stop and said second stop,
(p) said third stop being adapted to intercept said second pawl when said second pawl rotates with said ratchet wheel and to thereby halt rotation of said ratchet wheel,
(q) a mechanism that can selectively restore said ratchet wheel to its normal position.

5. A coin-handling device that can respond to the insertion of coins to establish credits and that comprises:

(a) a pivot,
(b) a ratchet wheel rotatably mounted on said pivot,
(c) a pawl that normally engages said ratchet wheel to prevent rotation of said ratchet wheel in one direction,
(d) a second pivot,
(e) a lever that has an actuator thereon with a coin-receiving portion which is adapted to receive coins of a predetermined denomination,
(f) said lever being rotatably mounted on said second pivot and being rotatable relative to the first said pivot and to said ratchet wheel,
(g) a transfer plate that is rotatably mounted on said second pivot and that is selectively engageable by said lever,
(h) said transfer plate normally permitting said pawl to remain in position to hold said ratchet wheel against rotation but being movable by said lever to move said pawl to a position where it frees said ratchet wheel, (i) a third pivot that is carried by said transfer plate, (j) a second pawl that is rotatably secured to said transfer plate by said third pivot and that is movable with said transfer plate, (k) said second pawl normally being spaced from said ratchet wheel to permit rotation of said ratchet wheel relative to said second pawl but responding to movement of said transfer plate to move into engagement with said ratchet wheel, (l) a stop that is adjacent said ratchet wheel and that is adapted to normally hold said second pawl in a predetermined position adjacent said ratchet wheel, (m) a second stop that is adjacent said ratchet wheel and that is spaced from the first said stop and that is adapted to intercept said second pawl when said second pawl rotates with said ratchet wheel and to thereby halt rotation of said ratchet wheel, (n) said transfer plate being in part coextensive with said ratchet wheel, (o) a mechanism that can selectively restore said ratchet wheel to its normal position.

6. A coin-handling device that can respond to the insertion of coins to establish credits and that comprises:

(a) a pivot, (b) a ratchet wheel rotatably mounted on said pivot, (c) a pawl that normally engages said ratchet wheel to prevent rotation of said ratchet wheel in one direction, (d) a second pivot, (e) a lever that has an actuator thereon with a coin-receiving portion which is adapted to receive coins of a predetermined denomination, (f) a second lever that has an actuator thereon with a coin-receiving portion that is adapted to receive coins of a second denomination, (g) said levers being rotatably mounted on said second pivot and being rotatable relative to the first said pivot and to said ratchet wheel, (h) a transfer plate that is rotatably mounted on said second pivot and that is selectively engageable by each of said levers, (i) said transfer plate normally permitting said pawl to remain in position to hold said ratchet wheel against rotation in said direction but being movable by each of said levers to move said pawl to a position where it frees said ratchet wheel, (j) a third pivot that is carried by said transfer plate, (k) a second pawl that is rotatably secured to said transfer plate by said third pivot and that is movable with said transfer plate, (l) said second pawl normally being spaced from said ratchet wheel to permit rotation of said ratchet wheel relative to said second pawl but responding to movement of said transfer plate to move into engagement with said ratchet wheel, (m) a stop that is adjacent said ratchet wheel and that is adapted to normally hold said second pawl in a predetermined position adjacent said ratchet wheel, (n) said second pawl being rotatable with said ratchet wheel a predetermined distance when the first said lever causes said transfer plate to move the first said pawl to free said ratchet wheel and said second pawl being rotatable with said ratchet wheel a different distance when said second lever causes said transfer plate to move the first said pawl to free said ratchet wheel.

7. A coin-handling device that can respond to the insertion of coins to establish credits and that comprises:

(a) a pivot, (b) a ratchet wheel rotatably mounted on said pivot, (c) a pawl that normally engages said ratchet wheel to prevent rotation of said ratchet wheel in one direction, (d) a second pivot, (e) a lever that has an actuator thereon with a coin-receiving portion which is adapted to receive coins of a predetermined denomination, (f) a second lever that has an actuator thereon with a coin-receiving portion that is adapted to receive coins of a second denomination, (g) said levers being rotatably mounted on said second pivot and being rotatable relative to the first said pivot and to said ratchet wheel, (h) a transfer plate that is rotatably mounted on said second pivot and that is selectively engageable by each of said levers, (i) said transfer plate normally permitting said pawl to remain in position to hold said ratchet wheel against rotation in said direction but being movable by each of said levers to move said pawl to a position where it frees said ratchet wheel, (j) a third pivot that is carried by said transfer plate, (k) a second pawl that is rotatably secured to said transfer plate by said third pivot and that is movable with said transfer plate, (l) said second pawl normally being spaced from said ratchet wheel to permit rotation of said ratchet wheel relative to said second pawl but responding to movement of said transfer plate to move into engagement with said ratchet wheel, (m) a stop that is adjacent said ratchet wheel and that is adapted to normally hold said second pawl in a predetermined position adjacent said ratchet wheel, (n) a second stop that is adjacent said ratchet wheel and that is spaced from the first said stop and that is adapted to intercept said second pawl when said second pawl rotates with said ratchet wheel and to thereby halt rotation of said ratchet wheel, (o) a third stop that is spaced from the first said stop a distance different than the spacing between the first said stop and said second stop, (p) said third stop being adapted to intercept said second pawl when said second pawl rotates with said ratchet wheel and to thereby halt rotation of said ratchet wheel, (q) a mechanism that can selectively restore said ratchet wheel to its normal position, (r) said third pivot being adjacent the first said pivot so said second pawl can rotate with said ratchet wheel.

8. A coin-handling device that can respond to the insertion of coins to establish credits and that comprises:

(a) a pivot, (b) a ratchet whel rotatably mounted on said pivot, (c) a pawl that normally engages said ratchet wheel to prevent rotation of said ratchet wheel in one direction, (d) a second pivot, (e) a lever that has an actuator thereon with a coin-receiving portion which is adapted to receive coins of a predetermined denomination, (f) said level being rotatably mounted on said second pivot and being rotatable relative to the first said pivot and to said ratchet wheel, (g) a transfer plate that is rotatably mounted on said second pivot and that is selectively engageable by said lever, (h) said transfer plate normally permitting said pawl to remain in position to hold said ratchet wheel against rotation but being movable by said lever to move said pawl to a position where it frees said ratchet wheel, (i) a third pivot that is carried by said transfer plate, (j) a second pawl that is rotatably secured to said transfer plate by said third pivot and that is movable with said transfer plate, (k) said second pawl normally being spaced from said ratchet wheel to permit rotation of said ratchet wheel relative to said second pawl but responding to movement of said transfer plate to move into engagement with said ratchet wheel, (*l*) a stop that is adjacent said ratchet wheel and that is adapted to normally hold said second pawl in a predetermined position adjacent said ratchet wheel, (*m*) a second stop that is adjacent said ratchet wheel and that is spaced from the first said stop and that is adapted to intercept said second pawl when said second pawl rotates with said ratchet wheel and to thereby halt rotation of said ratchet wheel, (*n*) said third pivot being adjacent the first said pivot so said second pawl can rotate with said ratchet wheel.

9. A coin-handling device that can respond to the insertion of coins to establish credits and that comprises:

(*a*) a pivot, (*b*) a ratchet wheel rotatably mounted on said pivot, (*c*) a pawl that normally engages said ratchet wheel to prevent rotation of said ratchet wheel in one direction, (*d*) a second pivot, (*e*) a lever that has an actuator thereon with a coin-receiving portion which is adapted to receive coins of a predetermined denomination, (*f*) said lever being rotatably mounted on said second pivot and being rotatable relative to the first said pivot and to said ratchet wheel, (*g*) a transfer plate that is rotatably mounted on said second pivot and that is selectively engageable by said lever, (*h*) said transfer plate normally permitting said pawl to remain in position to hold said ratchet wheel against rotation but being movable by said lever to move said pawl to a position where it frees said ratchet wheel, (*i*) a third pivot that is carried by said transfer plate, (*j*) a second pawl that is rotatably secured to said transfer plate by said third pivot and that is movable with said transfer plate, (*k*) said second pawl normally being spaced from said ratchet wheel to permit rotation of said ratchet wheel relative to said second pawl but responding to movement of said transfer plate to move into engagement with said ratchet wheel, (*l*) a stop that is adjacent said ratchet wheel and that is adapted to normally hold said second pawl in a predetermined position adjacent said ratchet wheel, (*m*) a second stop that is adjacent said ratchet wheel and that is spaced from the first said stop and that is adapted to intercept said second pawl when said second pawl rotates with said ratchet wheel and to thereby halt rotation of said ratchet wheel, (*n*) said transfer plate being in part coextensive with said ratchet wheel, (*o*) a mechanism that can selectively restore said ratchet wheel to its normal position, (*p*) said pawls being disposed at opposite sides of said ratchet wheel.

10. A coin-handling device that can respond to the insertion of coins to establish credits and that comprises:

(*a*) a pivot, (*b*) a ratchet wheel rotatably mounted on said pivot, (*c*) a pawl that normally engages said ratchet wheel to prevent rotation of said ratchet wheel in one direction, (*d*) a second pivot, (*e*) a lever that has an actuator thereon with a coin-receiving portion which is adapted to receive coins of a predetermined denomination, (*f*) a second lever that has an actuator thereon with a coin-receiving portion that is adapted to receive coins of a second denomination, (*g*) said levers being rotatably mounted on said second pivot and being rotatable relative to the first said pivot and to said ratchet wheel, (*h*) a transfer plate that is rotatably mounted on said second pivot and that is selectively engageable by each of said levers, (*i*) said transfer plate normally permitting said pawl to remain in position to hold said ratchet wheel against rotation in said direction but being movable by each of said levers to move said pawl to a position where it frees said ratchet wheel, (*j*) a third pivot that is carried by said transfer plate, (*k*) a second pawl that is rotatably secured to said transfer plate by said third pivot and that is movable with said transfer plate, (*l*) said second pawl normally being spaced from said ratchet wheel to permit rotation of said ratchet wheel relative to said second pawl but responding to movement of said transfer plate to move into engagement with said ratchet wheel, (*m*) a stop that is adjacent said ratchet wheel and that is adapted to normally hold said second pawl in a predetermined position adjacent said ratchet wheel, (*n*) a second stop that is adjacent said ratchet wheel and that is spaced from the first said stop and that is adapted to intercept said second pawl when said second pawl rotates with said ratchet wheel and to thereby halt rotation of said ratchet wheel, (*o*) a third stop that is spaced from the first said stop a distance different than the spacing between the first said stop and said second stop, (*p*) said third stop being adapted to intercept said second pawl when said second pawl rotates with said ratchet wheel and to thereby halt rotation of said ratchet wheel, (*q*) a mechanism that can selectively restore said ratchet wheel to its normal position, (*r*) said second stop being on said second lever and normally being spaced out of the path of movement of said second pawl but moving into said path of movement of said second pawl when a coin engages and moves said coin-receiving portion of said actuator of said second lever, (*s*) said third stop being on said transfer plate.

11. A coin-handling device that can respond to the insertion of coins to establish credits and that comprises:

(*a*) a pivot, (*b*) a ratchet wheel rotatably mounted on said pivot, (*c*) a pawl that normally engages said ratchet wheel to prevent rotation of said ratchet wheel in one direction, (*d*) a second pivot, (*e*) a lever that has an actuator thereon with a coin-receiving portion which is adapted to receive coins of a predetermined denomination, (*f*) said lever being rotatably mounted on said second pivot and being rotatable relative to the first said pivot and to said ratchet wheel, (*g*) a transfer plate that is rotatably mounted on said second pivot and that is selectively engageable by said lever, (*h*) said transfer plate normally permitting said pawl to remain in position to hold said ratchet wheel against rotation but being movable by said lever to move said pawl to a position where it frees said ratchet wheel, (*i*) a third pivot that is carried by said transfer plate, (*j*) a second pawl that is rotatably secured to said transfer plate by said third pivot and that is movable with said transfer plate, (*k*) said second pawl normally being spaced from said ratchet wheel to permit rotation of said ratchet wheel relative to said second pawl but responding to movement of said transfer plate to move into engagement with said ratchet wheel, (*l*) a stop that is adjacent said ratchet wheel and that is adapted to normally hold said second pawl in a predetermined position adjacent said ratchet wheel, (*m*) a second stop that is adjacent said ratchet wheel and that is spaced from the first said stop and that is adapted to intercept said second pawl when said second pawl rotates with said ratchet wheel and to thereby halt rotation of said ratchet wheel, (*n*) said second stop being on said transfer plate whereby said ratchet wheel can rotate with said second pawl until said second pawl engages and is held by said transfer plate.

12. A coin-handling device that can respond to the insertion of coins to establish credits and that comprises:

(*a*) a pivot, (*b*) a ratchet wheel rotatably mounted on said pivot, (*c*) a pawl that normally engages said ratchet wheel to prevent rotation of said ratchet wheel in one direction, (*d*) a second pivot, (*e*) a lever that has an actuator thereon with a coin-receiving portion which is adapted to receive coins of a predetermined denomination, (*f*) a second lever that has an actuator thereon with a coin-receiving portion that is adapted to receive coins of a second denomination, (*g*) said levers being rotatably mounted on said second pivot and being rotatable relative to the first said pivot and to said ratchet wheel, (*h*) a transfer plate that is rotatably mounted on said second pivot and that is selectively engageable by each of said levers, (*i*) said transfer plate normally permitting said pawl to remain in position to hold said ratchet wheel against rotation in said direction but being movable by each of said levers to move said pawl to a position where it frees said ratchet wheel, (*j*) a third pivot that is carried by said transfer plate, (*k*) a second pawl that is rotatably secured to said transfer plate by said third pivot and that is movable with said transfer plate, (*l*) said second pawl normally being spaced from said ratchet wheel to permit rotation of said ratchet wheel relative to said second pawl but responding to movement of said transfer plate to move into engagement with said ratchet wheel, (*m*) a stop that is adjacent said ratchet wheel and that is adapted to normally hold said second pawl in a predetermined position adjacent said ratchet wheel, (*n*) a second stop that is adjacent said ratchet wheel and that is spaced from the first said stop and that is adapted to intercept said second pawl when said second pawl rotates with said ratchet wheel and to thereby halt rotation of said ratchet wheel, (*o*) a third stop that is spaced from the first said stop a distance different than the spacing between the first said stop and said second stop, (*p*) said third stop being adapted to intercept said second pawl when said second pawl rotates with said ratchet wheel and to thereby halt rotation of said ratchet wheel, (*q*) a mechanism that can selectively restore said ratchet wheel to its normal position, (*r*) and a price-setting member that is movable with said ratchet wheel to permit initiation of a cycle of operation of a controlled device with which said coin-handling device is used, (*s*) said price-setting member being disposable in different positions relative to said ratchet wheel to vary the number of advancements of said ratchet wheel required to permit initiation of said cycle of operation of said controlled device.

13. A coin-handling device that can respond to the insertion of coins to establish credits and that comprises:

(*a*) a pivot, (*b*) a ratchet wheel rotatably mounted on said pivot, (*c*) a pawl that normally engages said ratchet wheel to prevent rotation of said ratchet wheel in one direction, (*d*) a second pivot, (*e*) a lever that has an actuator thereon with a coin-receiving portion which is adapted to receive coins of a predetermined denomination, (*f*) said lever being rotatably mounted on said second pivot and being rotatable relative to the first said pivot and to said ratchet wheel, (*g*) a transfer plate that is rotatably mounted on said second pivot and that is selectively engageable by said lever, (*h*) said transfer plate normally permitting said pawl to remain in position to hold said ratchet wheel against rotation but being movable by said lever to move said pawl to a position where it frees said ratchet wheel, (*i*) a third pivot that is carried by said transfer plate, (*j*) a second pawl that is rotatably secured to said transfer plate by said third pivot and that is movable with said transfer plate, (*k*) said second pawl normally being spaced from said ratchet wheel to permit rotation of said ratchet wheel relative to said second pawl but responding to movement of said transfer plate to move into engagement with said ratchet wheel, (*l*) a stop that is adjacent said ratchet wheel and that is adapted to normally hold said second pawl in a predetermined position adjacent said ratchet wheel, (*m*) a second stop that is adjacent said ratchet wheel and that is spaced from the first said stop and that is adapted to intercept said second pawl when said second pawl rotates with said ratchet wheel and to thereby halt rotation of said ratchet wheel, (*n*) and a price-setting member that is movable with said ratchet wheel to permit initiation of a cycle of operation of a controlled device with which said coin-handling device is used, (*o*) said price-setting member being disposable in different positions relative to said ratchet wheel to vary the number of advancements of said ratchet wheel required to permit initiation of said cycle of operation of said controlled device.

14. A coin-handling device that can respond to the insertion of coins to establish credits and that comprises:

(*a*) a pivot, (*b*) a ratchet wheel rotatably mounted on said pivot, (*c*) a pawl that normally engages said ratchet wheel to prevent rotation of said ratchet wheel in one direction, (*d*) a second pivot, (*e*) a lever that has an actuator thereon with a coin-receiving portion which is adapted to receive coins of a predetermined denomination, (*f*) said lever being rotatably mounted on said second pivot and being rotatable relative to the first said pivot and to said ratchet wheel, (*g*) a transfer plate that is rotatably mounted on said second pivot and that is selectively engageable by said lever, (*h*) said transfer plate normally permitting said pawl to remain in position to hold said ratchet wheel against rotation but being movable by said lever to move said pawl to a position where it frees said ratchet wheel, (*i*) a third pivot that is carried by said transfer plate, (*j*) a second pawl that is rotatably secured to said transfer plate by said third pivot and that is movable with said transfer plate, (*k*) said second pawl normally being spaced from said ratchet wheel to permit rotation of said ratchet wheel relative to said second pawl but responding to movement of said transfer plate to move into engagement with said ratchet wheel,
(*l*) a stop that is adjacent said ratchet wheel and that is adapted to normally hold said second pawl in a predetermined position adjacent said ratchet wheel,
(*m*) a second stop that is adjacent said ratchet wheel and that is spaced from the first said stop and that is adapted to intercept said second pawl when said second pawl rotates with said ratchet wheel and to thereby halt rotation of said ratchet wheel,
(*n*) the first said stop being adjustable to provide a number of initial positions in which said second pawl can be held and can thereby provide a number of individually different advancements for said second pawl.

15. A coin-handling device that can respond to the insertion of coins to establish credits and that comprises:
(*a*) a pivot,
(*b*) a ratchet wheel rotatably mounted on said pivot,
(*c*) a pawl that normally engages said ratchet wheel to prevent rotation of said ratchet wheel in one direction,
(*d*) a second pivot,
(*e*) a lever that has an actuator thereon with a coin-receiving portion which is adapted to receive coins of a predetermined denomination,
(*f*) said lever being rotatably mounted on said second pivot and being rotatable relative to the first said pivot and to said ratchet wheel,
(*g*) a transfer plate that is rotatably mounted on said second pivot and that is selectively engageable by said lever,
(*h*) said transfer plate normally permitting said pawl to remain in position to hold said ratchet wheel against rotation but being movable by said lever to move said pawl to a position where it frees said ratchet wheel,
(*i*) a third pivot that is carried by said transfer plate,
(*j*) a second pawl that is rotatably secured to said transfer plate by said third pivot and that is movable with said transfer plate,
(*k*) said second pawl normally being spaced from said ratchet wheel to permit rotation of said ratchet wheel relative to said second pawl but responding to movement of said transfer plate to move into engagement with said ratchet wheel,
(*l*) a stop that is adjacent said ratchet wheel and that is adapted to normally hold said second pawl in a predetermined position adjacent said ratchet wheel,
(*m*) a second stop that is adjacent said ratchet wheel and that is spaced from the first said stop and that is adapted to intercept said second pawl when said second pawl rotates with said ratchet wheel and to thereby halt rotation of said ratchet wheel,
(*n*) the first said stop being adjustable to provide a number of initial positions in which said second pawl can be held and can thereby provide a number of individually different advancements for said second pawl,
(*o*) and a price-setting member that is movable with said ratchet wheel to permit initiation of a cycle of operation of a controlled device with which said coin-handling device is used,
(*p*) said price-setting member being disposable in different positions relative to said ratchet wheel to vary the number of advancements of said ratchet wheel required to permit initiation of said cycle of operation of said controlled device,
(*q*) said price-setting member and the first said stop providing a multiplicity of possible price-advancement combinations for said coin-handling device.

16. A coin-handling device that can respond to the insertion of coins to establish credits and that comprises:
(*a*) a member that can be moved to establish credits,
(*b*) a detent that normally engages said movable member to prevent movement of said movable member in one direction,
(*c*) a lever that has an actuator with a coin-receiving portion thereof,
(*d*) said lever being movable relative to said movable member,
(*e*) a transfer plate that is movable relative to said movable member and that is movable by said lever,
(*f*) said transfer plate normally permitting said detent to remain in position to hold said movable member against movement in said one direction but being movable by said lever to move said detent to a position where it frees said movable member,
(*g*) said transfer plate being in part coextensive with said movable member,
(*h*) a second detent that is carried by said transfer plate and that can respond to movement of said transfer plate to move into engagement with said movable member,
(*i*) said second detent being in part coextensive with said movable member whereby said second detent can move with said movable member,
(*j*) a stop that is adjacent said movable member and that is adapted to normally hold said second detent in a predetermined position adjacent said movable member,
(*k*) a second stop that is adjacent said movable member and that is spaced from the first said stop and that is adapted to intercept said second detent when said second detent moves with said movable member to thereby halt movement of said movable member.

17. A coin-handling device that can respond to the insertion of coins to establish credits and that comprises:
(*a*) a member that can be moved to establish credits,
(*b*) a detent that normally engages said movable member to prevent movement of said movable member in one direction,
(*c*) a lever that has an actuator with a coin-receiving portion thereon,
(*d*) said lever being movable relative to said movable member,
(*e*) a transfer plate that is movable relative to said movable member and that is movable by said lever,
(*f*) said transfer plate normally permitting said detent to remain in position to hold said movable member against movement in said one direction but being movable by said lever to move said detent to a position where it frees said movable member,
(*g*) said transfer plate being in part coextensive with said movable member,
(*h*) a second detent that is carried by said transfer plate and that can respond to movement of said transfer plate to move into engagement with said movable member,
(*i*) said second detent being in part coextensive with said movable member whereby said second detent can move with said movable member,
(*j*) a stop that is adjacent said movable member and that is adapted to normally hold said second detent in a predetermined position adjacent said movable member,
(*k*) a second stop that is adjacent said movable member and that is spaced from the first said stop and that is adapted to intercept said second detent when said second detent moves with said movable member to thereby halt movement of said movable member,
(*l*) and a price-setting member that is adjustable relative to said movable member but that is movable with said movable member to permit selective initiation of a cycle of a controlled member.

18. A coin-handling device that can respond to the insertion of coins to establish credits and that comprises:
(*a*) a member that can be moved to establish credits, (b) a detent that normally engages said movable member to prevent movement of said movable member in one direction,
(c) a lever that has an actuator with a coin-receiving portion thereon,
(d) said lever being movable relative to said movable member,
(e) a transfer plate that is movable relative to said movable member and that is movable by said lever,
(f) said transfer plate normally permitting said detent to remain in position to hold said movable member against movement in said one direction but being movable by said lever to move said detent to a position where it frees said movable member,
(g) said transfer plate being in part coextensive with said movable member,
(h) a second detent that is carried by said transfer plate and that can respond to movement of said transfer plate to move into engagement with said movable member,
(i) said second detent being in part coextensive with said movable member whereby said second detent can move with said movable member,
(j) a stop that is adjacent said movable member and that is adapted to normally hold said second detent in a predetermined position adjacent said movable member,
(k) a second stop that is adjacent said movable member and that is spaced from the first said stop and that is adapted to intercept said second detent when said second detent moves with said movable member to thereby halt movement of said movable member,
(l) the first said stop being adjustable to provide a number of initial positions in which said second detent can be held and can thereby provide a number of individually different advancements for said second detent.

19. A coin-handling device that can respond to the insertion of coins to establish credits and that comprises:
(a) a member that can be moved to establish credits,
(b) a detent that normally engages said movable member to prevent movement of said movable member in one direction,
(c) a lever that has an actuator with a coin-receiving portion thereon,
(d) said lever being movable relative to said movable member,
(e) a transfer plate that is movable relative to said movable member and that is movable by said lever,
(f) said transfer plate normally permitting said detent to remain in position to hold said movable member against movement in said one direction but being movable by said lever to move said detent to a position where it frees said movable member,
(g) said transfer plate being in part coextensive with said movable member,
(h) a second detent that is carried by said transfer plate and that can respond to movement of said transfer plate to move into engagement with said movable member,
(i) said second detent being in part coextensive with said movable member whereby said second detent can move with said movable member,
(j) a stop that is adjacent said movable member and that is adapted to normally hold said second detent in a predetermined position adjacent said movable member,
(k) a second stop that is adjacent said movable member and that is spaced from the first said stop and that is adapted to intercept said second detent when said second detent moves with said movable member to thereby halt movement of said movable member,
(l) and a price-setting member that is adjustable relative to said movable member but that is movable with said movable member to permit selective initiation of a cycle of a controlled member,
(m) the first said stop being adjustable to provide a number of initial positions in which said second detent can be held and can thereby provide a number of individually different advancements for said second detent.

20. A coin-handling device that can respond to the insertion of coins to establish credits and that comprises:
(a) a member that can be moved to establish credits,
(b) a detent that normally engages said movable member to prevent movement of said movable member in one direction,
(c) a lever that has an actuator with a coin-receiving portion thereon,
(d) said lever being movable relative to said movable member,
(e) a transfer plate that is movable relative to said movable member and that is movable by said lever,
(f) said transfer plate normally permitting said detent to remain in position to hold said movable member against movement in said one direction but being movable by said lever to move said detent to a position where it frees said movable member,
(g) said transfer plate being in part coextensive with said movable member,
(h) a second detent that is carried by said transfer plate and that can respond to movement of said transfer plate to move into engagement with said movable member,
(i) said second detent being in part coextensive with said movable member whereby said second detent can move with said movable member,
(j) a stop that is adjacent said movable member and that is adapted to normally hold said second detent in a predetermined position adjacent said movable member,
(k) a second stop that is adjacent said movable member and that is spaced from the first said stop and that is adapted to intercept said second detent when said second detent moves with said movable member to thereby halt movement of said movable member,
(l) and a price-setting member that is adjustable relative to said movable member but that is movable with said movable member to permit selective initiation of a cycle of a controlled member,
(m) said price-setting member normally being held fixed relative to said movable member by a spring carried by said movable member,
(n) said spring being adapted to yield to permit said price-setting member to be shifted relative to said movable member.

21. A coin-handling device that can respond to the insertion of coins to establish credits and that comprises:
(a) a pivot,
(b) a ratchet wheel rotatably mounted on said pivot,
(c) a pawl that normally engages said ratchet wheel to prevent rotation of said ratchet wheel in one direction,
(d) a second pivot,
(e) a lever that has an actuator thereon with a coin-receiving portion which is adapted to receive coins of a predetermined denomination,
(f) a second lever that has an actuator thereon with a coin-receiving portion that is adapted to receive coins of a second denomination,
(g) said levers being rotatably mounted on said second pivot and being rotatable relative to the first said pivot and to said ratchet wheel,
(h) a transfer plate that is rotatably mounted on said second pivot and that is selectively engageable by each of said levers,
(i) said transfer plate normally permitting said pawl to remain in position to hold said ratchet wheel against rotation in said direction but being movable by each of said levers to move said pawl to a position where it frees said ratchet wheel, (j) the first said lever being spaced from said transfer plate a distance greater than the distance between said second lever and said transfer plate, whereby a coin of said predetermined denomination can start the first said lever in motion before the first said lever engages said transfer plate, (k) a third pivot that is carried by said transfer plate, (l) a second pawl that is rotatably secured to said transfer plate by said third pivot and that is movable with said transfer plate, (m) said second pawl normally being spaced from said ratchet wheel to permit rotation of said ratchet wheel relative to said second pawl but responding to movement of said transfer plate to move into engagement with said ratchet wheel.

22. A coin-handling device that can respond to the insertion of coins to establish credits and that comprises:

(a) a pivot,
(b) a ratchet wheel rotatably mounted on said pivot,
(c) a pawl that normally engages said ratchet wheel to prevent rotation of said ratchet wheel in one direction,
(d) a second pivot,
(e) a lever that has an actuator thereon with a coin-receiving portion which is adapted to receive coins of a predetermined denomination,
(f) a second lever that has an actuator thereon with a coin-receiving portion that is adapted to receive coins of a second denomination,
(g) said levers being rotatably mounted on said second pivot and being rotatable relative to the first said pivot and to said ratchet wheel,
(h) a transfer plate that is rotatably mounted on said second pivot and that is selectively engageable by each of said levers,
(i) said transfer plate normally permitting said pawl to remain in position to hold said ratchet wheel against rotation in said direction but being movable by each of said levers to move said pawl to a position where it frees said ratchet wheel,
(j) the first said lever being spaced from said transfer plate a distance greater than the distance between said second lever and said transfer plate, whereby a coin of said predetermined denomination can start the first said lever in motion before the first said lever engages said transfer plate,
(k) a third pivot that is carried by said transfer plate,
(l) a second pawl that is rotatably secured to said transfer plate by said third pivot and that is movable with said transfer plate,
(m) said second pawl normally being spaced from said ratchet wheel to permit rotation of said ratchet wheel relative to said second pawl but responding to movement of said transfer plate to move into engagement with said ratchet wheel,
(n) a stop that is adjacent said ratchet wheel and that is adapted to normally hold said second pawl in a predetermined position adjacent said ratchet wheel,
(o) a second stop that is adjacent said ratchet wheel and that is spaced from the first said stop and that is adapted to intercept said second pawl when said second pawl rotates with said ratchet wheel and to thereby halt rotation of said ratchet wheel,
(p) a third stop that is spaced from the first said stop a distance different than the spacing between the first said stop and said second stop,
(q) said third stop being adapted to intercept said second pawl when said second pawl rotates with said ratchet wheel and to thereby halt rotation of said ratchet wheel.

23. A coin-handling device that can respond to the insertion of coins to establish credits and that comprises:

(a) a pivot,
(b) a ratchet wheel rotatably mounted on said pivot,
(c) a pawl that normally engages said ratchet wheel to prevent rotation of said ratchet wheel in one direction,
(d) a second pivot,
(e) a lever that has an actuator thereon with a coin-receiving portion which is adapted to receive coins of a predetermined denomination,
(f) a second lever that has an actuator thereon with a coin-receiving portion that is adapted to receive coins of a second denomination,
(g) said levers being rotatably mounted on said second pivot and being rotatable relative to the first said pivot and to said ratchet wheel,
(h) a transfer plate that is rotatably mounted on said second pivot and that is selectively engageable by each of said levers,
(i) said transfer plate normally permitting said pawl to remain in position to hold said ratchet wheel against rotation in said direction but being movable by each of said levers to move said pawl to a position where it frees said ratchet wheel,
(j) a third pivot that is carried by said transfer plate,
(k) a second pawl that is rotatably secured to said transfer plate by said third pivot and that is movable with said transfer plate,
(l) said second pawl normally being spaced from said ratchet wheel to permit rotation of said ratchet wheel relative to asid second pawl but responding to movement of said transfer plate to move into engagement with said ratchet wheel,
(m) a stop that is adjacent said ratchet wheel and that is adapted to normally hold said second pawl in a predetermined position adjacent said ratchet wheel,
(n) said second pawl being rotatable with said ratchet wheel a predetermined distance when the first said lever causes said transfer plate to move the first said pawl to free said ratchet wheel and said second pawl being rotatable with said ratchet wheel a different distance when said second lever causes said transfer plate to move the first said pawl to free said ratchet wheel,
(o) said levers and said transfer plate being statically balanced whereby blows applied to said coin-handling device can not cause said levers or said transfer plate to free said ratchet wheel.

24. A coin-handling device that can respond to the insertion of coins to establish credits and that comprises:

(a) a pivot,
(b) a ratchet wheel rotatably mounted on said pivot,
(c) a pawl that normally engages said ratchet wheel to prevent rotation of said ratchet wheel in one direction,
(d) a second pivot,
(e) a lever that has an actuator thereon with a coin-receiving portion which is adapted to receive coins of a predetermined denomination,
(f) a third pivot that is adjacent and movable realtive to the first said pivot,
(g) a second pawl that is rotatably mounted on said third pivot,
(h) said second pawl normally being spaced from said ratchet wheel to permit rotation of said ratchet wheel relative to said second pawl but responding to movement of said third pivot to move into engagement with said ratchet wheel,
(i) said lever being movable to move the first said and said second pawls relative to said ratchet wheel,
(j) said second pawl being in part coextensive with said ratchet wheel and having the center of rotation thereof adjacent the first said pivot whereby said second pawl can rotate with said ratchet wheel.

25. A coin-handling device that can respond to the insertion of coins to establish credits and that comprises:

(a) a pivot, (b) a ratchet wheel rotatably mounted on said pivot,
(c) a pawl that normally engages said ratchet wheel to prevent rotation of said ratchet wheel in one direction,
(d) a lever that has an actuator thereon with a coin-receiving portion which is adapted to receive coins of a predetermined denomination,
(e) a second lever that has an actuator thereon with a coin-receiving portion that is adapted to receive coins of a second denomination,
(f) a second pivot,
(g) a second pawl that is rotatably mounted on said second pivot,
(h) said lever being movable to move the first said and said second pawls relative to said ratchet wheel,
(i) a stop that is adjacent said ratchet wheel and that is adapted to normally hold said second pawl in a predetermined position adjacent said ratchet wheel,
(j) a second stop that is adjacent said ratchet wheel and that is spaced from the first said stop and that is adapted to intercept said second pawl when said second pawl rotates with said ratchet wheel and to thereby halt rotation of said ratchet wheel,
(k) a third stop that is spaced from the first said stop a distance different than the spacing between the first said stop and said second stop,
(l) said third stop being adapted to intercept said second pawl when said second pawl rotates with said ratchet wheel and to thereby halt rotation of said ratchet wheel,
(m) whereby said second pawl moves whenever either of said levers is moved but moves further whenever it moves toward said third stop.

26. A coin-handling device that can respond to the insertion of coins to establish credits and that comprises:
(a) a pivot,
(b) a ratchet wheel rotatably mounted on said pivot,
(c) a pawl that normally engages said ratchet wheel to prevent rotation of said ratchet wheel in one direction,
(d) a second pivot,
(e) a lever that has an actuator thereon with a coin-receiving portion which is adapted to receive coins of a predetermined denomination,
(f) said lever being rotatably mounted on said second pivot and being rotatable relative to the first said pivot and to said ratchet wheel,
(g) a third pivot that is movable relative to the first said pivot and said ratchet wheel,
(h) a second pawl that is rotatably mounted on said second pivot and that can rotate with said ratchet wheel,
(i) said second pawl having an abutment thereon at one level and having a second abutment thereon at a different level,
(j) said abutments on said second pawl being horizontally displaced,
(k) said lever being disposable in one position on said second pivot to be in the path of the first said abutment and thereby provide one limit to rotation of said ratchet wheel,
(l) said lever being disposable in a second position on said second pivot to be in the path of said second abutment and thereby provide a second and different limit to rotation of said ratchet wheel.

27. A coin-handling device that can respond to the insertion of coins to establish credits and that comprises:
(a) a pivot,
(b) a ratchet wheel rotatably mounted on said pivot,
(c) a second pivot,
(d) a pawl that is rotatably mounted on said second pivot and that normally engages said ratchet wheel to prevent rotation of said ratchet wheel in one direction,
(e) a lever that has an actuator thereon with a coin-receiving portion which is adapted to receive coins of a predetermined denomination,
(f) a transfer plate that is rotatably mounted on said second pivot and that is selectively engageable by said lever,
(g) said transfer plate normally permitting said pawl to remain in position to hold said ratchet wheel against rotation in said direction but being movable by said lever to a position where it frees said ratchet wheel,
(h) said pawl and said transfer plate rotating concentrically, whereby there is no sliding friction between them.

28. A coin-handling device that can respond to the insertion of coins to establish credits and that comprises:
(a) a pivot,
(b) a ratchet wheel rotatably mounted on said pivot,
(c) a pawl that normally engages said ratchet wheel to prevent rotation of said ratchet wheel in one direction,
(d) a second pivot,
(e) a lever that has an actuator thereon with a coin-receiving portion which is adapted to receive coins of a predetermined denomination,
(f) a second lever that has an actuator thereon with a coin-receiving portion that is adapted to receive coins of a second denomination,
(g) said levers being rotatably mounted on said second pivot and being rotatable relative to the first said pivot and to said ratchet wheel,
(h) a transfer plate that is rotatably mounted on said second pivot and that is selectively engageable by each of said levers,
(i) said transfer plate normally permitting said pawl to remain in position to hold said ratchet wheel against rotation in said direction but being movable by each of said levers to move said pawl to a position where it frees said ratchet wheel,
(j) a third pivot that is carried by said transfer plate,
(k) a second pawl that is rotatably secured to said transfer plate by said third pivot and that is movable with said transfer plate,
(l) said second pawl normally being spaced from said ratchet wheel to permit rotation of said ratchet wheel relative to said second pawl but responding to movement of said transfer plate to move into engagement with said ratchet wheel,
(m) a stop that is adjacent said ratchet wheel and that is adapted to normally hold said second pawl in a predetermined position adjacent said ratchet wheel,
(n) a second stop that is adjacent said ratchet wheel and that is spaced from the first said stop and that is adapted to intercept said second pawl when said second pawl rotates with said ratchet wheel and to thereby halt rotation of said ratchet wheel,
(o) a third stop that is spaced from the first said stop a distance different than the spacing between the first said stop and said second stop,
(p) said third stop being adapted to intercept said second pawl when said second pawl rotates with said ratchet wheel and to thereby halt rotation of said ratchet wheel,
(q) a mechanism that can selectively restore said ratchet wheel to its normal position,
(r) said second stop being on the first said lever,
(s) said second stop normally being out of the path of said second pawl but being movable into the path of said second pawl before the first said lever causes said transfer plate to move the first said pawl to said position where it frees said ratchet wheel.

29. A coin-handling device that can respond to the insertion of coins to establish credits and that comprises:
(a) a pivot,
(b) a ratchet wheel rotatably mounted on said pivot,
(c) a pawl that normally engages said ratchet wheel to prevent rotation of said ratchet wheel in one direction,
(d) a second pivot,
(e) a lever that has an actuator thereon with a coin-receiving portion which is adapted to receive coins of a predetermined denomination,
(f) a second lever that has an actuator thereon with a coin-receiving portion that is adapted to receive coins of a second denomination,
(g) said levers being rotatably mounted on said second pivot and being rotatable relative to the first said pivot and to said ratchet wheel,
(h) a transfer plate that is rotatably mounted on said second pivot and that is selectively engageable by each of said levers,
(i) said transfer plate normally permitting said pawl to remain in position to hold said ratchet wheel against rotation in said direction but being movable by each of said levers to move said pawl to a position where it frees said ratchet wheel,
(j) said levers and said transfer plate rotating concentrically and without sliding friction therebetween.

30. A coin-handling device that can respond to the insertion of coins to establish credits and that comprises:
(a) a pivot,
(b) a ratchet wheel rotatably mounted on said pivot,
(c) a pawl that normally engages said ratchet wheel to prevent rotation of said ratchet wheel in one direction,
(d) a lever that has an actuator thereon with a coin-receiving portion which is adapted to receive coins of a predetermined denomination,
(e) a second lever that has an actuator thereon with a coin-receiving portion that is adapted to receive coins of a second denomination,
(f) said levers being movable relative to said pivot and to said ratchet wheel,
(g) a transfer plate that is movable relative to said pivot and to said ratchet wheel and that is selectively engageable by each of said levers,
(h) said transfer plate normally permitting said pawl to remain in position to hold said ratchet wheel against rotation in said direction but being movable by each of said levers to move said pawl to a position where it frees said ratchet wheel,
(i) a second pawl that is secured to said transfer plate and that is movable with said transfer plate,
(j) said second pawl normally being spaced from said ratchet wheel to permit rotation of said ratchet wheel relative to said second pawl but responding to movement of said transfer plate to move into engagement with said ratchet wheel,
(k) said second pawl being movable with said ratchet wheel a predetermined distance when the first said lever causes said transfer plate to move the first said pawl to free said ratchet wheel and said second pawl being movable with said ratchet wheel a different distance when said second lever causes said transfer plate to move the first said pawl to free said ratchet wheel.

References Cited in the file of this patent
UNITED STATES PATENTS

| | | |
|---|---|---|
| 2,217,845 | Mueller | Oct. 15, 1940 |
| 2,780,336 | Hatcher | Feb. 5, 1957 |
| 2,972,400 | Gabrielsen | Feb. 21, 1961 |
| 2,991,867 | Schuller | July 11, 1961 |

OTHER REFERENCES

German printed application, 23,103, Oct. 25, 1956.